US012754280B2

(12) United States Patent
Shalita et al.

(10) Patent No.: US 12,754,280 B2
(45) Date of Patent: Oct. 6, 2026

(54) RADAR APPARATUS, SYSTEM, AND METHOD

(71) Applicant: Intel Corporation, Santa Clara, CA (US)

(72) Inventors: Oren Shalita, Tel-Aviv (IL); Yossi Tsfati, Rishon le Zion (IL); Ofer Markish, Ra'anana (IL)

(73) Assignee: INTEL CORPORATION, Santa Clara, CA (US)

( * ) Notice: Subject to any disclaimer, the term of this patent is extended or adjusted under 35 U.S.C. 154(b) by 336 days.

(21) Appl. No.: 18/574,718

(22) PCT Filed: Dec. 21, 2021

(86) PCT No.: PCT/US2021/064694
§ 371 (c)(1),
(2) Date: Dec. 27, 2023

(87) PCT Pub. No.: WO2023/121658
PCT Pub. Date: Jun. 29, 2023

(65) Prior Publication Data

US 2024/0319326 A1 Sep. 26, 2024

(51) Int. Cl.
*G01S 7/02* (2006.01)
*G01S 7/03* (2006.01)
(Continued)

(52) U.S. Cl.
CPC .............. *G01S 7/025* (2013.01); *G01S 7/032* (2013.01); *G01S 7/295* (2013.01); *G01S 13/931* (2013.01)

(58) Field of Classification Search
CPC ...... G01S 13/42; G01S 13/931; G01S 7/0232; G01S 7/0235; G01S 7/025; G01S 7/026;
(Continued)

(56) References Cited

U.S. PATENT DOCUMENTS 2,628,278 A * 2/1953 Zaleski .................. H01P 1/165 333/257
5,659,322 A * 8/1997 Caille .................. H01Q 21/245 342/188

(Continued)

OTHER PUBLICATIONS

International Search Report and the Written Opinion for International Application No. PCT/US2021/064694, mailed on Sep. 14, 2022, 8 pages.

(Continued)

*Primary Examiner* — Peter M Bythrow
(74) *Attorney, Agent, or Firm* — Shichrur & Co.

(57) ABSTRACT

Some demonstrative aspects include radar apparatuses, devices, systems and methods. In one example, a radar system may include a plurality of radar devices. For example, a radar device may include one or more Transmit (Tx) antennas to transmit radar Tx signals, one or more Receive (Rx) antennas to receive radar Rx signals, and a processor to generate radar information based on the radar Rx signals. In one example, the radar system may be implemented as part of a vehicle. In other aspects, the radar system may include any other additional or alternative elements and/or may be implemented as part of any other device or system.

29 Claims, 24 Drawing Sheets

1100

1120

(51) Int. Cl.
*G01S 7/295* (2006.01)
*G01S 13/931* (2020.01)

(58) Field of Classification Search
CPC ....... G01S 7/032; G01S 7/295; H01Q 1/3233; H01Q 21/08; H01Q 21/245; H01Q 21/28; H01Q 9/0414; H01Q 9/0435; H01Q 9/045
See application file for complete search history.

(56) References Cited

U.S. PATENT DOCUMENTS

| | | | | |
|---|---|---|---|---|
| 8,098,189 | B1 * | 1/2012 | Woodell | G01S 7/025<br>342/26 B |
| 8,988,274 | B2 * | 3/2015 | Zhang | G01S 7/024<br>342/368 |
| 9,013,360 | B1 * | 4/2015 | Apostolos | H01Q 9/06<br>343/793 |
| 9,887,467 | B2 * | 2/2018 | Aryanfar | H04B 5/70 |
| 10,468,781 | B1 * | 11/2019 | Paulsen | H01Q 3/26 |
| 10,539,656 | B2 | 1/2020 | Izadian | |
| 10,756,417 | B2 * | 8/2020 | Izadian | G01S 7/032 |
| 2008/0129634 | A1 * | 6/2008 | Pera | H01Q 21/065<br>343/853 |
| 2013/0101005 | A1 * | 4/2013 | Aryanfar | H04B 5/70<br>375/267 |
| 2017/0353338 | A1 * | 12/2017 | Amadjikpe | H01Q 21/245 |
| 2018/0066991 | A1 * | 3/2018 | Mueller | H01Q 21/24 |
| 2019/0137601 | A1 * | 5/2019 | Driscoll | G01S 7/03 |
| 2019/0187247 | A1 * | 6/2019 | Izadian | G01S 7/025 |
| 2019/0190133 | A1 * | 6/2019 | Izadian | H01Q 15/24 |
| 2019/0305422 | A1 | 10/2019 | Choudhury et al. | |
| 2020/0225317 | A1 * | 7/2020 | Chen | G01S 7/40 |
| 2020/0271751 | A1 * | 8/2020 | Mayer | G01S 7/411 |
| 2020/0358187 | A1 * | 11/2020 | Tran | H04B 17/318 |
| 2021/0041529 | A1 | 2/2021 | Brown et al. | |
| 2021/0181332 | A1 | 6/2021 | Yun et al. | |
| 2021/0239791 | A1 * | 8/2021 | Vollbracht | G01S 13/931 |
| 2021/0341573 | A1 | 11/2021 | Amizur et al. | |
| 2022/0221554 | A1 * | 7/2022 | Kawaji | H01Q 21/24 |

OTHER PUBLICATIONS

International Preliminary Report on Patentability for International Application No. PCT/US2021/064694, mailed on Jul. 4, 2024, 5 pages.

Visentin et al., "Analysis of multipath and DOA detection using a fully polarimetric automotive radar", International Journal of Microwave and Wireless Technologies, Cambridge University Press and the European Microwave Association 2018, pp. 570-577.

Trummer et al., "Performance Analysis of 79 GHz Polarimetric Radar Sensors for Autonomous Driving", Proceedings of the 14th European Radar Conference, 2017 EuMA, Oct. 11-13, 2017, Nuremberg, Germany, pp. 41-44.

Visentin et al., "Polarimetric RCS Measurements of Selected Two-Wheeled Vehicles for Automotive Radar" Proceedings of the 14th European Radar Conference, 2017 EuMA, Oct. 11-13, 2017, Nuremberg, Germany, pp. 53-56.

Geary et al., "Automotive Radar Target Characterization from 22 to 29 GHz and 76 to 81 GHz", 2013 IEEE Radar Conference (RadarCon13) 978-1-4673-5794-4/13/$31.00 © 2013 IEEE, 6 pages.

* cited by examiner

1200

1220

RADAR APPARATUS, SYSTEM, AND METHOD

TECHNICAL FIELD

Aspects described herein generally relate to radar apparatus, system and method.

BACKGROUND

Various types of devices and systems, for example, assistance and/or autonomous systems, e.g., to be used in vehicles, airplanes and robots, may be configured to perceive and navigate through their environment using sensor data of one or more sensor types.

Conventionally, autonomous perception relies heavily on light-based sensors, such as image sensors, e.g., cameras, and/or Light Detection and Ranging (LIDAR) sensors. Such light-based sensors may perform poorly under certain conditions, such as, conditions of poor visibility, or in certain inclement weather conditions, e.g., rain, snow, hail, or other forms of precipitation, thereby limiting their usefulness or reliability.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
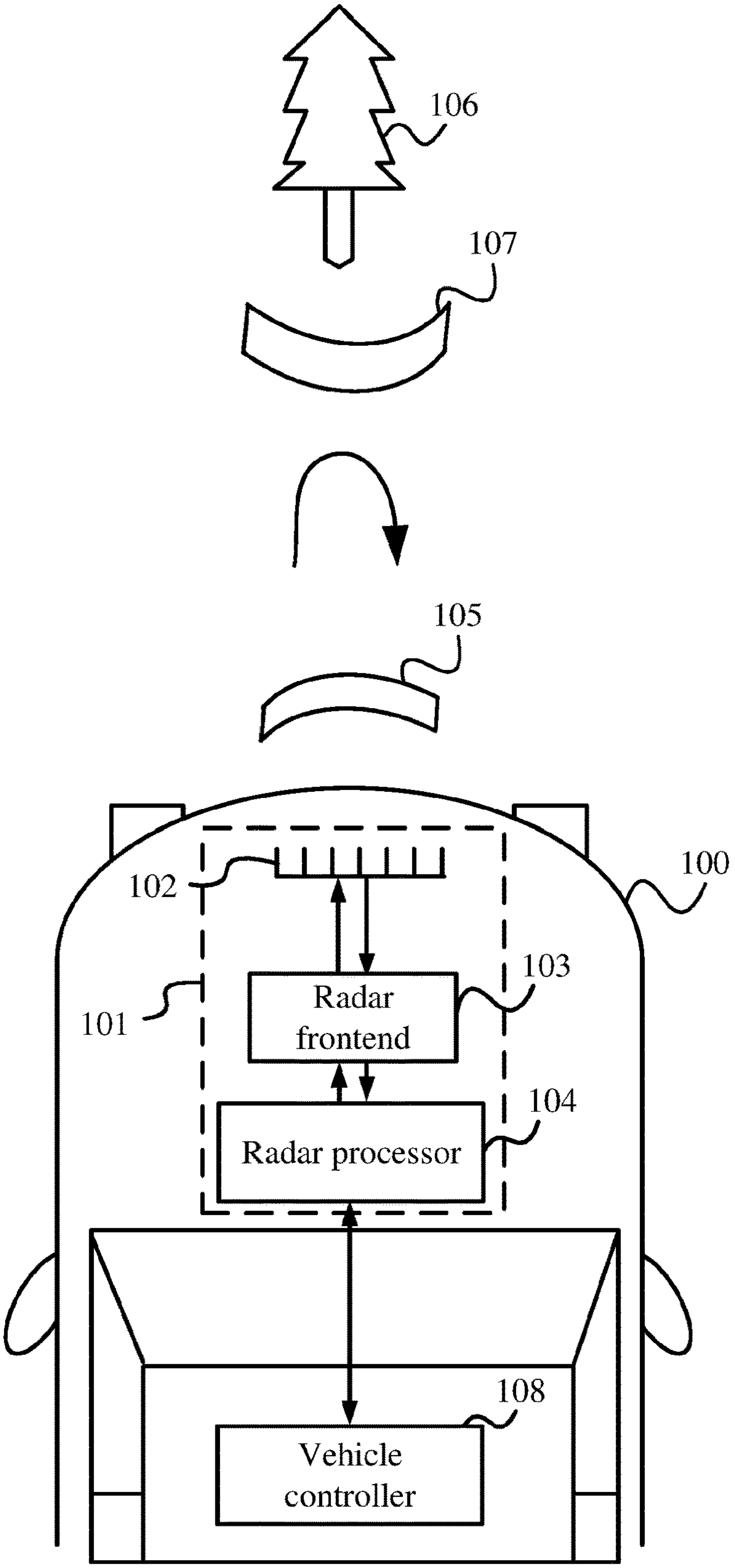
FIG. 1 is a schematic block diagram illustration of a vehicle implementing a radar, in accordance with some demonstrative aspects.

In the following detailed description, numerous specific details are set forth in order to provide a thorough understanding of some aspects. However, it will be understood by persons of ordinary skill in the art that some aspects may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

The words "exemplary" and "demonstrative" are used herein to mean "serving as an example, instance, demonstration, or illustration". Any aspect, aspect, or design described herein as "exemplary" or "demonstrative" is not necessarily to be construed as preferred or advantageous over other aspects, aspects, or designs.

References to "one aspect", "an aspect", "demonstrative aspect", "various aspects" "one aspect", "an aspect", "demonstrative aspect", "various aspects" etc., indicate that the aspect(s) and/or aspects so described may include a particular feature, structure, or characteristic, but not every aspect or aspect necessarily includes the particular feature, structure, or characteristic. Further, repeated use of the phrase "in one aspect" or "in one aspect" does not necessarily refer to the same aspect or aspect, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

The phrases "at least one" and "one or more" may be understood to include a numerical quantity greater than or equal to one, e.g., one, two, three, four, [ . . . ], etc. The phrase "at least one of" with regard to a group of elements may be used herein to mean at least one element from the group consisting of the elements. For example, the phrase "at least one of" with regard to a group of elements may be used herein to mean one of the listed elements, a plurality of one of the listed elements, a plurality of individual listed elements, or a plurality of a multiple of individual listed elements.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term "data", however, is not limited to the aforementioned examples and may take various forms and/or may represent any information as understood in the art.

The terms "processor" or "controller" may be understood to include any kind of technological entity that allows handling of any suitable type of data and/or information. The data and/or information may be handled according to one or more specific functions executed by the processor or controller. Further, a processor or a controller may be understood as any kind of circuit, e.g., any kind of analog or digital circuit. A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), and the like, or any combination thereof. Any other kind of implementation of the respective functions, which will be described below in further detail, may also be understood as a processor, controller, or logic circuit. It is understood that any two (or more) processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

The term "memory" is understood as a computer-readable medium (e.g., a non-transitory computer-readable medium) in which data or information can be stored for retrieval. References to "memory" may thus be understood as referring to volatile or non-volatile memory, including random access memory (RAM), read-only memory (ROM), flash memory, solid-state storage, magnetic tape, hard disk drive, optical drive, among others, or any combination thereof. Registers, shift registers, processor registers, data buffers, among others, are also embraced herein by the term memory. The term "software" may be used to refer to any type of executable instruction and/or logic, including firmware.

A "vehicle" may be understood to include any type of driven object. By way of example, a vehicle may be a driven object with a combustion engine, an electric engine, a reaction engine, an electrically driven object, a hybrid driven object, or a combination thereof. A vehicle may be, or may include, an automobile, a bus, a mini bus, a van, a truck, a mobile home, a vehicle trailer, a motorcycle, a bicycle, a tricycle, a train locomotive, a train wagon, a moving robot, a personal transporter, a boat, a ship, a submersible, a submarine, a drone, an aircraft, a rocket, among others.

A "ground vehicle" may be understood to include any type of vehicle, which is configured to traverse the ground, e.g., on a street, on a road, on a track, on one or more rails, off-road, or the like.

An "autonomous vehicle" may describe a vehicle capable of implementing at least one navigational change without driver input. A navigational change may describe or include a change in one or more of steering, braking, acceleration/deceleration, or any other operation relating to movement, of the vehicle. A vehicle may be described as autonomous even in case the vehicle is not fully autonomous, for example, fully operational with driver or without driver input. Autonomous vehicles may include those vehicles that can operate under driver control during certain time periods, and without driver control during other time periods. Additionally or alternatively, autonomous vehicles may include vehicles that control only some aspects of vehicle navigation, such as steering, e.g., to maintain a vehicle course between vehicle lane constraints, or some steering operations under certain circumstances, e.g., not under all circumstances, but may leave other aspects of vehicle navigation to the driver, e.g., braking or braking under certain circumstances. Additionally or alternatively, autonomous vehicles may include vehicles that share the control of one or more aspects of vehicle navigation under certain circumstances, e.g., hands-on, such as responsive to a driver input; and/or vehicles that control one or more aspects of vehicle navigation under certain circumstances, e.g., hands-off, such as independent of driver input. Additionally or alternatively, autonomous vehicles may include vehicles that control one or more aspects of vehicle navigation under certain circumstances, such as under certain environmental conditions, e.g., spatial areas, roadway conditions, or the like. In some aspects, autonomous vehicles may handle some or all aspects of braking, speed control, velocity control, steering, and/or any other additional operations, of the vehicle. An autonomous vehicle may include those vehicles that can operate without a driver. The level of autonomy of a vehicle may be described or determined by the Society of Automotive Engineers (SAE) level of the vehicle, e.g., as defined by the SAE, for example in *SAE J3016 2018: Taxonomy and definitions for terms related to driving automation systems for on road motor vehicles*, or by other relevant professional organizations. The SAE level may have a value ranging from a minimum level, e.g., level 0 (illustratively, substantially no driving automation), to a maximum level, e.g., level 5 (illustratively, full driving automation). In addition, systems described herein may be used for assistance purposes in vehicles, e.g., to provide information to a driver and/or other occupants of a vehicle.

The phrase "vehicle operation data" may be understood to describe any type of feature related to the operation of a vehicle. By way of example, "vehicle operation data" may describe the status of the vehicle, such as, the type of tires of the vehicle, the type of vehicle, and/or the age of the manufacturing of the vehicle. More generally, "vehicle operation data" may describe or include static features or static vehicle operation data (illustratively, features or data not changing over time). As another example, additionally or alternatively, "vehicle operation data" may describe or include features changing during the operation of the vehicle, for example, environmental conditions, such as weather conditions or road conditions during the operation of the vehicle, fuel levels, fluid levels, operational parameters of the driving source of the vehicle, or the like. More generally, "vehicle operation data" may describe or include varying features or varying vehicle operation data (illustratively, time varying features or data).

Some aspects may be used in conjunction with various devices and systems, for example, a radar sensor, a radar device, a radar system, a vehicle, a vehicular system, an autonomous vehicular system, a vehicular communication system, a vehicular device, an airborne platform, a waterborne platform, road infrastructure, sports-capture infrastructure, city monitoring infrastructure, static infrastructure platforms, indoor platforms, moving platforms, robot platforms, industrial platforms, a sensor device, a User Equipment (UE), a Mobile Device (MD), a wireless station (STA), a sensor device, a non-vehicular device, a mobile or portable device, and the like.

Some aspects may be used in conjunction with Radio Frequency (RF) systems, radar systems, vehicular radar systems, autonomous systems, robotic systems, detection systems, or the like.

Some demonstrative aspects may be used in conjunction with an RF frequency in a frequency band having a starting frequency above 10 Gigahertz (GHz), for example, a frequency band having a starting frequency between 10 GHz and 120 GHz. For example, some demonstrative aspects may be used in conjunction with an RF frequency having a starting frequency above 30 GHz, for example, above 45 GHz, e.g., above 60 GHz. For example, some demonstrative aspects may be used in conjunction with an automotive radar frequency band, e.g., a frequency band between 76 GHz and 81 GHz. However, other aspects may be implemented utilizing any other suitable frequency bands, for example, a frequency band above 140 GHz, a frequency band of 300 GHz, a sub Terahertz (THz) band, a THz band, an Infra-Red (IR) band, and/or any other frequency band.

As used herein, the term "circuitry" may refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. In some aspects, the circuitry may be implemented in, or functions associated with the circuitry may be implemented by, one or more software or firmware modules. In some aspects, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g., radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and/or the like. Logic may be executed by one or more processors using memory, e.g., registers, buffers, stacks, and the like, coupled to the one or more processors, e.g., as necessary to execute the logic.

The term "communicating" as used herein with respect to a signal includes transmitting the signal and/or receiving the signal. For example, an apparatus, which is capable of communicating a signal, may include a transmitter to transmit the signal, and/or a receiver to receive the signal. The verb communicating may be used to refer to the action of transmitting or the action of receiving. In one example, the phrase "communicating a signal" may refer to the action of transmitting the signal by a transmitter, and may not necessarily include the action of receiving the signal by a receiver. In another example, the phrase "communicating a signal" may refer to the action of receiving the signal by a receiver, and may not necessarily include the action of transmitting the signal by a transmitter.

The term "antenna", as used herein, may include any suitable configuration, structure and/or arrangement of one or more antenna elements, components, units, assemblies and/or arrays. In some aspects, the antenna may implement transmit and receive functionalities using separate transmit and receive antenna elements. In some aspects, the antenna may implement transmit and receive functionalities using common and/or integrated transmit/receive elements. The antenna may include, for example, a phased array antenna, a single element antenna, a set of switched beam antennas, and/or the like. In one example, an antenna may be implemented as a separate element or an integrated element, for example, as an on-module antenna, an on-chip antenna, or according to any other antenna architecture.

Some demonstrative aspects are described herein with respect to RF radar signals. However, other aspects may be implemented with respect to, or in conjunction with, any other radar signals, wireless signals, IR signals, acoustic signals, optical signals, wireless communication signals, communication scheme, network, standard, and/or protocol. For example, some demonstrative aspects may be implemented with respect to systems, e.g., Light Detection Ranging (LiDAR) systems, and/or sonar systems, utilizing light and/or acoustic signals.

Reference is now made to FIG. 1, which schematically illustrates a block diagram of a vehicle 100 implementing a radar, in accordance with some demonstrative aspects.

In some demonstrative aspects, vehicle 100 may include a car, a truck, a motorcycle, a bus, a train, an airborne vehicle, a waterborne vehicle, a cart, a golf cart, an electric cart, a road agent, or any other vehicle.

In some demonstrative aspects, vehicle 100 may include a radar device 101, e.g., as described below. For example, radar device 101 may include a radar detecting device, a radar sensing device, a radar sensor, or the like, e.g., as described below.

In some demonstrative aspects, radar device 101 may be implemented as part of a vehicular system, for example, a system to be implemented and/or mounted in vehicle 100.

In one example, radar device 101 may be implemented as part of an autonomous vehicle system, an automated driving system, a driver assistance and/or support system, and/or the like.

For example, radar device 101 may be installed in vehicle 100 for detection of nearby objects, e.g., for autonomous driving.

In some demonstrative aspects, radar device 101 may be configured to detect targets in a vicinity of vehicle 100, e.g., in a far vicinity and/or a near vicinity, for example, using RF and analog chains, capacitor structures, large spiral transformers and/or any other electronic or electrical elements, e.g., as described below.

In one example, radar device 101 may be mounted onto, placed, e.g., directly, onto, or attached to, vehicle 100.

In some demonstrative aspects, vehicle 100 may include a plurality of radar devices 101. For example, radar device 101 may be implemented by a plurality of radar units, which may be at a plurality of locations, e.g., around vehicle 100. In other aspects, vehicle 100 may include a single radar device 101.

In some demonstrative aspects, vehicle 100 may include a plurality of radar devices 101, which may be configured to cover a field of view of 360 degrees around vehicle 100.

In other aspects, vehicle 100 may include any other suitable count, arrangement, and/or configuration of radar devices and/or units, which may be suitable to cover any other field of view, e.g., a field of view of less than 360 degrees.

In some demonstrative aspects, radar device 101 may be implemented as a component in a suite of sensors used for driver assistance and/or autonomous vehicles, for example, due to the ability of radar to operate in nearly all-weather conditions.

In some demonstrative aspects, radar device 101 may be configured to support autonomous vehicle usage, e.g., as described below.

In one example, radar device 101 may determine a class, a location, an orientation, a velocity, an intention, a perceptional understanding of the environment, and/or any other information corresponding to an object in the environment.

In another example, radar device 101 may be configured to determine one or more parameters and/or information for one or more operations and/or tasks, e.g., path planning, and/or any other tasks.

In some demonstrative aspects, radar device 101 may be configured to map a scene by measuring targets' echoes (reflectivity) and discriminating them, for example, mainly in range, velocity, azimuth and/or elevation, e.g., as described below.

In some demonstrative aspects, radar device 101 may be configured to detect, and/or sense, one or more objects, which are located in a vicinity, e.g., a far vicinity and/or a near vicinity, of the vehicle 100, and to provide one or more parameters, attributes, and/or information with respect to the objects.

In some demonstrative aspects, the objects may include other vehicles; pedestrians; traffic signs; traffic lights; roads, road elements, e.g., a pavement-road meeting, an edge line; a hazard, e.g., a tire, a box, a crack in the road surface; and/or the like.

In some demonstrative aspects, the one or more parameters, attributes and/or information with respect to the object may include a range of the objects from the vehicle 100, an angle of the object with respect to the vehicle 100, a location of the object with respect to the vehicle 100, a relative speed of the object with respect to vehicle 100, and/or the like.

In some demonstrative aspects, radar device 101 may include a Multiple Input Multiple Output (MIMO) radar device 101, e.g., as described below. In one example, the MIMO radar device may be configured to utilize "spatial filtering" processing, for example, beamforming and/or any other mechanism, for one or both of Transmit (Tx) signals and/or Receive (Rx) signals.

Some demonstrative aspects are described below with respect to a radar device, e.g., radar device 101, implemented as a MIMO radar. However, in other aspects, radar device 101 may be implemented as any other type of radar utilizing a plurality of antenna elements, e.g., a Single Input Multiple Output (SIMO) radar or a Multiple Input Single output (MISO) radar.

Some demonstrative aspects may be implemented with respect to a radar device, e.g., radar device 101, implemented as a MIMO radar, e.g., as described below. However, in other aspects, radar device 101 may be implemented as any other type of radar, for example, an Electronic Beam Steering radar, a Synthetic Aperture Radar (SAR), adaptive and/or cognitive radars that change their transmission according to the environment and/or ego state, a reflect array radar, or the like.

In some demonstrative aspects, radar device 101 may include an antenna arrangement 102, a radar frontend 103 configured to communicate radar signals via the antenna arrangement 102, and a radar processor 104 configured to generate radar information based on the radar signals, e.g., as described below.

In some demonstrative aspects, radar processor 104 may be configured to process radar information of radar device 101 and/or to control one or more operations of radar device 101, e.g., as described below.

In some demonstrative aspects, radar processor 104 may include, or may be implemented, partially or entirely, by circuitry and/or logic, e.g., one or more processors including circuitry and/or logic, memory circuitry and/or logic. Additionally or alternatively, one or more functionalities of radar processor 104 may be implemented by logic, which may be executed by a machine and/or one or more processors, e.g., as described below.

In one example, radar processor 104 may include at least one memory, e.g., coupled to the one or more processors, which may be configured, for example, to store, e.g., at least temporarily, at least some of the information processed by the one or more processors and/or circuitry, and/or which may be configured to store logic to be utilized by the processors and/or circuitry.

In other aspects, radar processor 104 may be implemented by one or more additional or alternative elements of vehicle 100.

In some demonstrative aspects, radar frontend 103 may include, for example, one or more (radar) transmitters, and a one or more (radar) receivers, e.g., as described below.

In some demonstrative aspects, antenna arrangement 102 may include a plurality of antennas to communicate the radar signals. For example, antenna arrangement 102 may include multiple transmit antennas in the form of a transmit antenna array, and multiple receive antennas in the form of a receive antenna array. In another example, antenna arrangement 102 may include one or more antennas used both as transmit and receive antennas. In the latter case, the radar frontend 103, for example, may include a duplexer, e.g., a circuit to separate transmitted signals from received signals.

In some demonstrative aspects, as shown in FIG. 1, the radar frontend 103 and the antenna arrangement 102 may be controlled, e.g., by radar processor 104, to transmit a radio transmit signal 105.

In some demonstrative aspects, as shown in FIG. 1, the radio transmit signal 105 may be reflected by an object 106, resulting in an echo 107.

In some demonstrative aspects, the radar device 101 may receive the echo 107, e.g., via antenna arrangement 102 and radar frontend 103, and radar processor 104 may generate radar information, for example, by calculating information about position, radial velocity (Doppler), and/or direction of the object 106, e.g., with respect to vehicle 100.

In some demonstrative aspects, radar processor 104 may be configured to provide the radar information to a vehicle controller 108 of the vehicle 100, e.g., for autonomous driving of the vehicle 100.

In some demonstrative aspects, at least part of the functionality of radar processor 104 may be implemented as part of vehicle controller 108. In other aspects, the functionality of radar processor 104 may be implemented as part of any other element of radar device 101 and/or vehicle 100. In other aspects, radar processor 104 may be implemented, as a separate part of, or as part of any other element of radar device 101 and/or vehicle 100.

In some demonstrative aspects, vehicle controller 108 may be configured to control one or more functionalities, modes of operation, components, devices, systems and/or elements of vehicle 100.

In some demonstrative aspects, vehicle controller 108 may be configured to control one or more vehicular systems of vehicle 100, e.g., as described below.

In some demonstrative aspects, the vehicular systems may include, for example, a steering system, a braking system, a driving system, and/or any other system of the vehicle 100.

In some demonstrative aspects, vehicle controller 108 may configured to control radar device 101, and/or to process one or parameters, attributes and/or information from radar device 101.

In some demonstrative aspects, vehicle controller 108 may be configured, for example, to control the vehicular systems of the vehicle 100, for example, based on radar information from radar device 101 and/or one or more other sensors of the vehicle 100, e.g., Light Detection and Ranging (LIDAR) sensors, camera sensors, and/or the like.

In one example, vehicle controller 108 may control the steering system, the braking system, and/or any other vehicular systems of vehicle 100, for example, based on the information from radar device 101, e.g., based on one or more objects detected by radar device 101.

In other aspects, vehicle controller 108 may be configured to control any other additional or alternative functionalities of vehicle 100.

Some demonstrative aspects are described herein with respect to a radar device 101 implemented in a vehicle, e.g., vehicle 100. In other aspects a radar device, e.g., radar device 101, may be implemented as part of any other element of a traffic system or network, for example, as part of a road infrastructure, and/or any other element of a traffic network or system. Other aspects may be implemented with respect to any other system, environment and/or apparatus, which may be implemented in any other object, environment, location, or place. For example, radar device 101 may be part of a non-vehicular device, which may be implemented, for example, in an indoor location, a stationary infrastructure outdoors, or any other location.

In some demonstrative aspects, radar device 101 may be configured to support security usage. In one example, radar device 101 may be configured to determine a nature of an operation, e.g., a human entry, an animal entry, an environmental movement, and the like, to identity a threat level of a detected event, and/or any other additional or alternative operations.

Some demonstrative aspects may be implemented with respect to any other additional or alternative devices and/or systems, for example, for a robot, e.g., as described below.

In other aspects, radar device 101 may be configured to support any other usages and/or applications.

Figure 2:
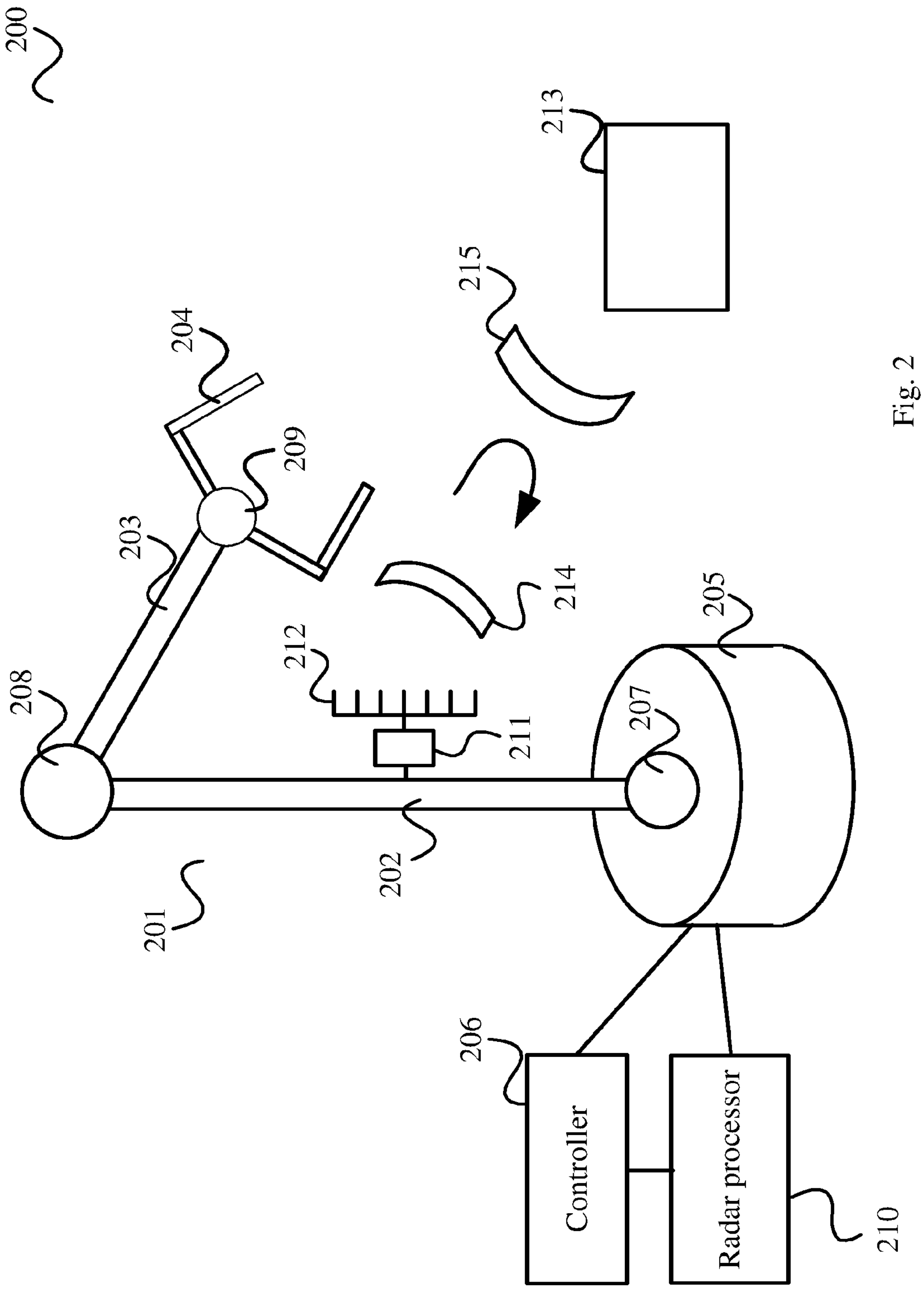
FIG. 2 is a schematic block diagram illustration of a robot implementing a radar, in accordance with some demonstrative aspects.

Reference is now made to FIG. 2, which schematically illustrates a block diagram of a robot 200 implementing a radar, in accordance with some demonstrative aspects.

In some demonstrative aspects, robot 200 may include a robot arm 201. The robot 200 may be implemented, for example, in a factory for handling an object 213, which may be, for example, a part that should be affixed to a product that is being manufactured. The robot arm 201 may include a plurality of movable members, for example, movable members 202, 203, 204, and a support 205. Moving the movable members 202, 203, and/or 204 of the robot arm 201, e.g., by actuation of associated motors, may allow physical interaction with the environment to carry out a task, e.g., handling the object 213.

In some demonstrative aspects, the robot arm 201 may include a plurality of joint elements, e.g., joint elements 207, 208, 209, which may connect, for example, the members 202, 203, and/or 204 with each other, and with the support 205. For example, a joint element 207, 208, 209 may have one or more joints, each of which may provide rotatable motion, e.g., rotational motion, and/or translatory motion, e.g., displacement, to associated members and/or motion of members relative to each other. The movement of the members 202, 203, 204 may be initiated by suitable actuators.

In some demonstrative aspects, the member furthest from the support 205, e.g., member 204, may also be referred to as the end-effector 204 and may include one or more tools, such as, a claw for gripping an object, a welding tool, or the like. Other members, e.g., members 202, 203, closer to the support 205, may be utilized to change the position of the end-effector 204, e.g., in three-dimensional space. For example, the robot arm 201 may be configured to function similarly to a human arm, e.g., possibly with a tool at its end.

In some demonstrative aspects, robot 200 may include a (robot) controller 206 configured to implement interaction with the environment, e.g., by controlling the robot arm's actuators, according to a control program, for example, in order to control the robot arm 201 according to the task to be performed.

In some demonstrative aspects, an actuator may include a component adapted to affect a mechanism or process in response to being driven. The actuator can respond to commands given by the controller 206 (the so-called activation) by performing mechanical movement. This means that an actuator, typically a motor (or electromechanical converter), may be configured to convert electrical energy into mechanical energy when it is activated (i.e. actuated).

In some demonstrative aspects, controller 206 may be in communication with a radar processor 210 of the robot 200.

In some demonstrative aspects, a radar fronted 211 and a radar antenna arrangement 212 may be coupled to the radar processor 210. In one example, radar fronted 211 and/or radar antenna arrangement 212 may be included, for example, as part of the robot arm 201. For example, a location and/or orientation of a radar signal transmission source and/or a radar signal reception sink may be physically moved within the reach of the robot arm. In another example, the source and/or the sink of radar signals may be attached to a non-movable, fixed part of the robot arm, e.g., a base of the robot arm or a stationary part of the arm, or installed in an environment, e.g., in a suitable vicinity of robot arm. In another example, the robot may be an autonomous robot with a robot arm.

In some demonstrative aspects, the radar frontend 211, the radar antenna arrangement 212 and the radar processor 210 may be operable as, and/or may be configured to form, a radar device. For example, antenna arrangement 212 may be configured to perform one or more functionalities of antenna arrangement 102 (FIG. 1), radar frontend 211 may be configured to perform one or more functionalities of radar frontend 103 (FIG. 1), and/or radar processor 210 may be configured to perform one or more functionalities of radar processor 104 (FIG. 1), e.g., as described above.

In some demonstrative aspects, for example, the radar frontend 211 and the antenna arrangement 212 may be controlled, e.g., by radar processor 210, to transmit a radio transmit signal 214.

In some demonstrative aspects, as shown in FIG. 2, the radio transmit signal 214 may be reflected by the object 213, resulting in an echo 215.

In some demonstrative aspects, the echo 215 may be received, e.g., via antenna arrangement 212 and radar frontend 211, and radar processor 210 may generate radar information, for example, by calculating information about position, speed (Doppler) and/or direction of the object 213, e.g., with respect to robot arm 201.

In some demonstrative aspects, radar processor 210 may be configured to provide the radar information to the robot controller 206 of the robot arm 201, e.g., to control robot arm 201. For example, robot controller 206 may be configured to control robot arm 201 based on the radar information, e.g., to grab the object 213 and/or to perform any other operation.

Figure 3:
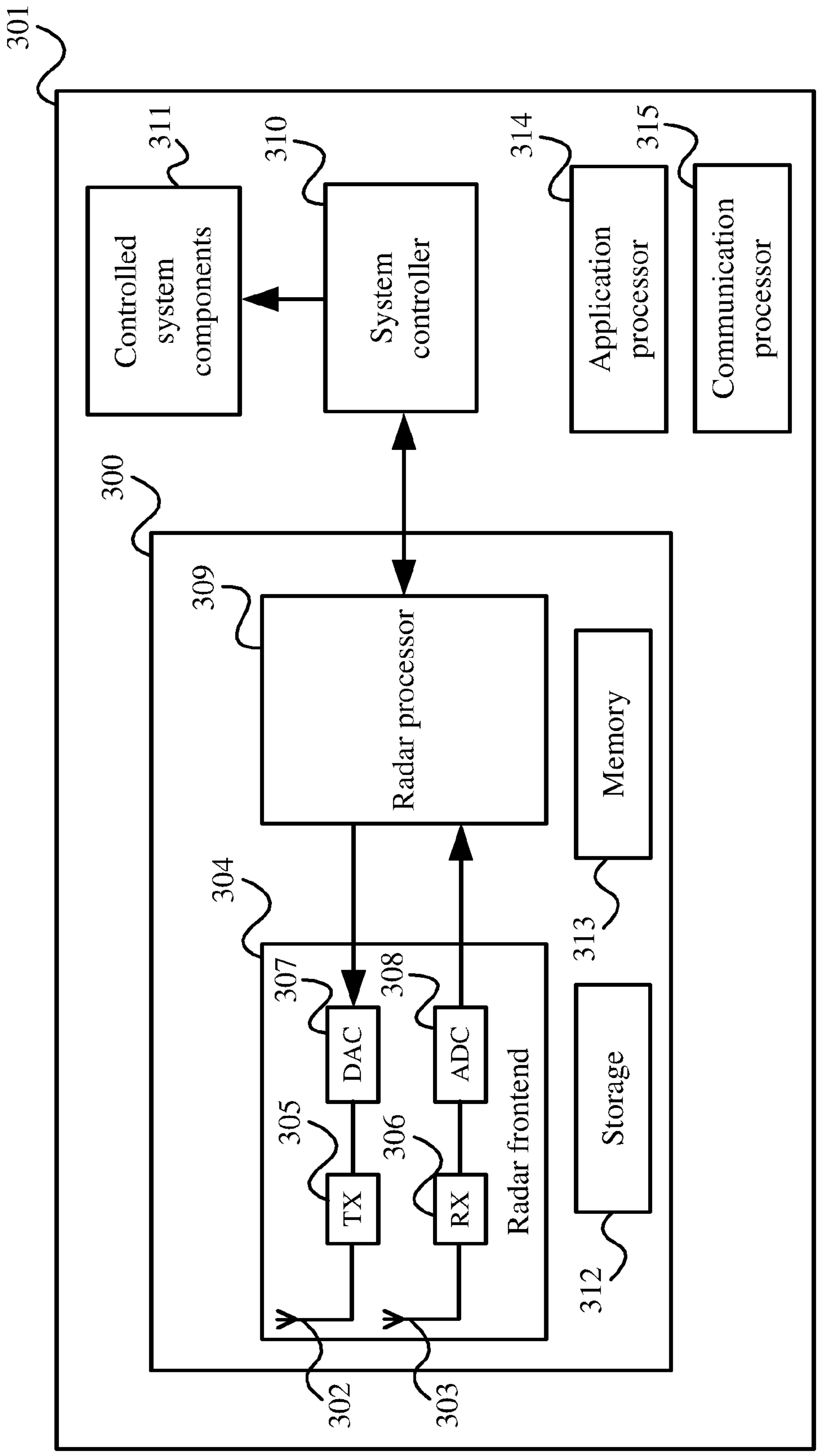
FIG. 3 is a schematic block diagram illustration of a radar apparatus, in accordance with some demonstrative aspects.

Reference is made to FIG. 3, which schematically illustrates a radar apparatus 300, in accordance with some demonstrative aspects.

In some demonstrative aspects, radar apparatus 300 may be implemented as part of a device or system 301, e.g., as described below.

For example, radar apparatus 300 may be implemented as part of, and/or may configured to perform one or more operations and/or functionalities of, the devices or systems described above with reference to FIG. 1 an/or FIG. 2. In other aspects, radar apparatus 300 may be implemented as part of any other device or system 301.

In some demonstrative aspects, radar device 300 may include an antenna arrangement, which may include one or more transmit antennas 302 and one or more receive antennas 303. In other aspects, any other antenna arrangement may be implemented.

In some demonstrative aspects, radar device 300 may include a radar frontend 304, and a radar processor 309.

In some demonstrative aspects, as shown in FIG. 3, the one or more transmit antennas 302 may be coupled with a transmitter (or transmitter arrangement) 305 of the radar frontend 304; and/or the one or more receive antennas 303 may be coupled with a receiver (or receiver arrangement) 306 of the radar frontend 304, e.g., as described below.

In some demonstrative aspects, transmitter 305 may include one or more elements, for example, an oscillator, a power amplifier and/or one or more other elements, configured to generate radio transmit signals to be transmitted by the one or more transmit antennas 302, e.g., as described below.

In some demonstrative aspects, for example, radar processor 309 may provide digital radar transmit data values to the radar frontend 304. For example, radar frontend 304 may include a Digital-to-Analog Converter (DAC) 307 to convert the digital radar transmit data values to an analog transmit signal. The transmitter 305 may convert the analog transmit signal to a radio transmit signal which is to be transmitted by transmit antennas 302.

In some demonstrative aspects, receiver 306 may include one or more elements, for example, one or more mixers, one or more filters and/or one or more other elements, configured to process, down-convert, radio signals received via the one or more receive antennas 303, e.g., as described below.

In some demonstrative aspects, for example, receiver 306 may convert a radio receive signal received via the one or more receive antennas 303 into an analog receive signal. The radar frontend 304 may include an Analog-to-Digital Converter (ADC) 308 to generate digital radar reception data values based on the analog receive signal. For example, radar frontend 304 may provide the digital radar reception data values to the radar processor 309.

In some demonstrative aspects, radar processor 309 may be configured to process the digital radar reception data values, for example, to detect one or more objects, e.g., in an environment of the device/system 301. This detection may include, for example, the determination of information including one or more of range, speed (Doppler), direction, and/or any other information, of one or more objects, e.g., with respect to the system 301.

In some demonstrative aspects, radar processor 309 may be configured to provide the determined radar information to a system controller 310 of device/system 301. For example, system controller 310 may include a vehicle controller, e.g., if device/system 301 includes a vehicular device/system, a robot controller, e.g., if device/system 301 includes a robot device/system, or any other type of controller for any other type of device/system 301.

In some demonstrative aspects, system controller 310 may be configured to control one or more controlled system components 311 of the system 301, e.g. a motor, a brake, steering, and the like, e.g. by one or more corresponding actuators.

In some demonstrative aspects, radar device 300 may include a storage 312 or a memory 313, e.g., to store information processed by radar 300, for example, digital radar reception data values being processed by the radar processor 309, radar information generated by radar processor 309, and/or any other data to be processed by radar processor 309.

In some demonstrative aspects, device/system 301 may include, for example, an application processor 314 and/or a communication processor 315, for example, to at least partially implement one or more functionalities of system controller 310 and/or to perform communication between system controller 310, radar device 300, the controlled system components 311, and/or one or more additional elements of device/system 301.

In some demonstrative aspects, radar device 300 may be configured to generate and transmit the radio transmit signal in a form, which may support determination of range, speed, and/or direction, e.g., as described below.

For example, a radio transmit signal of a radar may be configured to include a plurality of pulses. For example, a pulse transmission may include the transmission of short high-power bursts in combination with times during which the radar device listens for echoes.

For example, in order to more optimally support a highly dynamic situation, e.g., in an automotive scenario, a continuous wave (CW) may instead be used as the radio transmit signal. However, a continuous wave, e.g., with constant frequency, may support velocity determination, but may not allow range determination, e.g., due to the lack of a time mark that could allow distance calculation.

In some demonstrative aspects, radio transmit signal 105 (FIG. 1) may be transmitted according to technologies such as, for example, Frequency-Modulated continuous wave (FMCW) radar, Phase-Modulated Continuous Wave (PMCW) radar, Orthogonal Frequency Division Multiplexing (OFDM) radar, and/or any other type of radar technology, which may support determination of range, velocity, and/or direction, e.g., as described below.

Figure 4:
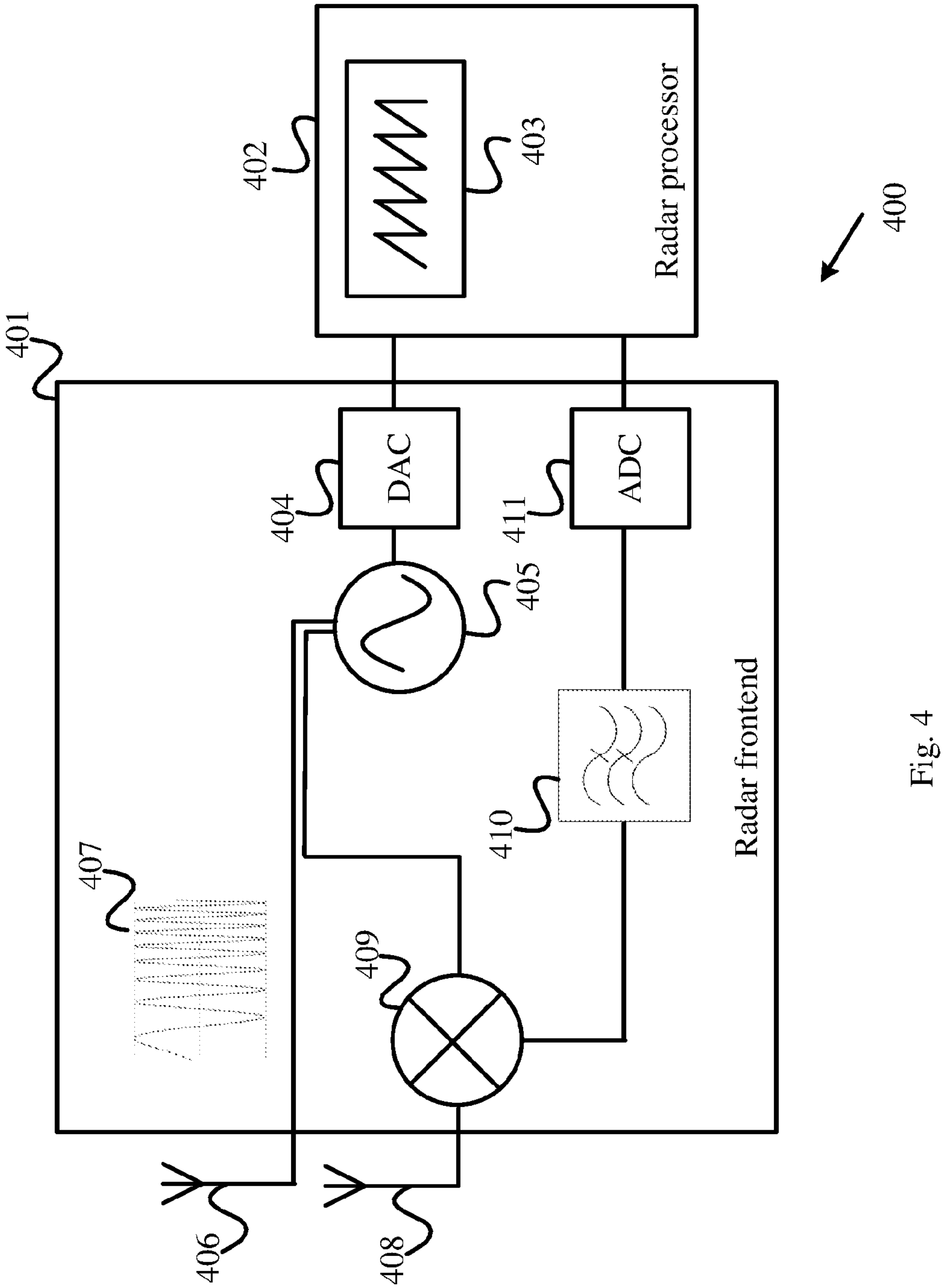
FIG. 4 is a schematic block diagram illustration of a Frequency-Modulated Continuous Wave (FMCW) radar apparatus, in accordance with some demonstrative aspects.

Reference is made to FIG. 4, which schematically illustrates a FMCW radar apparatus, in accordance with some demonstrative aspects.

In some demonstrative aspects, FMCW radar device 400 may include a radar frontend 401, and a radar processor 402. For example, radar frontend 304 (FIG. 3) may include one or more elements of, and/or may perform one or more operations and/or functionalities of, radar frontend 401; and/or radar processor 309 (FIG. 3) may include one or more elements of, and/or may perform one or more operations and/or functionalities of, radar processor 402.

In some demonstrative aspects, FMCW radar device 400 may be configured to communicate radio signals according to an FMCW radar technology, e.g., rather than sending a radio transmit signal with a constant frequency.

In some demonstrative aspects, radio frontend 401 may be configured to ramp up and reset the frequency of the transmit signal, e.g., periodically, for example, according to a saw tooth waveform 403. In other aspects, a triangle waveform, or any other suitable waveform may be used.

In some demonstrative aspects, for example, radar processor 402 may be configured to provide waveform 403 to frontend 401, for example, in digital form, e.g., as a sequence of digital values.

In some demonstrative aspects, radar frontend 401 may include a DAC 404 to convert waveform 403 into analog form, and to supply it to a voltage-controlled oscillator 405. For example, oscillator 405 may be configured to generate an output signal, which may be frequency-modulated in accordance with the waveform 403.

In some demonstrative aspects, oscillator 405 may be configured to generate the output signal including a radio transmit signal, which may be fed to and sent out by one or more transmit antennas 406.

In some demonstrative aspects, the radio transmit signal generated by the oscillator 405 may have the form of a sequence of chirps 407, which may be the result of the modulation of a sinusoid with the saw tooth waveform 403.

In one example, a chirp 407 may correspond to the sinusoid of the oscillator signal frequency-modulated by a "tooth" of the saw tooth waveform 403, e.g., from the minimum frequency to the maximum frequency.

In some demonstrative aspects, FMCW radar device 400 may include one or more receive antennas 408 to receive a radio receive signal. The radio receive signal may be based on the echo of the radio transmit signal, e.g., in addition to any noise, interference, or the like.

In some demonstrative aspects, radar frontend 401 may include a mixer 409 to mix the radio transmit signal with the radio receive signal into a mixed signal.

In some demonstrative aspects, radar frontend 401 may include a filter, e.g., a Low Pass Filter (LPF) 410, which may be configured to filter the mixed signal from the mixer 409 to provide a filtered signal. For example, radar frontend 401 may include an ADC 411 to convert the filtered signal into digital reception data values, which may be provided to radar processor 402. In another example, the filter 410 may be a digital filter, and the ADC 411 may be arranged between the mixer 409 and the filter 410.

In some demonstrative aspects, radar processor 402 may be configured to process the digital reception data values to provide radar information, for example, including range, speed (velocity/Doppler), and/or direction (AoA) information of one or more objects.

In some demonstrative aspects, radar processor 402 may be configured to perform a first Fast Fourier Transform (FFT) (also referred to as "range FFT") to extract a delay response, which may be used to extract range information, and/or a second FFT (also referred to as "Doppler FFT") to extract a Doppler shift response, which may be used to extract velocity information, from the digital reception data values.

In other aspects, any other additional or alternative methods may be utilized to extract range information. In one example, in a digital radar implementation, a correlation with the transmitted signal may be used, e.g., according to a matched filter implementation.

Figure 5:
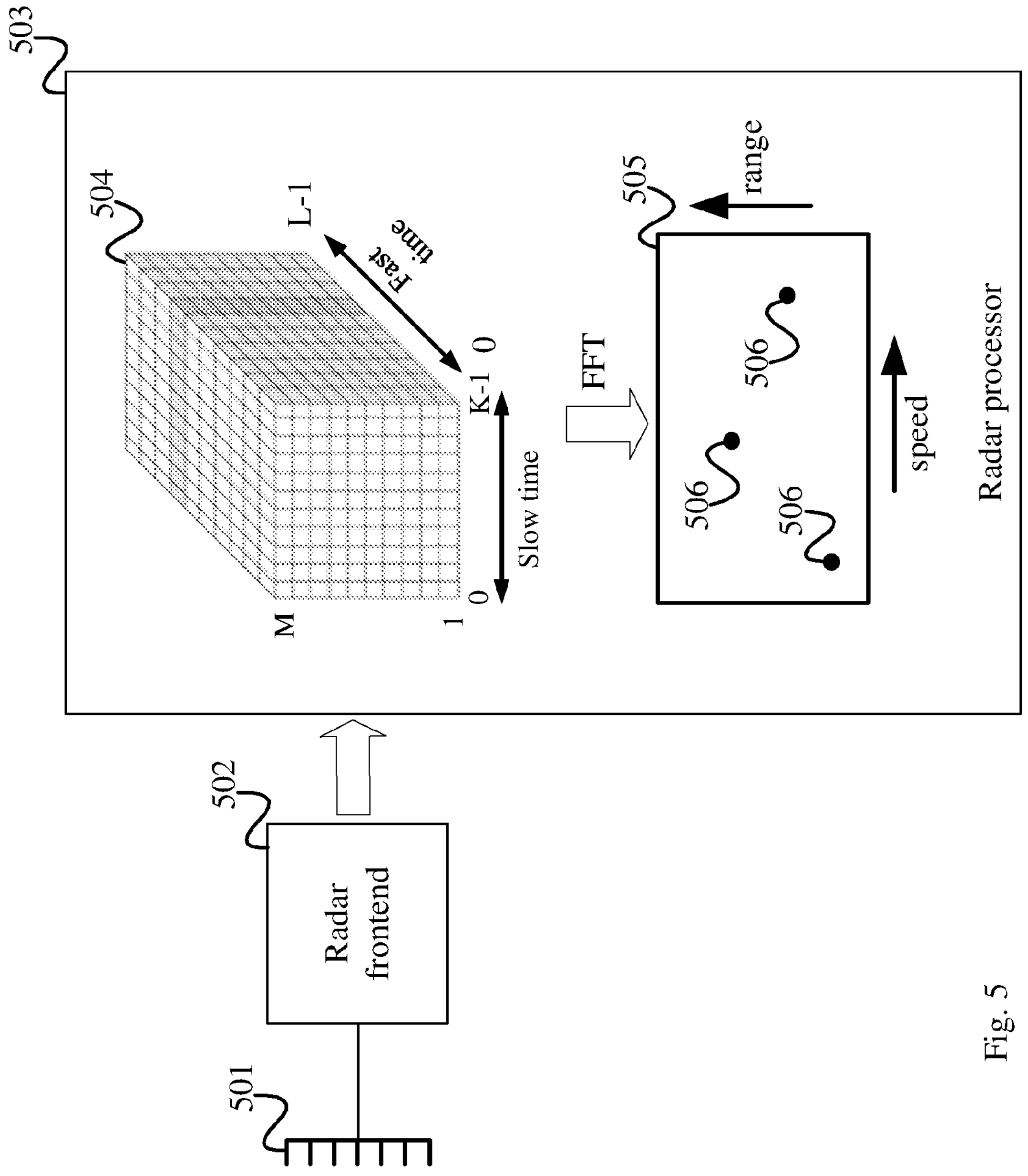
FIG. 5 is a schematic illustration of an extraction scheme, which may be implemented to extract range and speed (Doppler) estimations from digital reception radar data values, in accordance with some demonstrative aspects.

Reference is made to FIG. 5, which schematically illustrates an extraction scheme, which may be implemented to extract range and speed (Doppler) estimations from digital reception radar data values, in accordance with some demonstrative aspects. For example, radar processor 104 (FIG. 1), radar processor 210 (FIG. 2), radar processor 309 (FIG. 3), and/or radar processor 402 (FIG. 4), may be configured to extract range and/or speed (Doppler) estimations from digital reception radar data values according to one or more aspects of the extraction scheme of FIG. 5.

In some demonstrative aspects, as shown in FIG. 5, a radio receive signal, e.g., including echoes of a radio transmit signal, may be received by a receive antenna array 501. The radio receive signal may be processed by a radio radar frontend 502 to generate digital reception data values, e.g., as described above. The radio radar frontend 502 may provide the digital reception data values to a radar processor 503, which may process the digital reception data values to provide radar information, e.g., as described above.

In some demonstrative aspects, the digital reception data values may be represented in the form of a data cube 504. For example, the data cube 504 may include digitized samples of the radio receive signal, which is based on a radio signal transmitted from a transmit antenna and received by M receive antennas. In some demonstrative aspects, for example, with respect to a MIMO implementation, there may be multiple transmit antennas, and the number of samples may be multiplied accordingly.

In some demonstrative aspects, a layer of the data cube 504, for example, a horizontal layer of the data cube 504, may include samples of an antenna, e.g., a respective antenna of the M antennas.

In some demonstrative aspects, data cube 504 may include samples for K chirps. For example, as shown in FIG. 5, the samples of the chirps may be arranged in a so-called "slow time"-direction.

In some demonstrative aspects, the data cube 504 may include L samples, e.g., L=512 or any other number of samples, for a chirp, e.g., per each chirp. For example, as shown in FIG. 5, the samples per chirp may be arranged in a so-called "fast time"-direction of the data cube 504.

In some demonstrative aspects, radar processor 503 may be configured to process a plurality of samples, e.g., L samples collected for each chirp and for each antenna, by a first FFT. The first FFT may be performed, for example, for each chirp and each antenna, such that a result of the processing of the data cube 504 by the first FFT may again have three dimensions, and may have the size of the data cube 504 while including values for L range bins, e.g., instead of the values for the L sampling times.

In some demonstrative aspects, radar processor 503 may be configured to process the result of the processing of the data cube 504 by the first FFT, for example, by processing the result according to a second FFT along the chirps, e.g., for each antenna and for each range bin.

For example, the first FFT may be in the "fast time" direction, and the second FFT may be in the "slow time" direction.

In some demonstrative aspects, the result of the second FFT may provide, e.g., when aggregated over the antennas, a range/Doppler (R/D) map 505. The R/D map may have FFT peaks 506, for example, including peaks of FFT output values (in terms of absolute values) for certain range/speed combinations, e.g., for range/Doppler bins. For example, a range/Doppler bin may correspond to a range bin and a Doppler bin. For example, radar processor 503 may consider a peak as potentially corresponding to an object, e.g., of the range and speed corresponding to the peak's range bin and speed bin.

In some demonstrative aspects, the extraction scheme of FIG. 5 may be implemented for an FMCW radar, e.g., FMCW radar 400 (FIG. 4), as described above. In other aspects, the extraction scheme of FIG. 5 may be implemented for any other radar type. In one example, the radar processor 503 may be configured to determine a range/Doppler map 505 from digital reception data values of a PMCW radar, an OFDM radar, or any other radar technologies. For example, in adaptive or cognitive radar, the pulses in a frame, the waveform and/or modulation may be changed over time, e.g., according to the environment.

Referring back to FIG. 3, in some demonstrative aspects, receive antenna arrangement 303 may be implemented using a receive antenna array having a plurality of receive antennas (or receive antenna elements). For example, radar processor 309 may be configured to determine an angle of arrival of the received radio signal, e.g., echo 107 (FIG. 1) and/or echo 215 (FIG. 2). For example, radar processor 309 may be configured to determine a direction of a detected object, e.g., with respect to the device/system 301, for example, based on the angle of arrival of the received radio signal, e.g., as described below.

Figure 6:
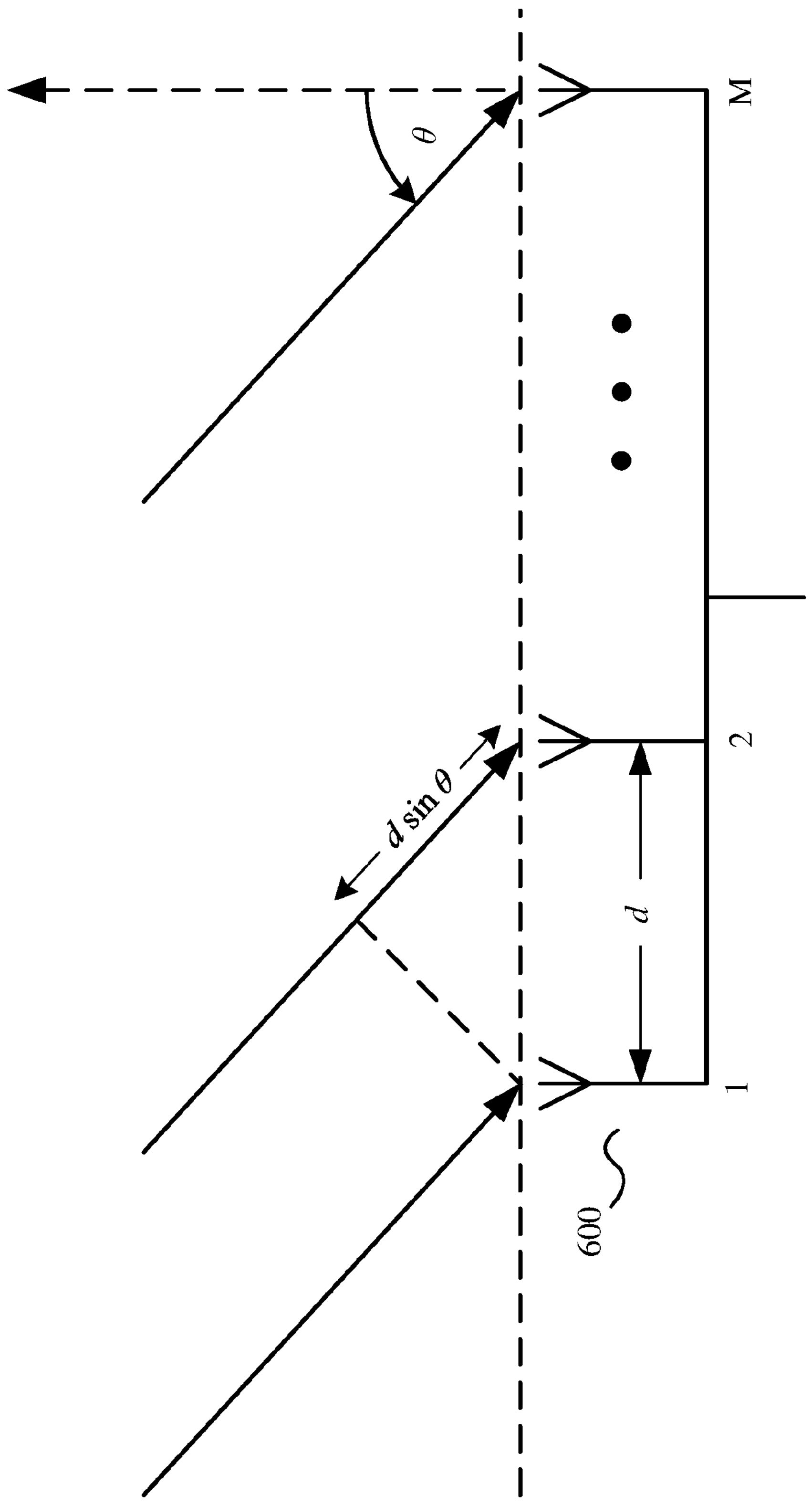
FIG. 6 is a schematic illustration of an angle-determination scheme, which may be implemented to determine Angle of Arrival (AoA) information based on an incoming radio signal received by a receive antenna array, in accordance with some demonstrative aspects.

Reference is made to FIG. 6, which schematically illustrates an angle-determination scheme, which may be implemented to determine Angle of Arrival (AoA) information based on an incoming radio signal received by a receive antenna array 600, in accordance with some demonstrative aspects.

FIG. 6 depicts an angle-determination scheme based on received signals at the receive antenna array. In some demonstrative aspects, for example, in a virtual MIMO array, the angle-determination may also be based on the signals transmitted by the array of Tx antennas.

FIG. 6 depicts a one-dimensional angle-determination scheme. Other multi-dimensional angle determination schemes, e.g., a two-dimensional scheme or a three-dimensional scheme, may be implemented.

In some demonstrative aspects, as shown in FIG. 6, the receive antenna array 600 may include M antennas (numbered, from left to right, 1 to M).

As shown by the arrows in FIG. 6, it is assumed that an echo is coming from an object located at the top left direction. Accordingly, the direction of the echo, e.g., the incoming radio signal, may be towards the bottom right. According to this example, the further to the left a receive antenna is located, the earlier it will receive a certain phase of the incoming radio signal.

For example, a phase difference, denoted $\Delta\varphi$, between two antennas of the receive antenna array 600 may be determined, e.g., as follows:

$$\Delta\varphi = \frac{2\pi}{\lambda} \cdot d \cdot \sin(\theta)$$

wherein $\lambda$ denotes a wavelength of the incoming radio signal, d denotes a distance between the two antennas, and $\theta$ denotes an angle of arrival of the incoming radio signal, e.g., with respect to a normal direction of the array.

In some demonstrative aspects, radar processor 309 (FIG. 3) may be configured to utilize this relationship between phase and angle of the incoming radio signal, for example, to determine the angle of arrival of echoes, for example by performing an FFT, e.g., a third FFT ("angular FFT") over the antennas.

In some demonstrative aspects, multiple transmit antennas, e.g., in the form of an antenna array having multiple transmit antennas, may be used, for example, to increase the spatial resolution, e.g., to provide high-resolution radar information. For example, a MIMO radar device may utilize a virtual MIMO radar antenna, which may be formed as a convolution of a plurality of transmit antennas convolved with a plurality of receive antennas.

Figure 7:
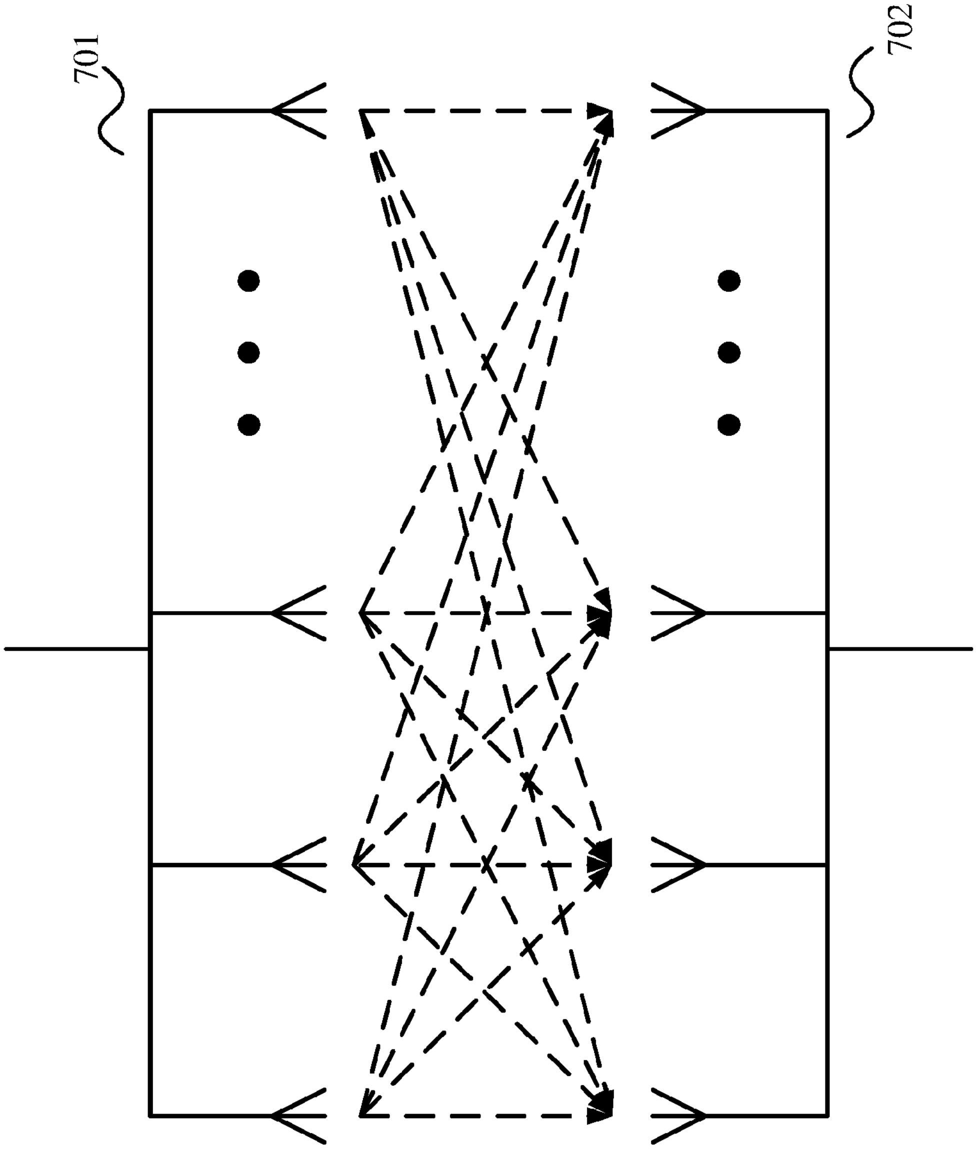
FIG. 7 is a schematic illustration of a Multiple-Input-Multiple-Output (MIMO) radar antenna scheme, which may be implemented based on a combination of Transmit (Tx) and Receive (Rx) antennas, in accordance with some demonstrative aspects.

Reference is made to FIG. 7, which schematically illustrates a MIMO radar antenna scheme, which may be implemented based on a combination of Transmit (Tx) and Receive (Rx) antennas, in accordance with some demonstrative aspects.

In some demonstrative aspects, as shown in FIG. 7, a radar MIMO arrangement may include a transmit antenna array 701 and a receive antenna array 702. For example, the one or more transmit antennas 302 (FIG. 3) may be implemented to include transmit antenna array 701, and/or the one or more receive antennas 303 (FIG. 3) may be implemented to include receive antenna array 702.

In some demonstrative aspects, antenna arrays including multiple antennas both for transmitting the radio transmit signals and for receiving echoes of the radio transmit signals, may be utilized to provide a plurality of virtual channels as illustrated by the dashed lines in FIG. 7. For example, a virtual channel may be formed as a convolution, for example, as a Kronecker product, between a transmit antenna and a receive antenna, e.g., representing a virtual steering vector of the MIMO radar.

In some demonstrative aspects, a transmit antenna, e.g., each transmit antenna, may be configured to send out an individual radio transmit signal, e.g., having a phase associated with the respective transmit antenna.

For example, an array of N transmit antennas and M receive antennas may be implemented to provide a virtual MIMO array of size N×M. For example, the virtual MIMO array may be formed according to the Kronecker product operation applied to the Tx and Rx steering vectors.

Figure 8:
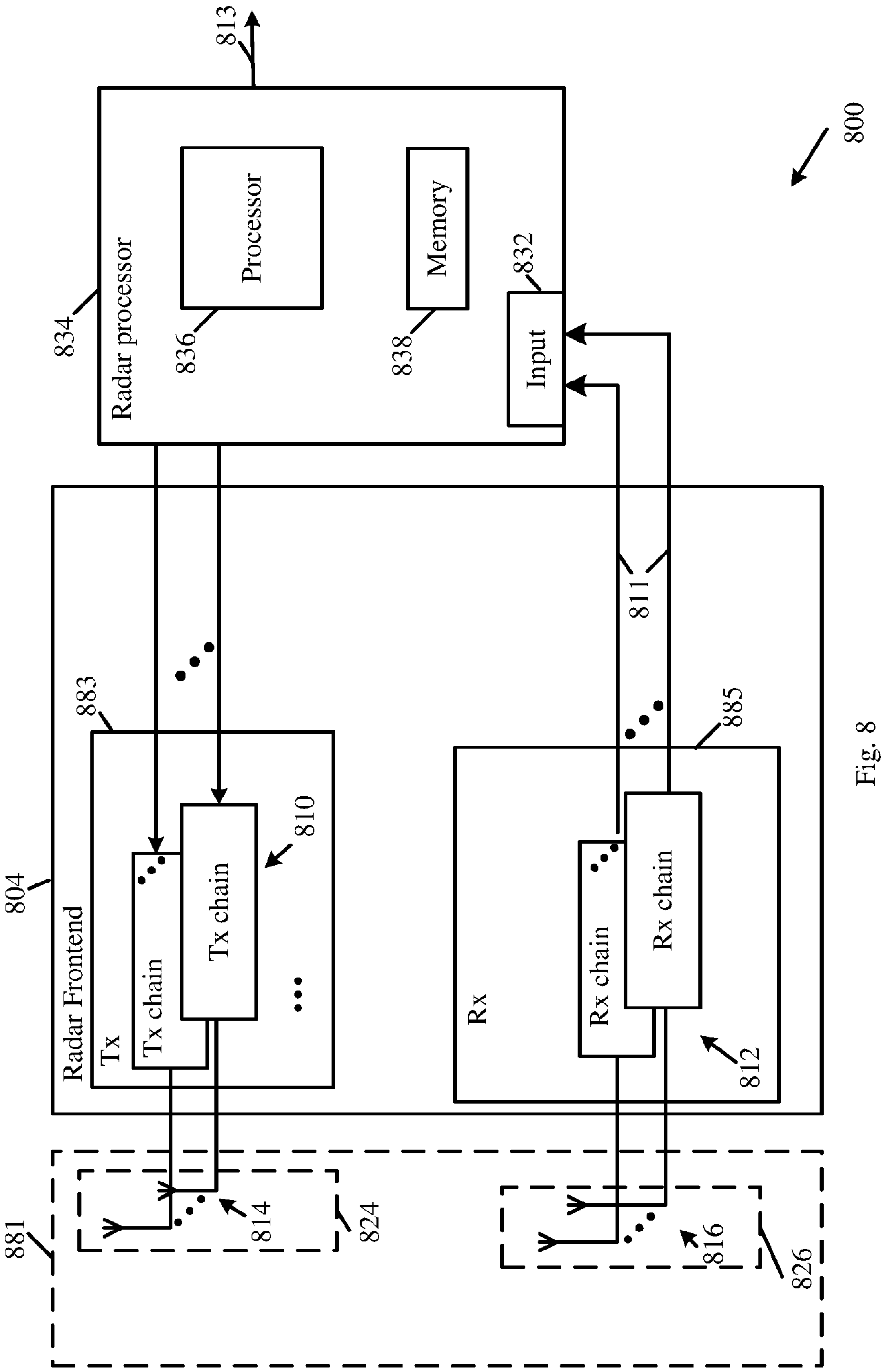
FIG. 8 is a schematic block diagram illustration of elements of a radar device including a radar frontend and a radar processor, in accordance with some demonstrative aspects.

FIG. 8 is a schematic block diagram illustration of elements of a radar device 800, in accordance with some demonstrative aspects. For example, radar device 101 (FIG. 1), radar device 300 (FIG. 3), and/or radar device 400 (FIG. 4), may include one or more elements of radar device 800, and/or may perform one or more operations and/or functionalities of radar device 800.

In some demonstrative aspects, as shown in FIG. 8, radar device 800 may include a radar frontend 804 and a radar processor 834. For example, radar frontend 103 (FIG. 1), radar frontend 211 (FIG. 1), radar frontend 304 (FIG. 3), radar frontend 401 (FIG. 4), and/or radar frontend 502 (FIG. 5), may include one or more elements of radar frontend 804, and/or may perform one or more operations and/or functionalities of radar frontend 804.

In some demonstrative aspects, radar frontend 804 may be implemented as part of a MIMO radar utilizing a MIMO radar antenna 881 including a plurality of Tx antennas 814 configured to transmit a plurality of Tx RF signals (also referred to as "Tx radar signals"); and a plurality of Rx antennas 816 configured to receive a plurality of Rx RF signals (also referred to as "Rx radar signals"), for example, based on the Tx radar signals, e.g., as described below.

In some demonstrative aspects, MIMO antenna array 881, antennas 814, and/or antennas 816 may include or may be part of any type of antennas suitable for transmitting and/or receiving radar signals. For example, MIMO antenna array 881, antennas 814, and/or antennas 816, may be implemented as part of any suitable configuration, structure, and/or arrangement of one or more antenna elements, components, units, assemblies, and/or arrays. For example, MIMO antenna array 881, antennas 814, and/or antennas 816, may be implemented as part of a phased array antenna, a multiple element antenna, a set of switched beam antennas, and/or the like. In some aspects, MIMO antenna array 881, antennas 814, and/or antennas 816, may be implemented to support transmit and receive functionalities using separate transmit and receive antenna elements. In some aspects, MIMO antenna array 881, antennas 814, and/or antennas 816, may be implemented to support transmit and receive functionalities using common and/or integrated transmit/receive elements.

In some demonstrative aspects, MIMO radar antenna 881 may include a rectangular MIMO antenna array, and/or curved array, e.g., shaped to fit a vehicle design. In other aspects, any other form, shape and/or arrangement of MIMO radar antenna 881 may be implemented.

In some demonstrative aspects, radar frontend 804 may include one or more radios configured to generate and transmit the Tx RF signals via Tx antennas 814; and/or to process the Rx RF signals received via Rx antennas 816, e.g., as described below.

In some demonstrative aspects, radar frontend 804 may include at least one transmitter (Tx) 883 including circuitry and/or logic configured to generate and/or transmit the Tx radar signals via Tx antennas 814.

In some demonstrative aspects, radar frontend 804 may include at least one receiver (Rx) 885 including circuitry and/or logic to receive and/or process the Rx radar signals received via Rx antennas 816, for example, based on the Tx radar signals.

In some demonstrative aspects, transmitter 883, and/or receiver 885 may include circuitry; logic; Radio Frequency (RF) elements, circuitry and/or logic; baseband elements, circuitry and/or logic; modulation elements, circuitry and/or logic; demodulation elements, circuitry and/or logic; amplifiers; analog to digital and/or digital to analog converters; filters; and/or the like.

In some demonstrative aspects, transmitter 883 may include a plurality of Tx chains 810 configured to generate and transmit the Tx RF signals via Tx antennas 814, e.g., respectively; and/or receiver 885 may include a plurality of Rx chains 812 configured to receive and process the Rx RF signals received via the Rx antennas 816, e.g., respectively.

In some demonstrative aspects, radar processor 834 may be configured to generate radar information 813, for example, based on the radar signals communicated by MIMO radar antenna 881, e.g., as described below. For example, radar processor 104 (FIG. 1), radar processor 210 (FIG. 2), radar processor 309 (FIG. 3), radar processor 402 (FIG. 4), and/or radar processor 503 (FIG. 5), may include one or more elements of radar processor 834, and/or may perform one or more operations and/or functionalities of radar processor 834.

In some demonstrative aspects, radar processor 834 may be configured to generate radar information 813, for example, based on radar Rx data 811 received from the plurality of Rx chains 812. For example, radar Rx data 811 may be based on the radar Rx signals received via the Rx antennas 816.

In some demonstrative aspects, radar processor 834 may include an input 832 to receive radar input data, e.g., including the radar Rx data 811 from the plurality of Rx chains 812.

In some demonstrative aspects, radar processor 834 may include, or may be implemented, partially or entirely, by circuitry and/or logic, e.g., one or more processors including circuitry and/or logic, memory circuitry and/or logic. Additionally or alternatively, one or more functionalities of radar processor 834 may be implemented by logic, which may be executed by a machine and/or one or more processors, e.g., as described below.

In some demonstrative aspects, radar processor 834 may include at least one processor 836, which may be configured, for example, to process the radar Rx data 811, and/or to perform one or more operations, methods, and/or algorithms.

In some demonstrative aspects, radar processor 834 may include at least one memory 838, e.g., coupled to the processor 836. For example, memory 838 may be configured to store data processed by radar processor 834. For example, memory 838 may store, e.g., at least temporarily, at least some of the information processed by the processor 836, and/or logic to be utilized by the processor 836.

In some demonstrative aspects, memory 838 may be configured to store at least part of the radar data, e.g., some of the radar Rx data or all of the radar Rx data, for example, for processing by processor 836, e.g., as described below.

In some demonstrative aspects, memory 838 may be configured to store processed data, which may be generated by processor 836, for example, during the process of generating the radar information 813, e.g., as described below.

In some demonstrative aspects, memory 838 may be configured to store range information and/or Doppler information, which may be generated by processor 836, for example, based on the radar Rx data, e.g., as described below. In one example, the range information and/or Doppler information may be determined based on a Cross-Correlation (XCORR) operation, which may be applied to the radar Rx data. Any other additional or alternative operation, algorithm and/or procedure may be utilized to generate the range information and/or Doppler information.

In some demonstrative aspects, memory 838 may be configured to store AoA information, which maybe generated by processor 836, for example, based on the radar Rx data, the range information and/or Doppler information, e.g., as described below. In one example, the AoA information may be determined based on an AoA estimation algorithm. Any other additional or alternative operation, algorithm and/or procedure may be utilized to generate the AoA information.

In some demonstrative aspects, radar processor 834 may be configured to generate the radar information 813 including one or more of range information, Doppler information, and/or AoA information, e.g., as described below.

In some demonstrative aspects, the radar information 813 may include Point Cloud 1 (PC1) information, for example, including raw point cloud estimations, e.g., Range, Radial Velocity, Azimuth and/or Elevation.

In some demonstrative aspects, the radar information 813 may include Point Cloud 2 (PC2) information, which may be generated, for example, based on the PC1 information. For example, the PC2 information may include clustering information, tracking information, e.g., tracking of probabilities and/or density functions, bounding box information, classification information, orientation information, and the like.

In some demonstrative aspects, radar processor 834 may be configured to generate the radar information 813 in the form of four Dimensional (4D) image information, e.g., a cube, which may represent 4D information corresponding to one or more detected targets.

In some demonstrative aspects, the 4D image information may include, for example, range values, e.g., based on the range information, velocity values, e.g., based on the Doppler information, azimuth values, e.g., based on azimuth AoA information, elevation values, e.g., based on elevation AoA information, and/or any other values.

In some demonstrative aspects, radar processor 834 may be configured to generate the radar information 813 in any other form, and/or including any other additional or alternative information.

In some demonstrative aspects, radar processor 834 may be configured to process the signals communicated via MIMO radar antenna 881 as signals of a virtual MIMO array formed by a convolution of the plurality of Rx antennas 816 and the plurality of Tx antennas 814.

In some demonstrative aspects, radar frontend 804 and/or radar processor 834 may be configured to utilize MIMO techniques, for example, to support a reduced physical array aperture, e.g., an array size, and/or utilizing a reduced number of antenna elements. For example, radar frontend 804 and/or radar processor 834 may be configured to transmit orthogonal signals via one or more Tx arrays 824 including a plurality of N elements, e.g., Tx antennas 814, and processing received signals via one or more Rx arrays 826 including a plurality of M elements, e.g., Rx antennas 816.

In some demonstrative aspects, utilizing the MIMO technique of transmission of the orthogonal signals from the Tx arrays 824 with N elements and processing the received signals in the Rx arrays 826 with M elements may be equivalent, e.g., under a far field approximation, to a radar utilizing transmission from one antenna and reception with N*M antennas. For example, radar frontend 804 and/or radar processor 834 may be configured to utilize MIMO antenna array 881 as a virtual array having an equivalent array size of N*M, which may define locations of virtual elements, for example, as a convolution of locations of physical elements, e.g., the antennas 814 and/or 816.

In some demonstrative aspects, a radar system may include a plurality of radar devices 800. For example, vehicle 100 (FIG. 1) may include a plurality of radar devices 800, e.g., as described below.

Figure 9:
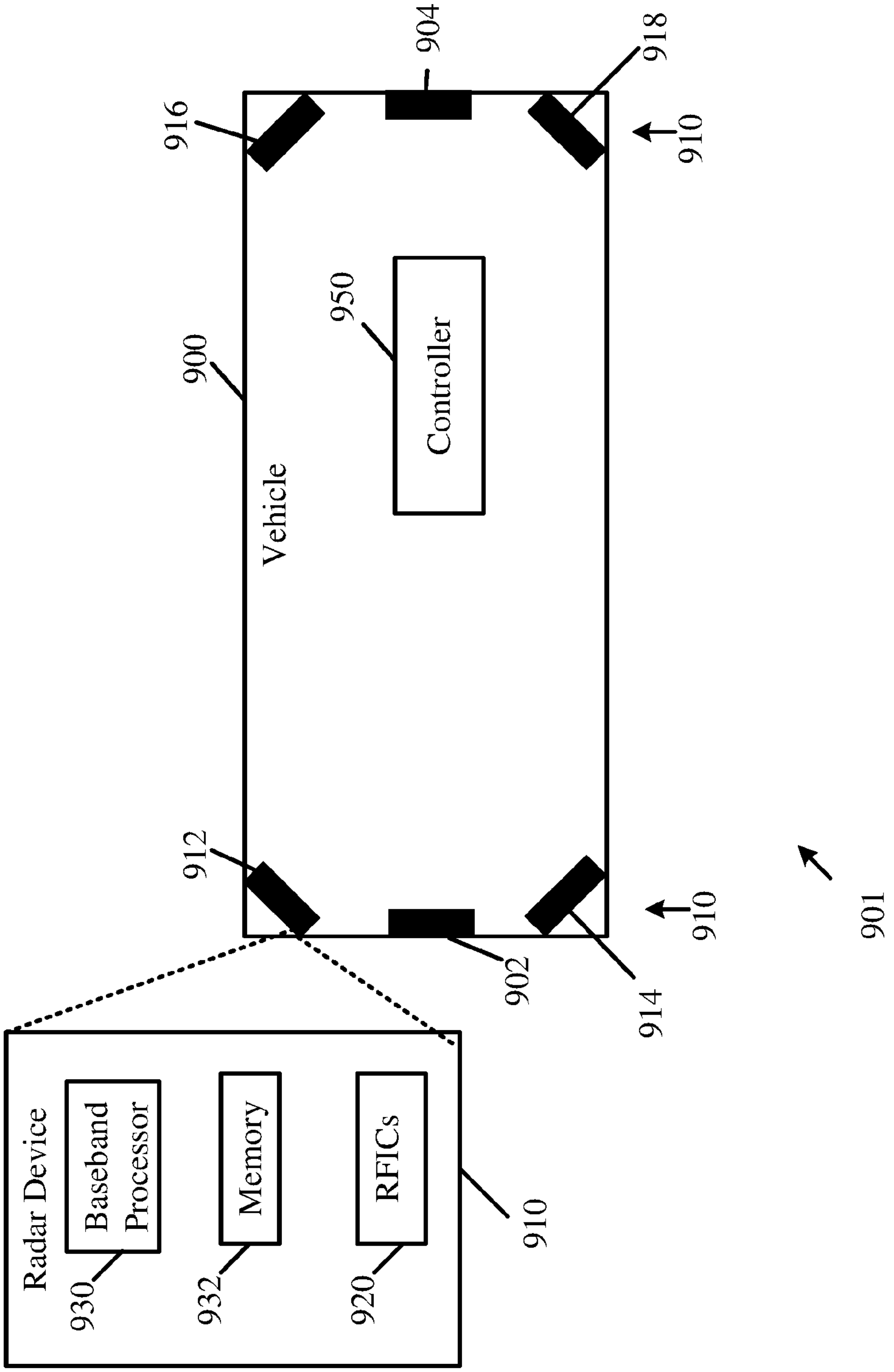
FIG. 9 is a schematic illustration of a radar system including a plurality of radar devices implemented in a vehicle, in accordance with some demonstrative aspects.

Reference is made to FIG. 9, which schematically illustrates a radar system 901 including a plurality of radar devices 910 implemented in a vehicle 900, in accordance with some demonstrative aspects.

In some demonstrative aspects, as shown in FIG. 9, the plurality of radar devices 910 may be located, for example, at a plurality of positions around vehicle 900, for example, to provide radar sensing at a large field of view around vehicle 900, e.g., as described below.

In some demonstrative aspects, as shown in FIG. 9, the plurality of radar devices 910 may include, for example, six radar devices 910, e.g., as described below.

In some demonstrative aspects, the plurality of radar devices 910 may be located, for example, at a plurality of positions around vehicle 900, which may be configured to support 360-degrees radar sensing, e.g., a field of view of 360 degrees surrounding the vehicle 900, e.g., as described below.

In one example, the 360-degrees radar sensing may allow to provide a radar-based view of substantially all surroundings around vehicle 900, e.g., as described below.

In other aspects, the plurality of radar devices 910 may include any other number of radar devices 910, e.g., less than six radar devices or more than six radar devices.

In other aspects, the plurality of radar devices 910 may be positioned at any other locations and/or according to any other arrangement, which may support radar sensing at any other field of view around vehicle 900, e.g., 360-degrees radar sensing or radar sensing of any other field of view.

For example, the plurality of radar devices 910 may be positioned at one or more locations, e.g., at one or more heights, for example, at different height locations, e.g., at a bumper height, a headlight height, a Facia center/top corners/roof height, and/or any other location.

In some demonstrative aspects, as shown in FIG. 9, vehicle 900 may include a first radar device 902, e.g., a front radar device, at a front-side of vehicle 900.

In some demonstrative aspects, as shown in FIG. 9, vehicle 900 may include a second radar device 904, e.g., a back radar device, at a back-side of vehicle 900.

In some demonstrative aspects, as shown in FIG. 9, vehicle 900 may include one or more of radar devices at one or more respective corners of vehicle 900. For example, vehicle 900 may include a first corner radar device 912 at a first corner of vehicle 900, a second corner radar device 914 at a second corner of vehicle 900, a third corner radar device 916 at a third corner of vehicle 900, and/or a fourth corner radar device 918 at a fourth corner of vehicle 900.

In some demonstrative aspects, vehicle 900 may include one, some, or all, of the plurality of radar devices 910 shown in FIG. 9. For example, vehicle 900 may include the front radar device 902 and/or back radar device 904.

In other aspects, vehicle 900 may include any other additional or alternative radar devices, for example, at any other additional or alternative positions around vehicle 900. In one example, vehicle 900 may include a side radar, e.g., on a side of vehicle 900.

In some demonstrative aspects, as shown in FIG. 9, vehicle 900 may include a radar system controller 950 configured to control one or more, e.g., some or all, of the radar devices 910.

In some demonstrative aspects, at least part of the functionality of radar system controller 950 may be implemented by a dedicated controller, e.g., a dedicated system controller or central controller, which may be separate from the radar devices 910, and may be configured to control some or all of the radar devices 910.

In some demonstrative aspects, at least part of the functionality of radar system controller 950 may be implemented as part of at least one radar device 910.

In one example, at least part of the functionality of system controller 950 may be implemented, e.g., in a centralized manner, for example, as part of a single radar device 910 of the plurality of radar devices 910.

In another example, at least part of the functionality of radar system controller 950 may be implemented, e.g., in a distributed manner, for example, as part of two or more radar device 910 of the plurality of radar devices 910. For example, at least part of the functionality of system controller 950 may be distributed between some or all of the radar devices 910.

In some demonstrative aspects, at least part of the functionality of radar system controller 950 may be implemented by a radar processor of at least one of the radar devices 910. For example, radar processor 834 (FIG. 8) may include one or more elements of radar system controller 950, and/or may perform one or more operations and/or functionalities of radar system controller 950.

In some demonstrative aspects, at least part of the functionality of radar system controller 950 may be implemented by a system controller of vehicle 900. For example, vehicle controller 108 (FIG. 1) may include one or more elements of radar system controller 950, and/or may perform one or more operations and/or functionalities of radar system controller 950.

In other aspects, one or more functionalities of system controller 950 may be implemented as part of any other element of vehicle 900.

In some demonstrative aspects, as shown in FIG. 9, a radar device 910 of the plurality of radar devices 910, e.g., each radar device 910, may include a baseband processor 930 (also referred to as a "Baseband Processing Unit (BPU) "), which may be configured to control communication of radar signals by the radar device 910, and/or to process radar signals communicated by the radar device 910. For example, baseband processor 930 may include one or more elements of radar processor 834 (FIG. 8), and/or may perform one or more operations and/or functionalities of radar processor 834 (FIG. 8).

In some demonstrative aspects, baseband processor 930 may include one or more components and/or elements configured for digital processing of radar signals communicated by the radar device 910, e.g., as described below.

In some demonstrative aspects, baseband processor 930 may include one or more FFT engines, matrix multiplication engines, DSP processors, and/or any other additional or alternative baseband, e.g., digital, processing components.

In some demonstrative aspects, as shown in FIG. 9, radar device 910 may include a memory 932, which may be configured to store data processed by, and/or to be processed by, baseband processor 910. For example, memory 932 may include one or more elements of memory 838 (FIG. 8), and/or may perform one or more operations and/or functionalities of memory 838 (FIG. 8).

In some demonstrative aspects, memory 932 may include an internal memory, and/or an interface to one or more external memories, e.g., an external Double Data Rate (DDR) memory, and/or any other type of memory.

In some demonstrative aspects, as shown in FIG. 9, radar device 910 may include one or more RF units, e.g., in the form of one or more RF Integrated Chips (RFICs) 920, which may be configured to communicate radar signals, e.g., as described below.

For example, an RFIC 920 may include one or more elements of front-end 804 (FIG. 8), and/or may perform one or more operations and/or functionalities of front-end 804 (FIG. 8).

In some demonstrative aspects, the plurality of RFICs 920 may be operable to form a radar antenna array including one or more Tx antenna arrays and one or more Rx antenna arrays.

For example, the plurality of RFICs 920 may be operable to form MIMO radar antenna 881 (FIG. 8) including Tx arrays 824 (FIG. 8), and/or Rx arrays 826 (FIG. 8).

In some demonstrative aspects, there may be a need to provide a technical solution to mitigate radio interference between radar devices, for example, radio interference at radar devices of vehicle 900, which may be caused by cross-talk and radar communications from other radar devices, e.g., of other vehicles, and/or one or more other radar communication sources, e.g., as described below.

In some demonstrative aspects, a number of vehicles equipped with radar devices may be expected to grow, for example, as importance of a radar sensor as an autonomous driving major sensor increases.

In some demonstrative aspects, radio interference between radar devices may be expected to grow as well, e.g., as a result of the increase in the number of autonomous vehicles utilizing radar devices.

In some demonstrative aspects, radio interference between radar devices may affect the performance of the radar devices, for example, in terms of a degraded radar effective range, a reduced probability of detections, an increase in a number of false alarm detections, and/or any other effects, which may degrade the radar performance.

In one example, reliability and/or immunity in the presence of an interference signal may be a challenging requirement from an automotive radar system, e.g., radar system 901.

In some demonstrative aspects, an automotive radar system, e.g., radar system 901, may be configured to include inherent immunity to interference, for example, in addition to one or more dedicated interference mitigation techniques, for example, in order to maintain performance in dense environments.

In some demonstrative aspects, a radar device, e.g., radar device 910, may be configured to mitigate interference in an environment of the radar device 910, e.g., an environment of vehicle 900, for example, based on a polarization selection scheme, which may be configured to select an antenna polarization setting to be applied for communication of radar signals by the radar device, e.g., as described below.

In some demonstrative aspects, for example, in some use cases, scenarios, and/or implementations, there may be one or more disadvantages, inefficiencies, and/or technical problems in implementing interference mitigation methods based on a static polarization setting for communication of radar signals.

In one example, the static polarization setting may not be optimal for different radar scenarios. For example, a specific polarization setting may be more suitable for a specific scenario, while the same specific polarization setting may not be the most suitable for other scenarios.

In some demonstrative aspects, a radar device, e.g., radar device 910, may be configured to implement a polarization selection scheme, which may be configured to provide a technical solution, to increase an immunity to interference, e.g., when needed, for example, in dense environments.

In some demonstrative aspects, the polarization selection scheme may be configured to provide a technical solution to keep an optimal polarization for non-interfered or slightly-interfered environments, for example, based on road conditions, e.g., as described below.

In some demonstrative aspects, the polarization selection scheme may be implemented to provide a technical solution, which may not be limited to a radar type, and/or a modulation type of the radar device.

In some demonstrative aspects, the polarization selection scheme may be implemented to provide a technical solution to determine an antenna polarization setting to be applied for radar communication by radar device 910, for example, based on the environment of vehicle 900, and/or a level of interference in the environment and/or scene of vehicle 900.

In some demonstrative aspects, the polarization selection scheme may be implemented to provide a technical solution to select an antenna polarization setting from a plurality of antenna polarization settings, for example, based on the environment of vehicle 900, and/or a level of interference in the environment and/or scene of vehicle 900.

For example, the polarization selection scheme may be configured to combine several polarizations elements, and to choose between the polarization elements, for example, based on the environment and/or the level of interference in a scene, e.g., as described below.

In some demonstrative aspects, the polarization selection scheme may be implemented to provide a technical solution, which may be suitable for a wide range of types of RF frontends, and/or a wide range of frequencies, for example, high frequencies, e.g., in the mmWave frequency band, e.g., as described below.

Figure 10:
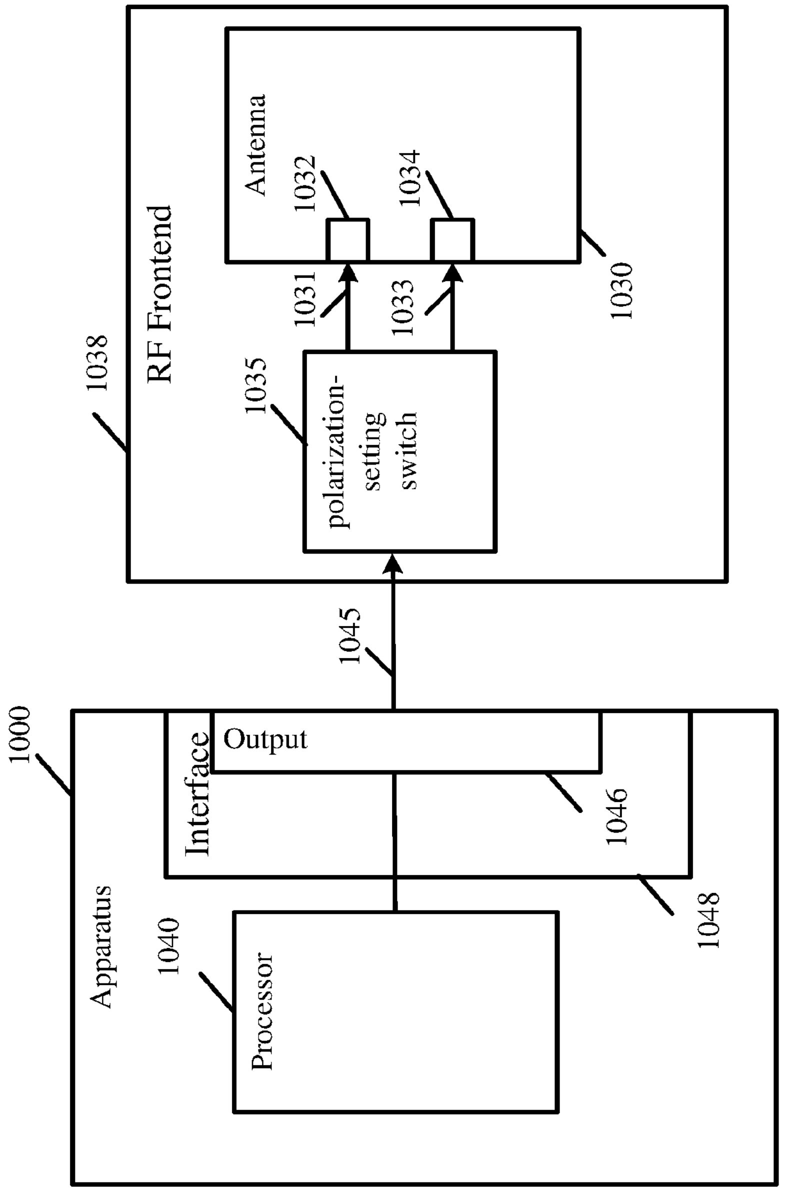
FIG. 10 is a schematic illustration of a processor apparatus and a Radio Frequency (RF) frontend, in accordance with some demonstrative aspects.

Reference is made to FIG. 10, which schematically illustrates a processor apparatus 1000 and an RF frontend 1038, in accordance with some demonstrative aspects.

In some demonstrative aspects, apparatus 1000 and RF frontend 1038 may be implemented, for example, as part of a radar device, e.g., a radar device 910 (FIG. 9).

In some demonstrative aspects, apparatus 1000 may be implemented, for example, as part of a controller, e.g., controller 950 (FIG. 9).

In some demonstrative aspects, apparatus 1000 may be implemented, for example, as part of a radar processor, e.g., radar processor 834 (FIG. 8), and/or BB processor 930 (FIG. 9).

In some demonstrative aspects, apparatus 1000 may include an interface 1048 configured to interconnect and/or interface between apparatus 1000 and one or more other devices, components and/or elements of a radar device, e.g., radar device 910 (FIG. 9), and/or a radar system, e.g., radar system 901 (FIG. 9).

In some demonstrative aspects, interface 1048 may interconnect and/or interface between apparatus 1000 and one or more elements and/or components of a radar device, for example, one or more components elements of radar device 910 (FIG. 9), and/or one or more components or elements of radar device 800 (FIG. 8).

In some demonstrative aspects, interface 1048 may interconnect and/or interface between apparatus 1000 and at least one RF frontend 1038 of the radar device.

In some demonstrative aspects, RF frontend 1038 may include one or more elements of radar front end 804 (FIG. 8) and/or RFICs 920 (FIG. 9), and/or may perform one or more operations and/or functionalities of radar front end 804 (FIG. 8) and/or RFICs 920 (FIG. 9).

In some demonstrative aspects, RF frontend 1038 may be implemented as part of apparatus 100. In other aspects, RF frontend 1038 may be implemented as part of any other, dedicated, or non-dedicated, element of a radar device, e.g., radar device 800 (FIG. 8) or radar device 910 (FIG. 9), and/or a radar system, e.g., radar system 901 (FIG. 9).

In some demonstrative aspects, RF frontend 1038 may include an antenna 1030. For example, MIMO antenna array 881 (FIG. 8) may include one or more elements of antenna 1030, and/or may perform one or more operations and/or functionalities of antenna 1030.

In some demonstrative aspects, antenna 1030 may be implemented as part of RF frontend 1038. In other aspects, antenna 1030 may be implemented as a separate element of a radar device, e.g., radar device 800 (FIG. 8) or radar device 910 (FIG. 9), and/or a radar system, e.g., radar system 901 (FIG. 9).

In some demonstrative aspects, antenna 1030 may include a stacked series fed antenna, e.g., as described below.

In other aspects, antenna 1030 may include any other type of antenna.

In some demonstrative aspects, apparatus 1000 may be configured to determine an antenna polarization setting to be applied for communication of radar signals by a radar device, for example, radar device 910 (FIG. 9), via radar antenna 1030, e.g., as described below.

In some demonstrative aspects, apparatus 1000 may include a processor 1040 configured to determine the antenna polarization setting to be applied for the communication of the radar signals by the radar device, e.g., via antenna 1030. For example, radar processor 834 (FIG. 8) may include one or more elements of processor 1040, and/or may perform one or more operations and/or functionalities of processor 1040; BB processor 930 (FIG. 9) may include one or more elements of processor 1040, and/or may perform one or more operations and/or functionalities of processor 1040; and/or controller 950 (FIG. 9) may include one or more elements of processor 1040, and/or may perform one or more operations and/or functionalities of processor 1040.

In other aspects, processor 1040 may be implemented as part of any other, dedicated, or non-dedicated, element of a radar device, e.g., radar device 800 (FIG. 8) or radar device 910 (FIG. 9), and/or a radar system, e.g., radar system 901 (FIG. 9).

In some demonstrative aspects, processor 1040 may include, or may be implemented, partially or entirely, by circuitry and/or logic, e.g., one or more processors including circuitry and/or logic, memory circuitry and/or logic. Additionally or alternatively, one or more functionalities of processor 1040 may be implemented by logic, which may be executed by a machine and/or one or more processors, e.g., as described below.

In some demonstrative aspects, processor 1040 may be configured to identify an environment-related attribute corresponding to an environment of the radar device, for example, the environment of radar device 910 (FIG. 9), e.g., as described below.

In some demonstrative aspects, processor 1040 may be configured to determine the antenna polarization setting to be applied for communication of the radar signals by the radar device, for example, based on the environment related attribute, e.g., as described below.

In some demonstrative aspects, the antenna polarization setting may include a Tx antenna polarization setting to be applied for transmission of radar Tx signals by RF frontend 1038, e.g., as described below.

In some demonstrative aspects, the antenna polarization setting may include an Rx antenna polarization setting to be applied for reception of radar Rx signals by RF frontend 1038, e.g., as described below.

In some demonstrative aspects, processor 1040 may be configured to generate antenna polarization information 1045, for example, to configure the antenna polarization setting, e.g., as described below.

In some demonstrative aspects, apparatus 1000 may include an output 1046 to provide the antenna polarization information 1045, for example, to configure the antenna polarization setting for radar antenna 1030 at RF frontend 1038, e.g., as described below.

In some demonstrative aspects, processor 1040 may be configured to determine a selected antenna polarization setting from a plurality of antenna polarization settings, for example, based on the environment related attribute, e.g., as described below.

In some demonstrative aspects, processor 1040 may be configured to generate the antenna polarization information 1045 based on the selected antenna polarization setting, e.g., as described below.

In some demonstrative aspects, the plurality of antenna polarization settings may include a Horizontal (H) polarization setting, e.g., in a horizontal direction relative to Earth, and at least one other antenna polarization setting different from the H polarization setting, e.g., as described below.

In some demonstrative aspects, the plurality of antenna polarization settings may include a Vertical (V) polarization setting, e.g., in a vertical direction relative to Earth, and at least one other antenna polarization setting different from the V polarization setting, e.g., as described below.

In some demonstrative aspects, the plurality of antenna polarization settings may include a circular polarization setting, and at least one other antenna polarization setting different from the circular polarization setting, e.g., as described below.

In some demonstrative aspects, the circular polarization setting may include a Tx antenna circular polarization setting and/or an Rx antenna circular polarization setting, e.g., as described below.

In some demonstrative aspects, the circular polarization setting may include a Tx antenna circular polarization setting in a first circular polarization direction, and/or an Rx antenna circular polarization setting in a second circular polarization direction, e.g., as described below.

In some demonstrative aspects, second circular polarization direction may be opposite to the first circular polarization direction, e.g., as described below.

In some demonstrative aspects, the plurality of antenna polarization settings may include a linear diagonal polarization setting, and at least one other antenna polarization setting different from the linear diagonal polarization setting, e.g., as described below.

In some demonstrative aspects, the linear diagonal polarization setting may include a Tx antenna linear diagonal polarization setting, and/or an Rx antenna linear diagonal polarization setting, e.g., as described below.

In some demonstrative aspects, both the Tx antenna linear diagonal polarization setting and the Rx antenna linear diagonal polarization setting may be in a same diagonal polarization direction, e.g., as described below.

In some demonstrative aspects, the plurality of antenna polarization settings may include, for example, the V polarization setting, the H polarization setting, the linear diagonal polarization setting, and/or the circular polarization setting.

In other aspects, the plurality of antenna polarization settings may include any other additional or alternative polarization settings.

In some demonstrative aspects, processor 1040 may be configured to identify the environment-related attribute, for example, based on interference information and/or driving scenario information, e.g., as described below.

In some demonstrative aspects, processor 1040 may be configured to identify the environment-related attribute, for example, based on interference information corresponding to interference in the environment of the radar device, for example, radar device 910 (FIG. 9), e.g., as described below.

In some demonstrative aspects, processor 1040 may be configured to determine the antenna polarization setting, for example, based on a comparison between a level of the interference in the environment of the radar device and a predefined interference threshold, e.g., as described below.

In some demonstrative aspects, processor 1040 may be configured to determine the antenna polarization setting to include the circular polarization setting or the linear diagonal polarization setting, for example, based on a determination that the interference in the environment of the radar device is above a predefined interference level, e.g., as described below.

In one example, processor 1040 may be configured to select whether to use the circular polarization setting or to use the linear diagonal polarization setting, for example, based on a target type of a target to be detected, based on one or more antenna implementation considerations, e.g., corresponding to an implementation of antenna 1030, and/or based on any other additional or alternative information and/or criteria.

In some demonstrative aspects, the circular polarization setting and/or the linear diagonal polarization setting may have one or more advantages with respect to one or more interference scenarios, for example, compared to the V polarization setting and/or the H polarization setting, e.g., as described below.

In some demonstrative aspects, processor 1040 may configure a circular polarization setting for antenna 1030 to a first circular polarization setting for a Tx antenna, and a second circular polarization setting, different from, e.g., opposite to, the first polarization setting, for an Rx antenna, e.g., as described below.

In one example, processor 1040 may configure a circular polarization setting for antenna 1030 to include a Right Hand Circular Polarization (RHCP) to be applied for a Tx antenna configuration, and a Left Hand Circular Polarized (LHCP) to be applied for an Rx antenna configuration.

In another, processor 1040 may configure a circular polarization setting for antenna 1030 to include the LHCP to be applied for the Tx antenna configuration, and the RHCP to be applied for the Rx antenna configuration.

In some demonstrative aspects, an implementation using different circular polarization settings for the Tx antenna and the Rx antenna may provide a technical solution to support detecting reflections from targets, for example, while suppressing interfering signals arriving from other front-facing radars having a same antenna configuration.

In one example, a same polarization type should be used by two circularly polarized antennas facing in front of each other, e.g., two RHCP antennas or two LHCP antennas, for example, in order to establish a link between the two circularly polarized antennas. According to this example, if an interferer RHCP Tx antenna transmits an interference signal towards a victim LHCP Rx antenna, the interference signal may be rejected. For example, a signal rejection level of 15 dB or more may be achieved, for example, depending on an X-pol rejection of the victim LHCP Rx antenna.

For example, when transmitting a signal from a Tx antenna towards a target according to a first polarization of the LHCP and RHCP, a reflected signal from the target may rotate its polarization to as second polarization of the LHCP and RHCP. Accordingly, the reflected signal may be best received by an Rx antenna configured according to the second polarization of the LHCP and RHCP. For example, when transmitting an RHCP signal from an RHCP Tx antenna towards a target, the reflected signal may rotate its polarization to the LHCP, which will be best received by an LHCP Rx antenna; and/or when transmitting an LHCP signal from an LHCP Tx antenna towards a target, the reflected signal may rotate its polarization to the RHCP, which will be best received by an RHCP Rx antenna.

In some demonstrative aspects, processor 1040 may configure a linear diagonal polarization setting for antenna 1030, for example, by configuring both the Tx antenna and the Rx antennas of antenna 1030 according to a same diagonal polarization in a same direction. In one example, processor 1040 may configure both the Tx antenna and the Rx antennas of antenna 1030 according to a north-east diagonal polarization. In another example, processor 1040 may configure both the Tx antenna and the Rx antennas of antenna 1030 according to a north-west diagonal polarization.

In one example, setting both the Tx antenna and the Rx antennas of antenna 1030 according to a same diagonal polarization in a same direction may support a technical solution to differentiate between reflected signals from targets and interference signals. For example, setting both the Tx antenna and the Rx antennas of antenna 1030 according to a same diagonal polarization in a same direction may result in rejecting an interfering signal, e.g., due to opposite diagonal directions, while reflected signals from a target may maintain their diagonal direction and, accordingly, may be properly received and processed.

In some demonstrative aspects, processor 1040 may be configured to identify the environment-related attribute based on driving scenario information corresponding to a driving scenario of a vehicle including the radar device, for example, vehicle 901 (FIG. 9), e.g., as described below.

In some demonstrative aspects, processor 1040 may be configured to determine the antenna polarization setting to include the H polarization setting, for example, based on a determination that the driving scenario includes a first type of driving scenario, e.g., as described below.

In some demonstrative aspects, processor 1040 may be configured to determine the antenna polarization setting to include the H polarization setting, for example, based on a determination that the driving scenario includes one or more vertical elements, for example, a sidewall, a tunnel, or the like, e.g., as described below.

In other aspects, processor 1040 may be configured to determine the antenna polarization setting to include the H polarization setting, for example, based on a determination that the driving scenario includes any other type of driving scenario.

In some demonstrative aspects, the H polarization setting may be advantageous over the V polarization setting, for example, in one or more scenarios, for example, scenarios including tunnels and/or side walls, e.g., concrete crash barriers, which may be placed, along the road, and/or any other scenarios.

In one example, the H polarization setting may be advantageous over the V polarization setting, for example, since reflections from the side-walls may be weaker for the H polarization setting compared to the V polarization setting, for example, due to electromagnetic boundary conditions on the side walls and/or due to a Brewster effect, e.g., as described below.

Figure 11:
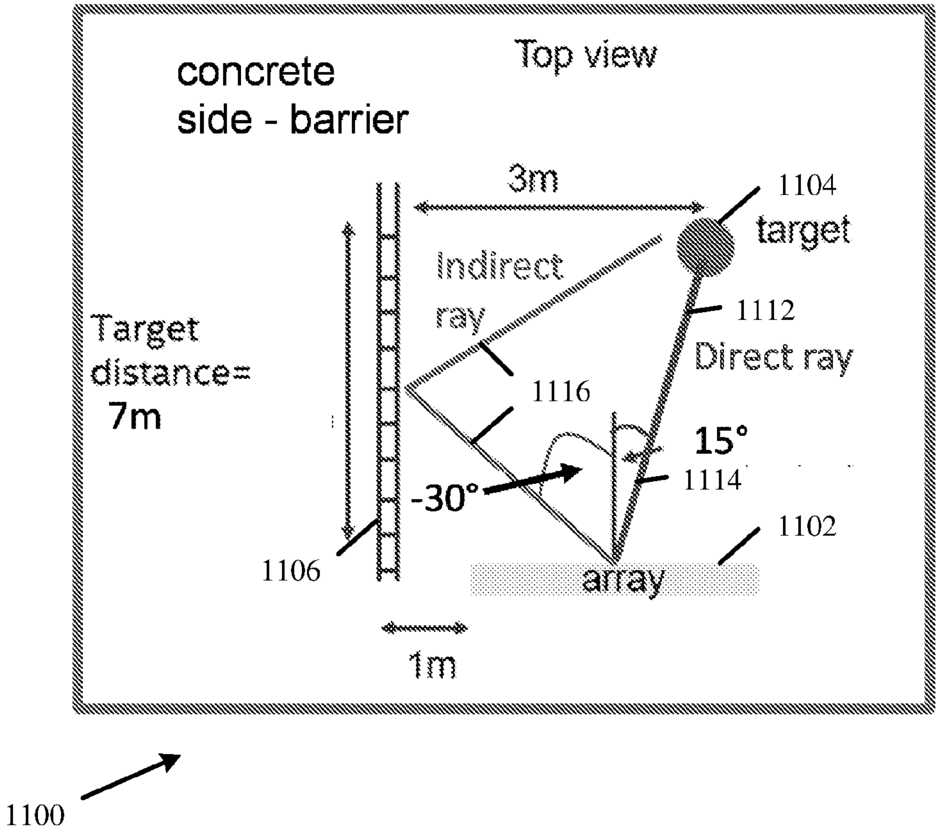
FIG. 11 is a schematic illustration of a radar detection scenario and an azimuth spectrum corresponding to the radar detection scenario, in accordance with some demonstrative aspects.
Figure 11:
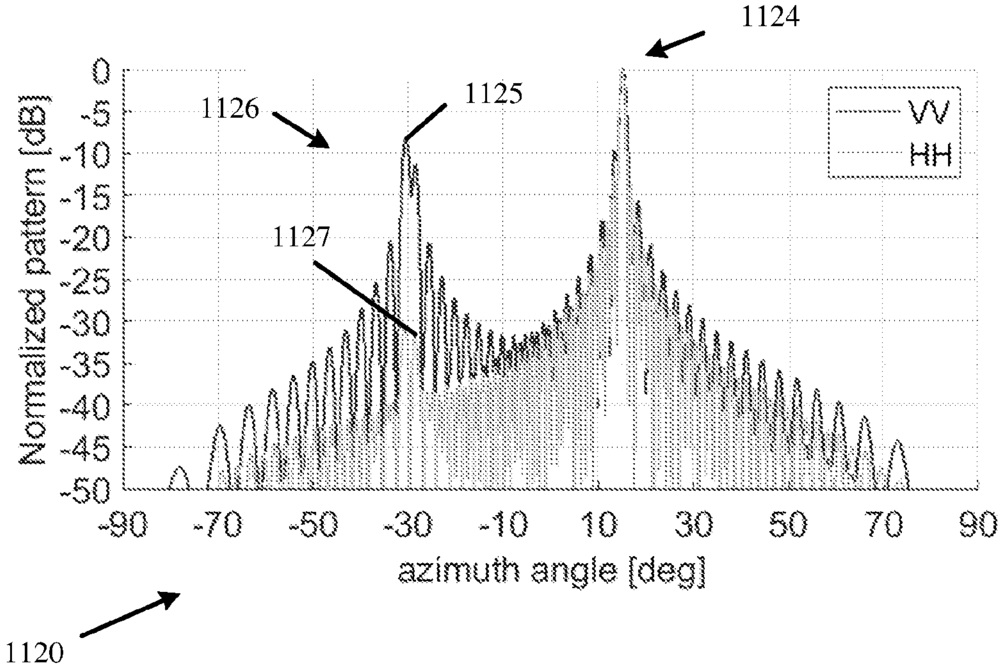

Reference is made to FIG. 11, which schematically illustrates a radar detection scenario 1100 and an azimuth spectrum 1120 corresponding to the radar detection scenario 1100, in accordance with some demonstrative aspects.

In some demonstrative aspects, as shown in FIG. 11, radar detection scenario 1100 may include a radar device 1102, e.g., radar device 910 (FIG. 9), which may be at a horizontal distance of 1 meter (m) from a side-wall 1106.

In some demonstrative aspects, as shown in FIG. 11, radar detection scenario 1100 may include a target 1104, which may be at a horizontal distance of 3 m from the side-wall 1106, and at a vertical distance of 7 m from radar device 1102.

In some demonstrative aspects, as shown in FIG. 11, a radar Tx signal may be transmitted by a Tx antenna of the radar device 1102, for example, at an angle of 15 degrees (°) towards the target 1104.

In some demonstrative aspects, as shown in FIG. 11, a direct radar Rx signal 1114, e.g., resulting from a reflection of the radar Tx signal from the target 1104, may be received by an Rx antenna of the radar device 1102, for example, via a direct path at the same angle of 15° in which the Tx signal was transmitted.

In some demonstrative aspects, as shown in FIG. 11, an indirect radar Rx signal 1116, e.g., resulting from a reflection of the radar Tx signal from the target 1104 via side-wall 1106, may be received by the Rx antenna of the radar device 1102, for example, at an angle of −30°.

In some demonstrative aspects, as shown in FIG. 11, direct radar Rx signal 1114 may result in a true detection 1124, e.g., corresponding to target 1104, in azimuth spectrum 1110, e.g., at the angle of 15°.

In some demonstrative aspects, as shown in FIG. 11, indirect radar Rx signal 1116 may result in a false detection 1126 in azimuth spectrum 1110, e.g., at the angle of −30°.

In some demonstrative aspects, as shown in FIG. 11, a peak 1125 of false detection 1126 according to the V polarization setting may be higher than a peak 1127 of false detection 1126 according to the H polarization setting.

For example, peak 1127 according to the H polarization setting may not be considered as a valid target, for example, since peak 1127 is relatively weak. In contrast, peak 1126 according to the V polarization setting may potentially be considered as a valid target, for example, since peak 1126 is relatively strong. Accordingly, implementing the H polarization setting for one or more scenarios, e.g., for the one or more scenarios including sidewalls, and/or tunnels, may provide a technical solution to reduce a probability of multipath false alarms.

Referring back to FIG. 10, in some demonstrative aspects, processor 1040 may be configured to determine the antenna polarization setting including the V polarization setting, for example, based on a determination that the driving scenario includes a second type of driving scenario, e.g., as described below.

In some demonstrative aspects, processor 1040 may be configured to determine the antenna polarization setting including the V polarization setting, for example, based on a determination that the driving scenario includes one or more vertical elements, for example, a sidewall, a tunnel, or the like, e.g., as described below.

In other aspects, processor 1040 may be configured to determine the antenna polarization setting to include the V polarization setting, for example, based on a determination that the driving scenario includes any other type of driving scenario.

for example, a scenario including highway and/or an open road, e.g., as described below.

In some demonstrative aspects, the V polarization setting may be advantageous over the H polarization setting, for example, in one or more scenarios including obstacles along a vertical plane, e.g., an asphalt road, and/or any other scenarios.

Figure 12:
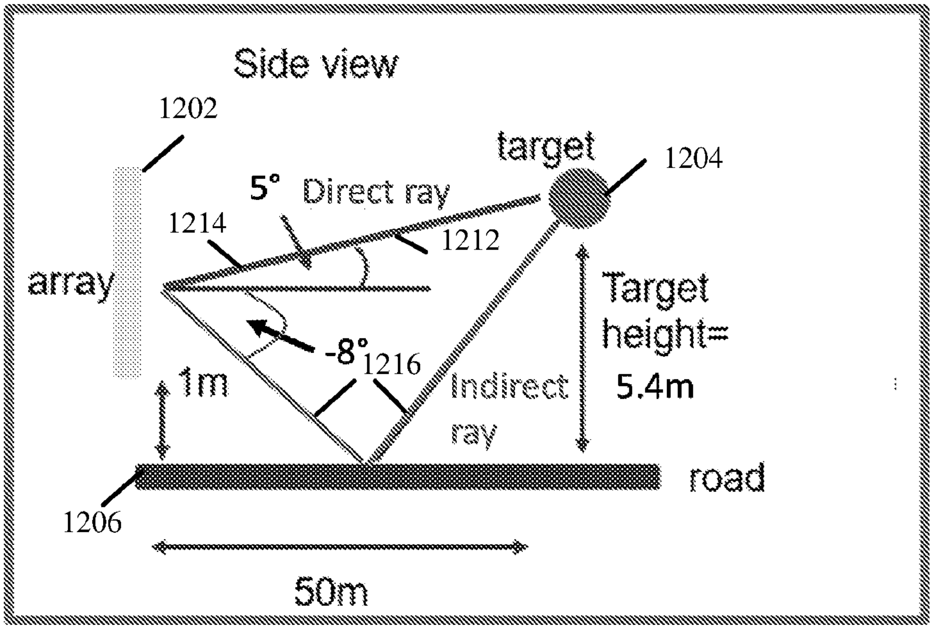
FIG. 12 is a schematic illustration of a radar detection scenario and an elevation spectrum corresponding to the radar detection scenario, in accordance with some demonstrative aspects.
Figure 12:
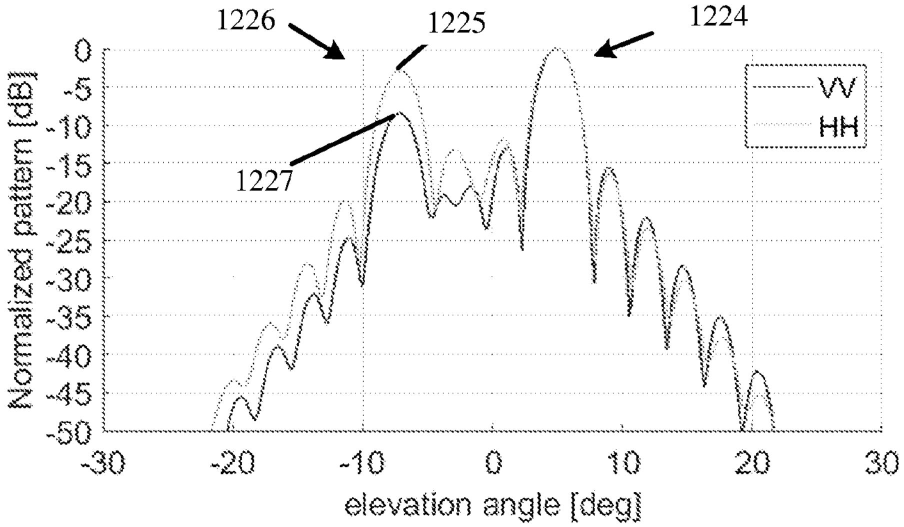

Reference is made to FIG. 12, which schematically illustrates a radar detection scenario 1200 and an elevation spectrum 1220 corresponding to the radar detection scenario 1200, in accordance with some demonstrative aspects.

In some demonstrative aspects, as shown in FIG. 12, radar detection scenario 1200 may include a radar device 1202, e.g., radar device 910 (FIG. 9), which may be at a vertical distance of 1 m above a road 1206.

In some demonstrative aspects, as shown in FIG. 12, radar detection scenario 1200 may include a target 1204, which may be at a vertical distance of 5.4 m above the road 1206, and at a horizontal distance of 50 m from radar device 1202.

In some demonstrative aspects, as shown in FIG. 12, a radar Tx signal may be transmitted by a Tx antenna of the radar device 1202, for example, at an angle of 5° towards the target 1204.

In some demonstrative aspects, as shown in FIG. 12, a direct radar Rx signal 1214, e.g., resulting from a reflection of the radar Tx signal from the target 1204, may be received by an Rx antenna of the radar device 1202, for example, via a direct path at the same angle of 5° in which the Tx signal was transmitted.

In some demonstrative aspects, as shown in FIG. 12, an indirect radar Rx signal 1216, e.g., resulting from a reflection of the radar Tx signal from the target 1204 via road 1206, may be received by the Rx antenna of the radar device 1202, for example, via an indirect path at an angle of −8°.

In some demonstrative aspects, as shown in FIG. 12, direct radar Rx signal 1214 may result in a true detection 1224, e.g., corresponding to target 1204, in azimuth spectrum 1210, e.g., at the angle of 5°.

In some demonstrative aspects, as shown in FIG. 12, indirect radar Rx signal 1216 may result in a false detection 1226 in azimuth spectrum 1210, e.g., at the angle of −8°.

In some demonstrative aspects, as shown in FIG. 12, a peak 1225 of false detection 1226 according to the H polarization setting may be higher than a peak 1227 of false detection 1226 according to the V polarization setting.

For example, peak 1227 according to the V polarization setting may not be considered as a valid target, for example, since peak 1227 is relatively weak. In contrast, peak 1226 according to the H polarization setting may potentially be considered as a valid target, for example, since peak 1226 is relatively strong. Accordingly, implementing the V polarization setting for one or more scenarios, e.g., for the one or more scenarios including obstacles along a vertical plane, may provide a technical solution to reduce a probability of multipath false alarms.

Referring back to FIG. 10, in some demonstrative aspects, apparatus 1000 may be configured to utilize a polarization-setting switch 1035 configured to switch antenna 1030 between the plurality of antenna polarization settings, e.g., as described below.

In some demonstrative aspects, polarization-setting switch 1035 may be implemented, for example, as part of RF frontend 1038.

In other aspects, polarization-setting switch 1035 may be implemented as part of any other, dedicated, or non-dedicated, element of a radar device, e.g., radar device 800 (FIG. 8) or radar device 910 (FIG. 9), and/or a radar system, e.g., radar system 901 (FIG. 9).

In some demonstrative aspects, polarization-setting switch 1035 may be configured to switch the antenna 1030 to an antenna polarization setting, for example, according to the antenna polarization information 1045, e.g., as described below.

In some demonstrative aspects, processor 1040 may provide the antenna polarization information 1045, for example, to polarization-setting switch 1035, e.g., via output 1046.

In some demonstrative aspects, processor 1040 may provide the antenna polarization information 1045, for example, to any other component and/or element of a radar device, e.g., radar device 910 (FIG. 9) and/or radar device 800 (FIG. 8), and/or a radar system, e.g., radar system 901 (FIG. 9), for example, via output 1046.

In some demonstrative aspects, polarization-setting switch 1035 may be configured to provide a first phase 1031 to a first port 1032 of the antenna 1030, and a second phase 1033 to a second port 1034 of the antenna 1030, e.g., as described below.

In some demonstrative aspects, the first phase 1031 and/or the second phase 1033 may be based on the antenna polarization setting according to the antenna polarization information 1045, e.g., as described below.

In some demonstrative aspects, the second phase 1033 may be different from the first phase 1031, e.g., as described below.

In some demonstrative aspects, polarization-setting switch 1035 may be configured, for example, according to a first polarization-setting scheme, e.g., as described below.

In some demonstrative aspects, for example, according to the first polarization-setting scheme, polarization-setting switch 1035 may include a differential amplifier including a first differential amplifier port on a first RF path and a second differential amplifier port on a second RF path, e.g., as described below.

In some demonstrative aspects, the first differential amplifier port and the second differential amplifier port may have a phase difference of 180 degrees, e.g., as described below.

In some demonstrative aspects, for example, according to the first polarization-setting scheme, polarization-setting switch 1035 may include a 90-degree hybrid coupler having a first hybrid coupler port coupled to the first differential amplifier port, a second hybrid coupler port on the second RF path, a third hybrid coupler port on the first RF path, and/or a fourth hybrid coupler port coupled to the second port of the antenna 1030, e.g., as described below.

In some demonstrative aspects, for example, according to the first polarization-setting scheme, polarization-setting switch 1035 may include a first configurable phase shifter to apply a first configurable phase shift between the second differential amplifier port and the second hybrid coupler port, e.g., as described below.

In some demonstrative aspects, the first configurable phase shift may be based on a polarization setting according to the antenna polarization information 1045, e.g., as described below.

In some demonstrative aspects, for example, according to the first polarization-setting scheme, polarization-setting switch 1035 may include a second configurable phase shifter to apply a second configurable phase shift between the third hybrid coupler port and the first port of the antenna 1030, e.g., as described below.

In some demonstrative aspects, the second configurable phase shift may be based on the polarization setting according to the antenna polarization information 1045, e.g., as described below.

Figure 13:
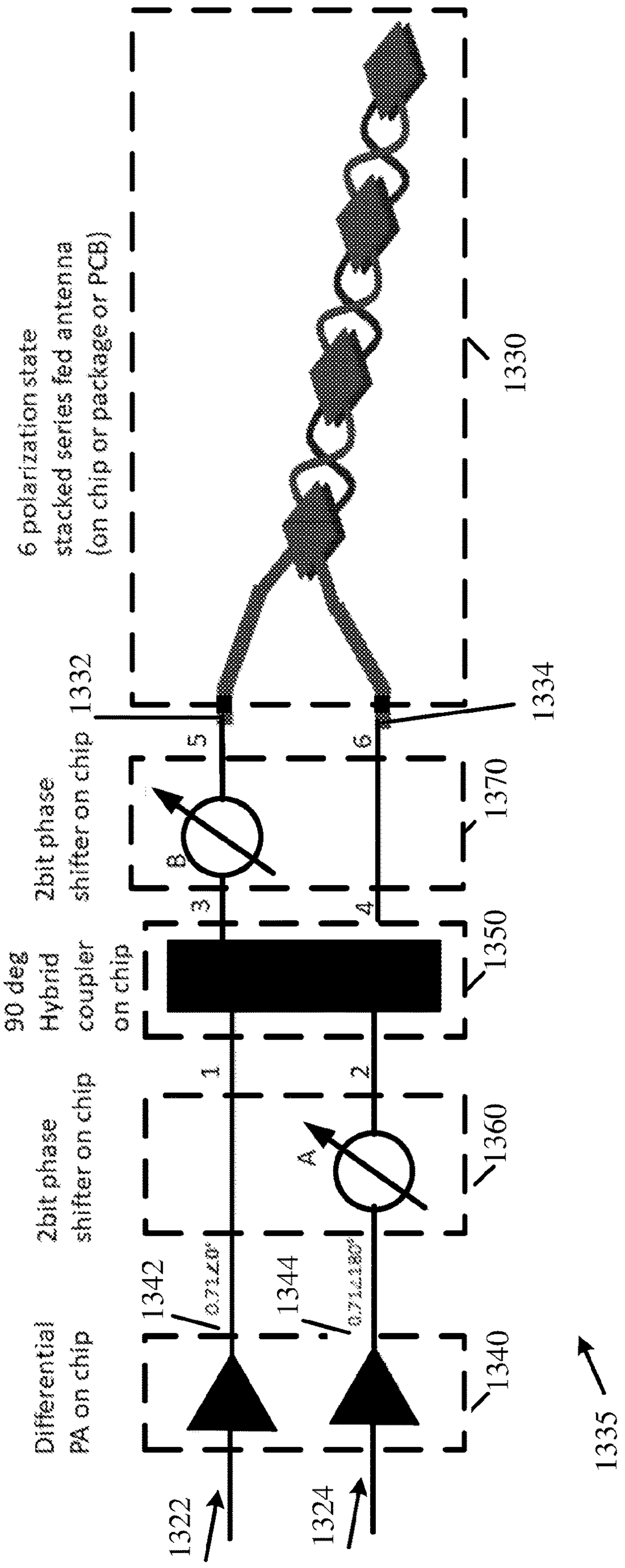
FIG. 13 is a schematic illustration of a polarization-setting switch, in accordance with some demonstrative aspects.

Reference is made to FIG. 13, which schematically illustrates a polarization-setting switch 1335, in accordance with some demonstrative aspects. For example polarization-setting switch 1035 (FIG. 10) may include one or more elements of polarization-setting switch 1335, and/or may perform one or more operations and/or functionalities of polarization-setting switch 1335.

In some demonstrative aspects, polarization-setting switch 1335 may be configured, for example, according to the first polarization-setting scheme.

In some demonstrative aspects, polarization-setting switch 1335 may be configured, for example, to switch an antenna 1330 of a radar device, e.g., radar device 910 (FIG. 9), between a plurality of antenna polarization settings. For example, MIMO antenna array 881 (FIG. 8) may include one or more elements of antenna 1330, and/or may perform one or more operations and/or functionalities of antenna 1330.

In one example, polarization-setting switch 1335 may be configured to switch the antenna 1330 to an antenna polarization setting, for example, according to the antenna polarization information 1045 (FIG. 10).

In some demonstrative aspects, as shown in FIG. 13, antenna 1330 may include a stacked series fed antenna.

In other aspects, antenna 1330 may include any other type of antenna.

In some demonstrative aspects, polarization-setting switch 1335 may be configured as a 6-state polarization switch.

In some demonstrative aspects, the 6-state polarization-setting switch 1335 may be configured for a stacked series fed Tx antenna.

In some demonstrative aspects, polarization-setting switch 1335 may be configured to switch antenna 1330 between six polarization states.

In other aspects, polarization-setting switch 1335 may be configured to switch antenna 1330 between any other numbers of polarization states.

In some demonstrative aspects, as shown in FIG. 13, polarization-setting switch 1335 may be configured to provide a first phase to a first port 1332, denoted "5", of the antenna 1330, and a second phase to a second port 1334, denoted "6", of the antenna 1330.

In some demonstrative aspects, as shown in FIG. 13, polarization-setting switch 1335 may include a differential amplifier 1340 including a first differential amplifier port 1342 on a first RF path 1322 and a second differential amplifier port 1344 on a second RF path 1324.

In some demonstrative aspects, the first differential amplifier port 1342 and the second differential amplifier port 1344 may have a phase difference of 180 degrees.

In some demonstrative aspects, as shown in FIG. 13, polarization-setting switch 1335 may include a 90-degree hybrid coupler 1350 having a first hybrid coupler port, denoted "1", coupled to the first differential amplifier port 1342; a second hybrid coupler port, denoted "2", on the second RF path 1324; a third hybrid coupler port, denoted "3", on the first RF path 1322; and/or a fourth hybrid coupler port, denoted "4", coupled to the second port 1334 of the antenna 1330.

In some demonstrative aspects, as shown in FIG. 13, polarization-setting switch 1335 may include a first configurable phase shifter 1360 configured to apply a first configurable phase shift, denoted "A", between the second differential amplifier port 1344 and the second hybrid coupler port 2. For example, configurable phase shifter 1360 may be implemented using a 2-bit phase shifter on chip, and/or any other phase shifter.

In some demonstrative aspects, the first configurable phase shift A may be configured, for example, based on the polarization setting according to the antenna polarization information 1045 (FIG. 10).

In some demonstrative aspects, as shown in FIG. 13, polarization-setting switch 1335 may include a second configurable phase shifter 1370 configured to apply a second configurable phase shift, denoted "B", between the third hybrid coupler port 3, and the first port 1332 of the antenna 1330. For example, configurable phase shifter 1370 may be implemented using a 2-bit phase shifter on chip, and/or any other phase shifter.

In some demonstrative aspects, the second configurable phase shift B may be configured, for example, based on the polarization setting according to the antenna polarization information 1045 (FIG. 10).

In some demonstrative aspects, Power Amplifiers (PAs) of differential amplifier 1340 with Low Noise Amplifiers (LNAs).

In some demonstrative aspects, polarization-setting switch 1335 may be configured to switch between the plurality of antenna polarization settings, e.g., the six polarization states, for example, based on states of configurable phase shifter 1360 and/or configurable phase shifter 1370, e.g., as described below.

In one example, one or more polarization states of polarization-setting switch 1335 may be defined, for example, based on states of the configurable phase shifter 1360 and/or configurable phase shifter 1370, e.g., as follows:

TABLE 1

| phase shifter A state [°] | 1 | 2 | 3 | 4 |
|---|---|---|---|---|
| 0 | 0.5∠0° | 0.5∠180° | 0.5∠315° | 0.5∠135° |
| 90 | 0.5∠0° | 0.5∠90° | 1∠−90° | 0 |
| 180 | 0.5∠0° | 0.5∠0° | 0.5∠225° | 0.5∠225° |
| 270 | 0.5∠0° | 0.5∠270° | 0 | 1∠180° |
| 0 | 0.5∠0° | 0.5∠180° | 0.5∠315° | 0.5∠135° |
| 180 | 0.5∠0° | 0.5∠0° | 0.5∠225° | 0.5∠225° |

| Phase shifter B state [°] | 5 | 6 | Resulting Antenna polarization |
|---|---|---|---|
| 0 | 0.5∠315° | 0.5∠135° | Linear horizontal |
| 0 | 1∠−90° | 0 | Linear Diagonal northwest |
| 0 | 0.5∠225° | 0.5∠225° | Linear vertical |

TABLE 1-continued

| | | | |
|---|---|---|---|
| 0 | 0 | 1∠180° | Linear Diagonal northeast |
| 90 | 0.5∠45° | 0.5∠135° | RHCP |
| 90 | 0.5∠315° | 0.5∠225° | LHCP |

In other aspects, any other polarization states of polarization-setting switch 1335 may be defined based on any other states of the configurable phase shifter 1360 and/or configurable phase shifter 1370.

In some demonstrative aspects, as shown in FIG. 13, polarization-setting switch 1335 may include two configurable phase shifters, e.g., configurable phase shifters 1370 and 1360, and a 90-degree hybrid coupler, e.g., 90-degree hybrid coupler 1350.

In some demonstrative aspects, the implementation of polarization-setting switch 1335 support a technical solution to maintain antenna 1330 passive, for example, in opposed to a reconfigurable antenna design, which includes a PIN diode and/or one or more switches implemented on a shape of the antenna, which may require biasing of the antenna.

In some demonstrative aspects, as shown in FIG. 13, setting appropriate phases, e.g., to ports 1332 and 1334, entering a first patch of antenna 1330, may result in a routing that comes out of the rest of the patches of antenna 1330 having "correct" phases, such that an entire structure of antenna 1330 may be excited, e.g., according to the required antenna polarization setting.

In some demonstrative aspects, polarization-setting switch 1335 may be implemented to provide a scalable solution for controlling the polarization setting of antenna 1330. For example, polarization-setting switch 1335 may be implemented to support steering a beam of antenna 1330, for example, by controlling the phases applied to antenna 1330.

For example, the beam of antenna 1330 may be steered by controlling the phases applied to control the polarization setting of the antenna 1330, e.g., in combination with digital beamforming Referring back to FIG. 10, in some demonstrative aspects, polarization-setting switch 1035 may be configured, for example, according to a second polarization-setting scheme, e.g., as described below.

In some demonstrative aspects, for example, according to the second polarization-setting scheme, polarization-setting switch 1035 may include a differential amplifier including a first differential amplifier port on a first RF path and a second differential amplifier port on a second RF path, e.g., as described below.

In some demonstrative aspects, the first differential amplifier port and the second differential amplifier port may have a phase difference of 180 degrees, e.g., as described below.

In some demonstrative aspects, the first differential amplifier port may be coupled to the first port 1032 of the antenna 1030, e.g., as described below.

In some demonstrative aspects, for example, according to the second polarization-setting scheme, polarization-setting switch 1035 may include a configurable phase shifter to apply a configurable phase shift between the second differential amplifier port and the second port 1034 of the antenna 1030, e.g., as described below.

In some demonstrative aspects, the configurable phase shift may be based on the polarization setting according to the antenna polarization information 1045, e.g., as described below.

Figure 14:
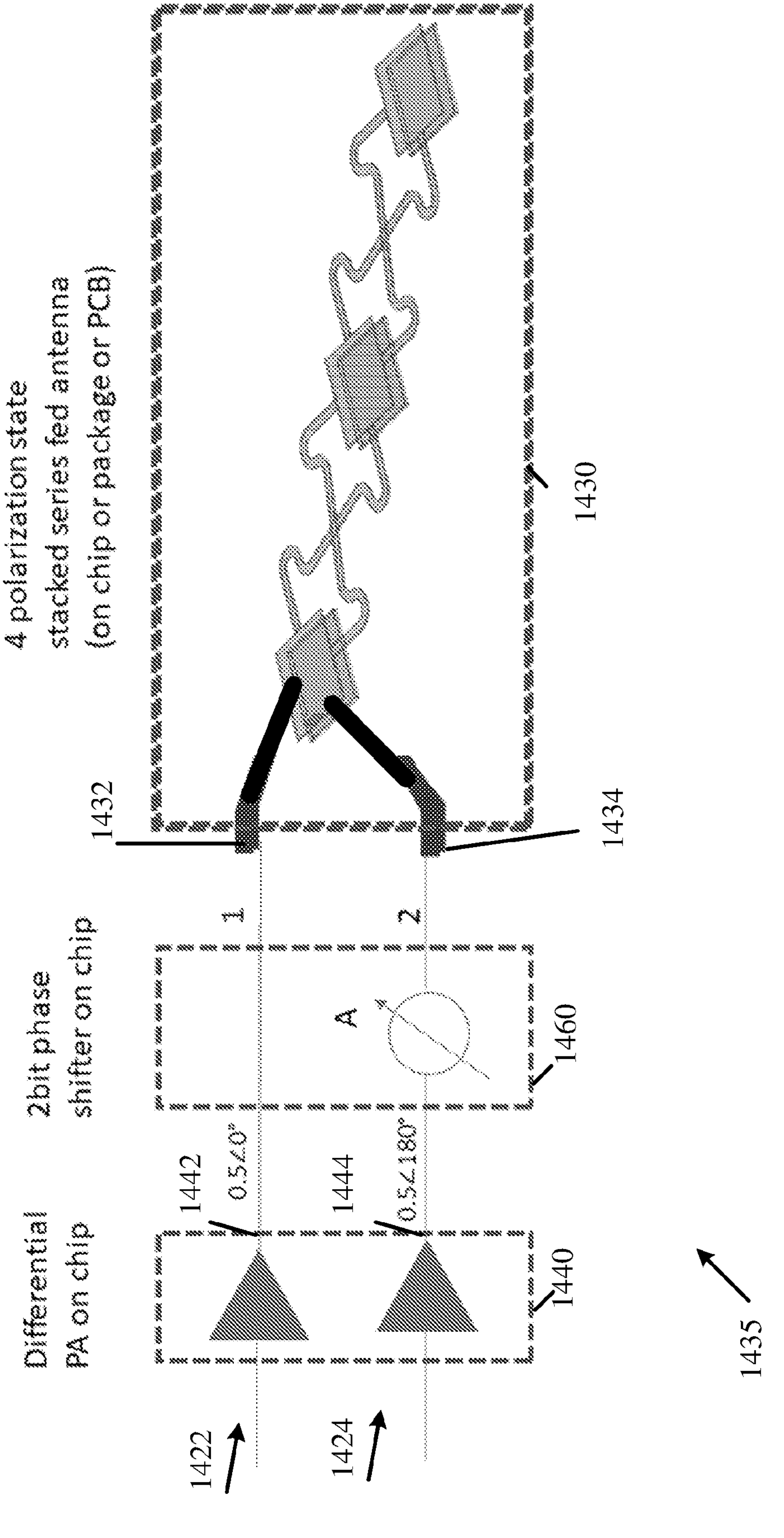
FIG. 14 is a schematic illustration of a polarization-setting switch, in accordance with some demonstrative aspects.

Reference is made to FIG. 14, which schematically illustrates a polarization-setting switch 1435, in accordance with some demonstrative aspects. For example polarization-setting switch 1035 (FIG. 10) may include one or more elements of polarization-setting switch 1435, and/or may perform one or more operations and/or functionalities of polarization-setting switch 1435.

In some demonstrative aspects, polarization-setting switch 1435 may be configured, for example, according to the second polarization-setting scheme.

In some demonstrative aspects, polarization-setting switch 1435 may be configured, for example, to switch an antenna 1430 of a radar device, e.g., radar device 910 (FIG. 9), between a plurality of antenna polarization settings. For example, MIMO antenna array 881 (FIG. 8) may include one or more elements of antenna 1430, and/or may perform one or more operations and/or functionalities of antenna 1430.

In one example, polarization-setting switch 1435 may be configured to switch the antenna 1430 to an antenna polarization setting, for example, according to the antenna polarization information 1045 (FIG. 10).

In some demonstrative aspects, as shown in FIG. 14, antenna 1430 may include a stacked series fed antenna.

In other aspects, antenna 1430 may include any other type of antenna.

In some demonstrative aspects, polarization-setting switch 1435 may be configured as a 4-state polarization switch. In one example, polarization-setting switch 1435 may be configured as a simplified version of the 6-state polarization-setting switch 1335 of FIG. 13. For example, polarization-setting switch 1435 may be configured to provide a selection between four polarization states, e.g., instead of the six polarization states supported by polarization-setting switch 1335 (FIG. 13).

In some demonstrative aspects, the 4-state polarization-setting switch 1435 may be implemented to provide a technical solution to reduce system complexity, e.g., in terms of size, area, path loss and/or the like.

In some demonstrative aspects, implementing the 4-state polarization-setting switch 1435, e.g., instead of the 6-state polarization-setting switch 1335 (FIG. 13), may be a good tradeoff to provide system optimization, e.g., in terms of size, area, path loss and/or the like.

In some demonstrative aspects, the 4-state polarization-setting switch 1435 may be configured for a stacked series fed Tx antenna.

In some demonstrative aspects, polarization-setting switch 1435 may be configured to switch antenna 1430 between four polarization states.

In other aspects, polarization-setting switch 1435 may be configured to switch antenna 1430 between any other number of polarization states.

In some demonstrative aspects, as shown in FIG. 14, polarization-setting switch 1435 may be configured to provide a first phase to a first port 1432, denoted "1", of the antenna 1430, and a second phase to a second port 1434, denoted "2", of the antenna 1430.

In some demonstrative aspects, as shown in FIG. 14, polarization-setting switch 1435 may include a differential amplifier 1440 including a first differential amplifier port 1442 on a first RF path 1422, and a second differential amplifier port 1444 on a second RF path 1424.

In some demonstrative aspects, the first differential amplifier port 1442 and the second differential amplifier port 1444 may have a phase difference of 180 degrees.

In some demonstrative aspects, as shown in FIG. 14, the first differential amplifier port 1442 may be coupled to the first port 1432 of the antenna 1430.

In some demonstrative aspects, as shown in FIG. 14, polarization-setting switch 1435 may include a configurable phase shifter 1460 configured to apply a configurable phase shift, denoted "A" between the second differential amplifier port 1444 and the second port 1434 of antenna 1430. For example, configurable phase shifter 1460 may be implemented using a 2-bit phase shifter on chip, and/or any other phase shifter.

In some demonstrative aspects, the configurable phase shift A may be configured, for example, based on the polarization setting according to the antenna polarization information 1045 (FIG. 10).

In some demonstrative aspects, a 4-state polarization-setting switch for a stacked series fed Rx antenna may be implemented, for example, in a similar way to the 4-state polarization-setting switch 1435, for example, by replacing PAs of differential amplifier 1440 with LNAs.

In some demonstrative aspects, polarization-setting switch 1435 may be configured to switch between the plurality of antenna polarization settings, e.g., the four polarization states, for example, based on states of configurable phase shifter 1460, e.g., as described below.

In one example, one or more polarization states of polarization-setting switch 1435 may be defined, for example, based on states of the configurable phase shifter 1460, e.g., as follows:

TABLE 2

| Phase shifter A state [°] | 1 | 2 | Resultant Antenna polarization |
|---|---|---|---|
| 0 | 0.5∠0° | 0.5∠180° | Linear horizontal |
| 180 | 0.5∠0° | 0.5∠0° | Linear vertical |
| 90 | 0.5∠0° | 0.5∠270° | LHCP |
| 270 | 0.5∠0° | 0.5∠90° | RHCP |

In other aspects, any other polarization states of polarization-setting switch 1435 may be defined based on any other states of phase shifter 1460.

Referring back to FIG. 10, in some demonstrative aspects, polarization-setting switch 1035 may be configured, for example, according to a third polarization-setting scheme, e.g., as described below.

In some demonstrative aspects, for example, according to the first polarization-setting scheme, polarization-setting switch 1035 may include a first differential amplifier including a first pair of differential amplifier ports having a phase difference of 180 degrees, e.g., as described below.

In some demonstrative aspects, for example, according to the first polarization-setting scheme, polarization-setting switch 1035 may include a second differential amplifier including a second pair of differential amplifier ports having a phase difference of 180 degrees, e.g., as described below.

In some demonstrative aspects, for example, according to the first polarization-setting scheme, polarization-setting switch 1035 may include a digitally configurable Balancing Unit (BALUN) configured to couple the first pair of differential amplifier ports to the first port 1032 of the antenna 1030 with the first phase 1031, and/or to couple the second pair of differential amplifier ports to the second port 1034 of the antenna 1030 with the second phase 1033, e.g., as described below.

In other aspects, polarization-setting switch 1035 may be configured according to any other additional or alternative polarization-setting scheme.

Figure 15:
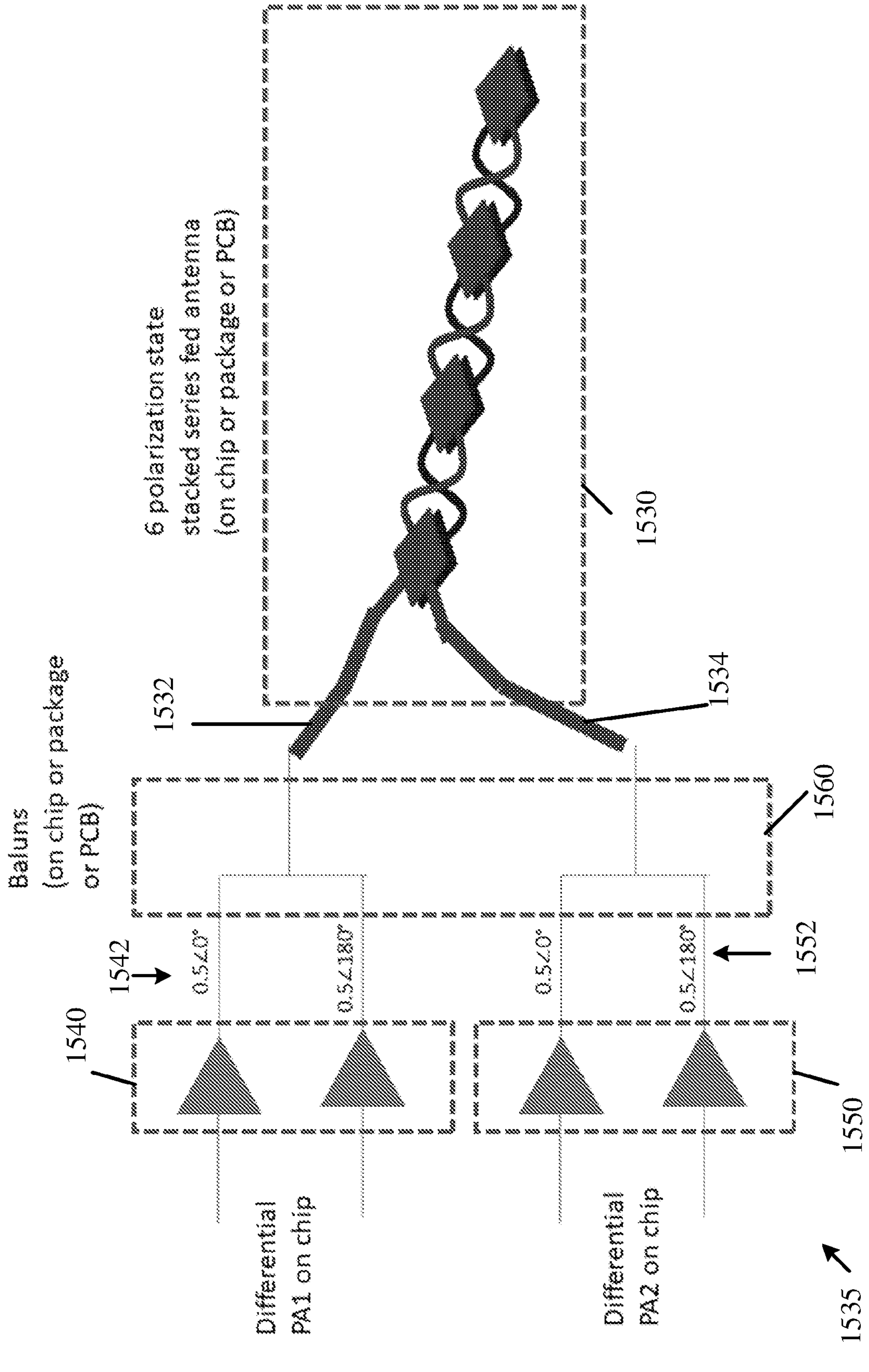
FIG. 15 is a schematic illustration of a polarization-setting switch, in accordance with some demonstrative aspects.

Reference is made to FIG. 15, which schematically illustrates a polarization-setting switch 1535, in accordance with some demonstrative aspects. For example polarization-setting switch 1035 (FIG. 10) may include one or more elements of polarization-setting switch 1535, and/or may perform one or more operations and/or functionalities of polarization-setting switch 1535.

In some demonstrative aspects, polarization-setting switch 1535 may be configured, for example, according to the third polarization-setting scheme.

In some demonstrative aspects, polarization-setting switch 1535 may be configured, for example, to switch an antenna 1530 of a radar device, e.g., radar device 910 (FIG. 9), between a plurality of antenna polarization settings. For example, MIMO antenna array 881 (FIG. 8) may include one or more elements of antenna 1530, and/or may perform one or more operations and/or functionalities of antenna 1530.

In one example, polarization-setting switch 1535 may be configured to switch the antenna 1530 to an antenna polarization setting. for example, according to the antenna polarization information 1045 (FIG. 10).

In some demonstrative aspects, as shown in FIG. 15, antenna 1530 may include a stacked series fed antenna.

In other aspects, antenna 1530 may include any other type of antenna.

In some demonstrative aspects, polarization-setting switch 1535 may be configured as a 6-state polarization switch In some demonstrative aspects, the 6-state polarization-setting switch 1535 may be configured for a stacked series fed Tx antenna.

In some demonstrative aspects, polarization-setting switch 1535 may be configured to switch antenna 1530 between six polarization states.

In other aspects, polarization-setting switch 1535 may be configured to switch antenna 1530 between any other number of polarization states.

In some demonstrative aspects, as shown in FIG. 15, polarization-setting switch 1535 may be configured to provide a first phase to a first port 1532 of the antenna 1530, and a second phase to a second port 1534 of the antenna 1530.

In some demonstrative aspects, as shown in FIG. 15, polarization-setting switch 1535 may include a first differential amplifier 1540 including a first pair of differential amplifier ports 1542 having a phase difference of 180 degrees.

In some demonstrative aspects, as shown in FIG. 15, polarization-setting switch 1535 may include a second differential amplifier 1550 including a second pair of differential amplifier ports 1552 having a phase difference of 180 degrees.

In some demonstrative aspects, as shown in FIG. 15, polarization-setting switch 1535 may include a digitally configurable BALUN 1560 configured to couple the first pair of differential amplifier ports 1542 to the first port 1532 of the antenna 1530 with the first phase, and/or to couple the second pair of differential amplifier ports 1552 to the second port 1534 of the antenna 1530 with the second phase.

In some demonstrative aspects, a 6-state polarization-setting switch for a polarization stacked series fed Rx antenna may be implemented, for example, in a similar way to the 6-state polarization-setting switch 1535 of FIG. 15, for example, by replacing PAs of differential amplifiers 1540 and 1550 by LNAs.

In some demonstrative aspects, polarization-setting switch 1535 may be implemented in a radar system, e.g., radar system 901 (FIG. 9), including a digital control on a phase of RF chains, e.g., Tx chains 810 (FIG. 8) and/or Rx chains 812 (FIG. 8).

In some demonstrative aspects, the digital control on the phase of the RF chains may allow to connect two RF chains to a same antenna 1530, e.g., to control the polarization states of the antenna 1530.

In some demonstrative aspects, the digital control on the phase of the RF chains may support a technical solution to avoid using analog phase shifters and/or a hybrid coupler, e.g., phase shifters 1470 and/or 1460 (FIG. 14), phase shifters 1370 and/or 1360 (FIG. 13), and/or 90-degree hybrid coupler 1350 (FIG. 13).

In some demonstrative aspects, the digital control on the phase of the RF chains may support a technical solution to avoid using the analog phase shifters and/or the hybrid coupler, for example, at an expense of resolution, e.g., two RF chains for a same antenna, and/or on at an expense in terms of cost, area, and/or price, e.g., due to doubling the RF chains for the same resolution.

In some demonstrative aspects, polarization-setting switch 1535 may be implemented to provide a technical solution to maximize digital radar usage, for example, while avoiding us of the analog phase shifters, which may require special calibration.

Figure 16:
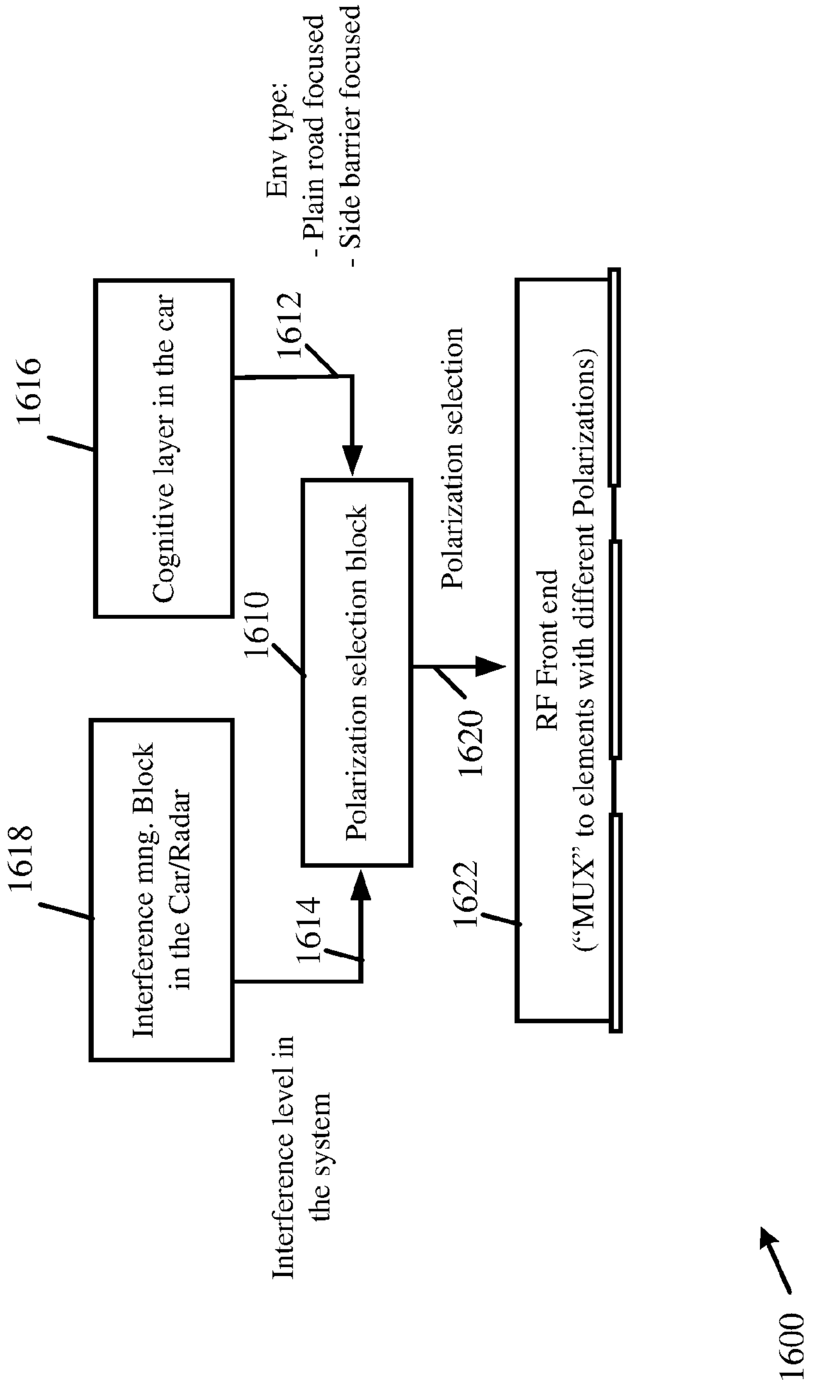
FIG. 16 is a schematic illustration of a polarization selection scheme to determine an antenna polarization to be applied for communication of radar signals, in accordance with some demonstrative aspects.

Reference is made to FIG. 16, which schematically illustrates a polarization selection scheme 1600 to determine an antenna polarization to be applied for communication of radar signals, in accordance with some demonstrative aspects.

In one example, processor 1040 (FIG. 10) may perform one or more operations and/or functionalities of radar processing scheme 1600, for example, to determine the antenna polarization setting to be applied for communication of the radar signals via antenna 1030 (FIG. 10).

In some demonstrative aspects, a processor 1610, e.g., processor 1040 (FIG. 10), may receive an environment-related attribute 1612 for example, from a cognitive layer 1616 and/or any other entity in a radar system in a vehicle, e.g., vehicle 901 (FIG. 9).

For example, the environment-related attribute 1612 may be based on driving scenario information corresponding to a driving scenario of the vehicle.

In some demonstrative aspects, processor 1610, e.g., processor 1040 (FIG. 10), may receive interference information 1614 corresponding to interference in the environment of the vehicle, e.g., vehicle 901 (FIG. 9), for example, from an interference manager 1618 and/or any other entity in the radar system in the vehicle, e.g., vehicle 901 (FIG. 9).

In some demonstrative aspects, the processor 1610, e.g., processor 1040 (FIG. 10), may determine a selected antenna polarization setting, e.g., from a plurality of antenna polarization settings, for example, based on the interference information 1614 and/or the environment-related attribute 1612.

In some demonstrative aspects, processor 1610, e.g., processor 1040 (FIG. 10), may generate antenna polarization information 1620, for example, based on the selected antenna polarization setting.

In some demonstrative aspects, processor 1610, e.g., processor 1040 (FIG. 10), may provide antenna polarization information 1620 to an RF frontend 1622. For example, RF frontend 1622 may include a polarization-setting switch, e.g., polarization setting switch 1035 (FIG. 10), which may be configured to switch the antenna of the radar device between the plurality of antenna polarization settings according to the antenna polarization information 1620.

In some demonstrative aspects, polarization selection scheme 1600 may be implemented for an RF channel, e.g., for each Tx channel and/or Rx channel, of a radar device, several elements of an antenna, e.g., antenna 1030 (FIG. 10), with different polarizations, e.g., for Tx and/or Rx.

In some demonstrative aspects, polarization selection scheme 1600 may use information existing in a radar system, e.g., the interference information 1614 and/or the environment-related attribute 1612, for example, to select, e.g., in real time, a preferred polarization setting, for example, based on the radar environment, e.g., a road, walls, interferences, and/or to assure optimal conditions to meet Radar Key Performance Indicators (KPIs).

In some demonstrative aspects, RF frontend 1622 may utilize configurable phase shifters and/or a 90-degree hybrid coupler, for example, to drive to a passive antenna element, e.g., of antenna 1330 (FIG. 13) and/or antenna 1430 (FIG. 13), different polarizations, which may be already coded before the antenna element. Accordingly, RF frontend 1622 may be simple, small and/or may have a low power consumption.

In some demonstrative aspects, RF frontend 1622 may use digital control on phases, for example, instead of configurable phase shifters and/or a 90-degree hybrid coupler, e.g., to maximize usage of a digital radar.

In some demonstrative aspects, the polarization selection scheme 1600 may be implemented to provide a technical solution to select a most suitable polarization setting, for example, based on the environment of the radar device. This implementation may allow to have inherent improved performance, for example, using polarization inherent immunity to multi-path and/or interference, e.g., as descried above.

In some demonstrative aspects, the polarization selection scheme 1600 may be implemented to provide a technical solution, which may support using a small and/or low-cost frontend, for example, to achieve a multi polarization frontend to be used for interference mitigation> This may be achieved, for example, using a frontend including available digital/analog shifters, e.g., in the mmWave band, e.g., as descried above.

In one example, polarization selection scheme 1600 may be operated in a high-way scenario and/or an open road scenario. According to this example, cognitive layer 1616 and/or any other entity of a radar system, e.g., radar system 901 (FIG. 9), which may be aware of the environment of the radar system, may move to a Long Range Radar (LRR) mode. Accordingly, processor 1610 may determine the V polarization setting, e.g., assuming no side walls and/or tunnels.

In another example, polarization selection scheme 1600 may be operated in a tunnel driving scenario. According to this example, cognitive layer 1616 and/or any other entity or an upper layer of a radar system, e.g., radar system 901 (FIG. 9), may be aware of the tunnel, e.g., from information provided by a navigation system of the vehicle. Accordingly, processor 1610 may determine the H polarization setting, e.g., assuming no side walls and/or tunnels, for example, based on the environment-related attribute 1612 from cognitive layer 1616.

In another example, polarization selection scheme 1600 may be operated in a dense environment including interferers. According to this example, interference manager 1618 and/or any other entity or an upper layer of a radar system, e.g., radar system 901 (FIG. 9), may be aware of levels of the interferences and/or the dense environment, and/or it may be assumed that urban low velocity cases may be identified as potentially interfered scenarios. Accordingly, processor 1610 may determine the linear diagonal polarization setting or the circular polarization setting, for example, based on the interference information 1614 from interference manager 1618.

Figure 17:
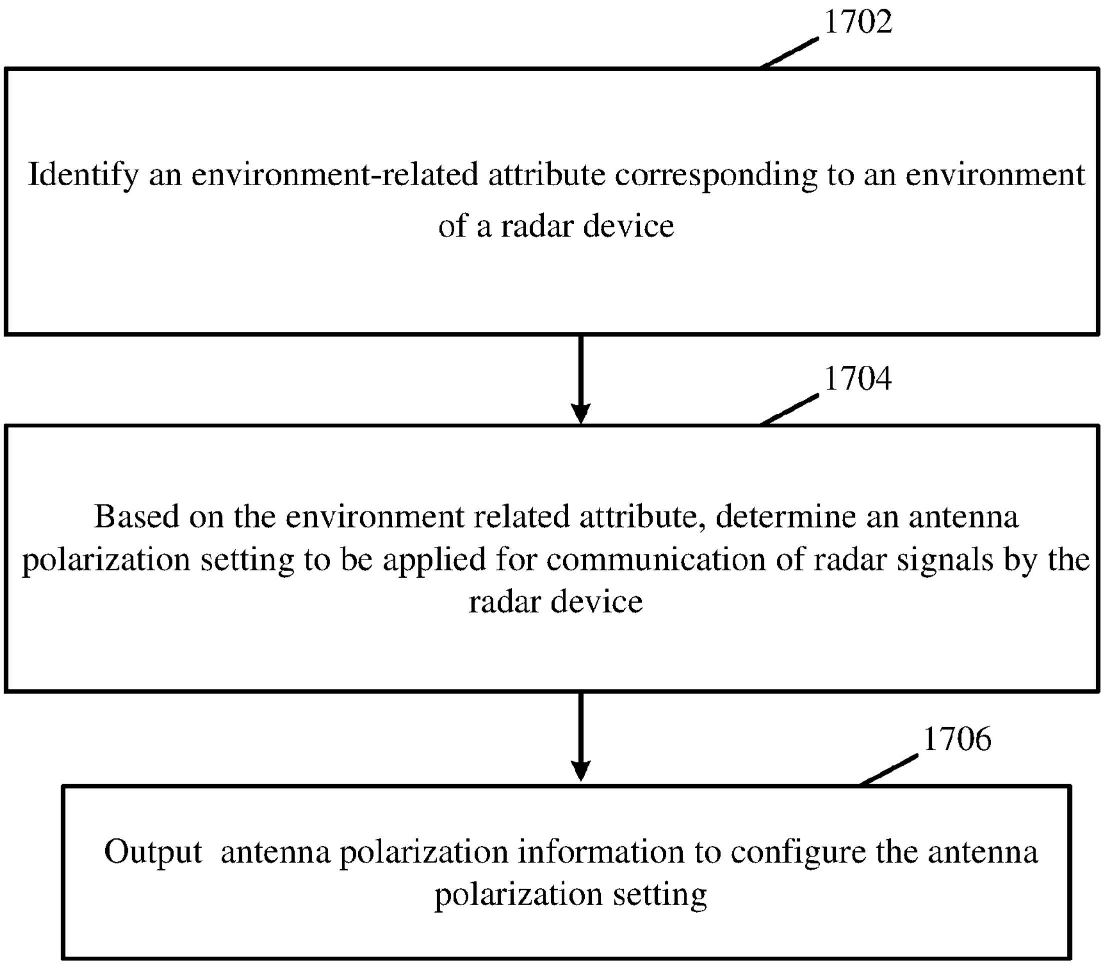
FIG. 17 is a schematic flow-chart illustration of a method of determining an antenna polarization setting to be applied for communication of radar signals, in accordance with some demonstrative aspects.

Reference is made to FIG. 17, which schematically illustrates a method of determining an antenna polarization setting to be applied for communication of radar signals, in accordance with some demonstrative aspects. For example, one or more of the operations of the method of FIG. 17 may be performed by a radar system, e.g., radar system 900 (FIG. 9), a radar device, e.g., radar device 101 (FIG. 1), radar device 800 (FIG. 8), and/or radar device 910 (FIG. 9); a processor, e.g., processor 1040 (FIG. 10), radar processor 834 (FIG. 8), and/or baseband processor 930 (FIG. 9); and/or a controller, e.g., controller 950 (FIG. 9).

As indicated at block 1702, the method may include identifying an environment-related attribute corresponding to an environment of a radar device. For example, processor 1040 (FIG. 10) may identify the environment-related attribute corresponding to the environment of radar device 910 (FIG. 9), e.g., as described above.

As indicated at block 1702, the method may include determining, based on the environment related attribute, an antenna polarization setting to be applied for communication of radar signals by the radar device. For example, processor 1040 (FIG. 10) may determine the antenna polarization setting to be applied for the communication of radar signals by the radar device 910 (FIG. 9), for example, based on the environment related attribute, e.g., as described above.

As indicated at block 1706, the method may include outputting antenna polarization information to configure the antenna polarization setting. For example, processor 1040 (FIG. 10) may be configured to cause output 1046 (FIG. 10) to output the antenna polarization information 1045 (FIG. 10) to configure the antenna polarization setting at RF frontend 1038 (FIG. 10), e.g., as described above.

Referring back to FIG. 9, in some demonstrative aspects, there may be a need to provide a technical solution to mitigate radio interference between radar devices, for example, radio interference at radar devices of vehicle 900, which may be caused by cross-talk and radar communications from other radar devices, e.g., of other vehicles, and/or one or more other radar communication sources, e.g., as described below.

In some demonstrative aspects, a number of vehicles equipped with radar devices may be expected to grow, for example, as importance of a radar sensor as an autonomous driving major sensor increases.

In some demonstrative aspects, radio interference between radar devices may be expected to grow as well, e.g., as a result of the increase in the number of autonomous vehicles utilizing radar devices.

In some demonstrative aspects, radio interference between radar devices may affect the performance of the radar devices, for example, in terms of a degraded radar effective range, a reduced probability of detections, an increase in a number of false alarm detections, and/or any other effects, which may degrade the radar performance.

In one example, reliability and/or immunity in the presence of an interference signal may be a challenging requirement from an automotive radar system.

In some demonstrative aspects, there may be a need to provide a technical solution to support an ability of an autonomous radar system to have continuous real-time knowledge on interference, for example, in order to maintain performance in dense environments. For example, there may be a need to provide a technical solution to support the provide the autonomous radar system with continuous real-time knowledge on interference, which may impact the automotive radar system, for example, in terms of frequency, strength, time profile, and/or any other attributes and/or parameters.

In some demonstrative aspects, a radar device, e.g., radar device 910, may include an interference detector, e.g., in the form of a dedicated interference detection system, which may be configured to detect interference in an environment of the radar device 910, e.g., an environment of vehicle 900. For example, the interference detection system may be implemented to provide a technical solution to mitigate interference in the environment of the radar device 910, for example, based on monitoring, e.g., continuously monitoring in real time, the interference in the environment of vehicle 900, e.g., as described below.

In some demonstrative aspects, for example, in some use cases, scenarios, and/or implementations, there may be one or more disadvantages, inefficiencies, and/or technical problems in an implementation using a post analog de-chirp Bandwidth (BW) scheme to extract one or more characteristics of interference, e.g., in-band and/or close-band interference characteristics. For example, the post analog de-chirp BW scheme may utilize Analog to Digital Converters (ADC) with a relatively low BW, for example, based on an Intermediate Frequency (IF) de-chirp signal and/or a post analog de-chirp signal. For example, interference classification may be limited when using a limited IF BW of a main ADC.

In one example, implementing the post analog de-chirp BW scheme may require implementation of a technique to separate the interference from a desired signal, which may not always be feasible, and/or may sometimes be limited to only strong interference. In another example, the limited IF BW may result in a limited visibility with respect to an entire available frequency BW. For example, the limited IF BW may not allow to know what happens outside the frequency in use.

For example, it may be important, in some cases, to know what happens outside a frequency in use, for example, to allow, successful frequency hopping, e.g., outside the frequency in use.

In another example, the interference may not always be aligned with a modulation, BW, and/or time in use. Accordingly, the interference may "blip" during the frame, which may not allow to track the interference properly, and/or to classify the interference correctly.

In some demonstrative aspects, a radar device, e.g., radar device 910, may be configured to implement an interference detector, e.g., in the form of a dedicated interference detection system, which may be configured to provide a technical solution to accommodate existing radar resources of the radar device, e.g., as part of an imaging radar in AV systems, e.g., radar system 901. For example, the interference detector may be implemented to support a technical solution to map and/or classify, e.g., continuously and/or in real-time, current interferences, and/or to define available radar resources, for example, in terms of time and/or frequency, e.g., as described below.

In some demonstrative aspects, the interference detector may be configured to accommodate the existing radar resources of the radar device, e.g., radar device 910, for example, using dedicated low cost and/or low power HW, e.g., as described below.

In some demonstrative aspects, the interference detector may be implemented to provide a technical solution, which may provide a systematic system model to monitor, e.g., continuously, some or all radio resources, e.g., an entirety of available radar resources, for example, in terms of time and/or frequency. For example, the interference detector may be implemented to monitor the radio resources for interference classification, for example, which may be used as an input for an interference mitigation process, e.g., as described below.

In some demonstrative aspects, the interference detector may be implemented to provide a technical solution to support interference detection and/or mitigation for SW defined radar systems. For example, the interference detector may be implemented to provide a technical solution to support imaging radar systems including wide band ADCs, which may be used, for example, to map and/or to classify interferences, e.g., as described below.

In some demonstrative aspects, the interference detector may be implemented to provide a technical solution of real-time HW-based tracking and/or interference classification, for example, to continuously monitor the frequency/time domain, and/or to collect statistics, for example, to support a processing data path in activating various mitigation techniques.

In some demonstrative aspects, the interference detector may be implemented to provide a technical solution utilizing one or more HW blocks for interference detection, for example, at one or more locations in an RF chain of a radar device, e.g., radar device 910, e.g., as described below.

In some demonstrative aspects, the interference detector may be implemented to provide a technical solution to support a wide ADC BW architecture, e.g., for a SW defined radar, for example, to support scale-up based on an available ADC BW, e.g., as described below.

In some demonstrative aspects, the interference detector may be implemented to provide a technical solution to support continuous real-time interference mapping and/or monitoring in the frequency/time domain, for example, while using one or more available radar building blocks, and/or while not compromising functionalities required to capture a radar scene, e.g., as described below.

In some demonstrative aspects, the interference detector may be implemented to provide a technical solution to improve usage of available time/frequency resources of a radar device, and/or to properly select, e.g., based on the interference mapping, one or more suitable interference mitigation techniques. For example, the interference mapping may allow switching, e.g., hopping to a clean, e.g., a non-interfered, time/frequency radio resource, and/or activating one or more radar mitigation techniques, e.g., by a dedicated HW mitigation block.

In some demonstrative aspects, the interference detector may be implemented to provide a technical solution to continuously monitor interferences, for example, in a manner which may provide continuous and/or reliable radar sensor performance, for example, for dynamic environments, e.g., which may be encountered by autonomous driving vehicles.

Figure 18:
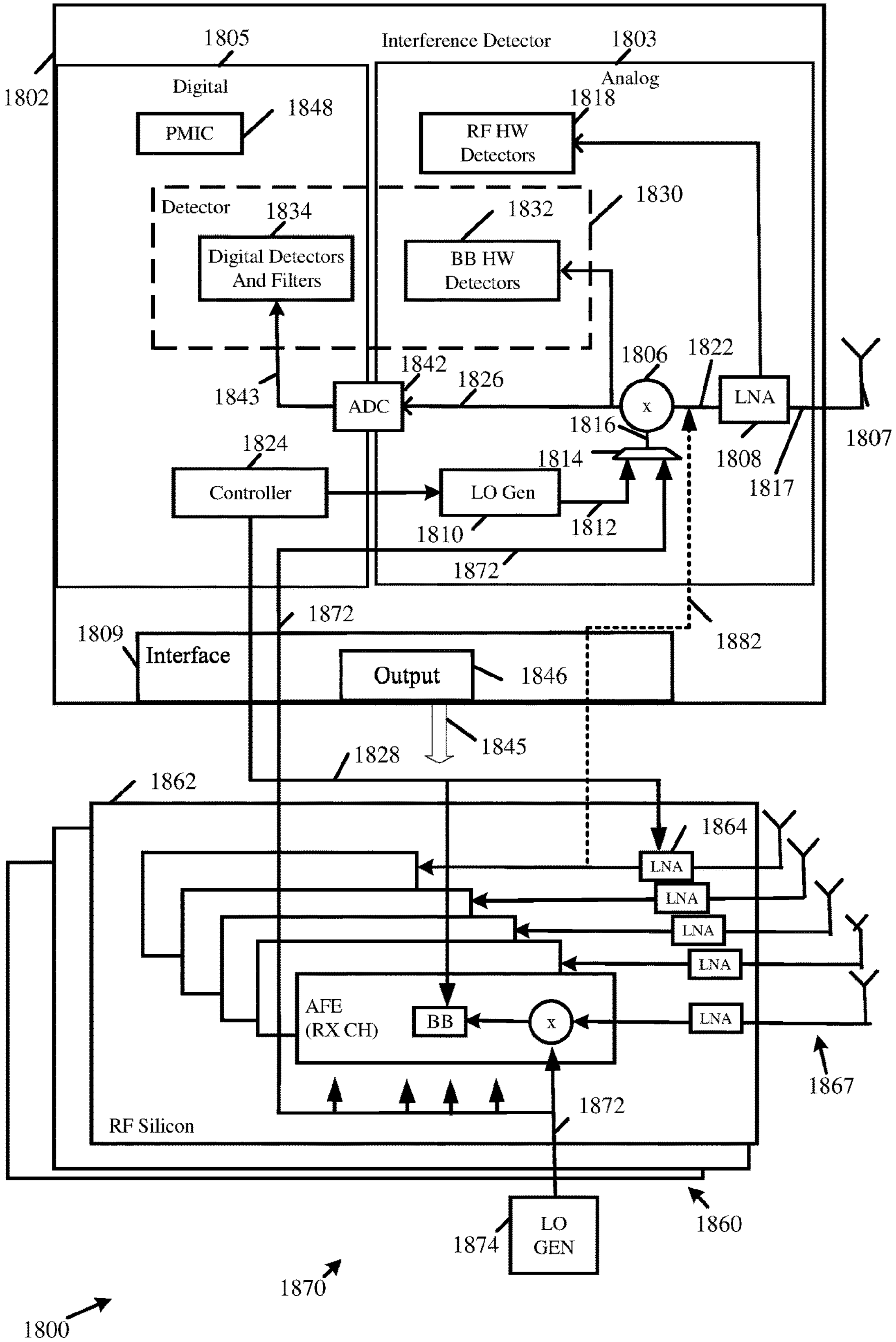
FIG. 18 is a schematic illustration of an apparatus, in accordance with some demonstrative aspects.

Reference is made to FIG. 18, which schematically illustrates an apparatus 1800, in accordance with some demonstrative aspects.

In some demonstrative aspects, apparatus 1800 may be implemented, for example, as part of a radar system, e.g., a radar system 901 (FIG. 9).

In some demonstrative aspects, apparatus 1800 may be implemented, for example, as part of a radar device, e.g., a radar device 910 (FIG. 9).

In some demonstrative aspects, apparatus 1800 may be implemented, for example, as part of a controller, e.g., controller 950 (FIG. 9).

In some demonstrative aspects, apparatus 1800 may be implemented, for example, as part of a radar processor, e.g., radar processor 834 (FIG. 8), and/or BB processor 930 (FIG. 9).

In some demonstrative aspects, apparatus 1800 may be configured to detect interference in an environment of a radar device, for example, radar device 910 (FIG. 9), e.g., as described below.

In some demonstrative aspects, apparatus 1800 may include an interference detector 1802 configured to detect the interference in the environment of the radar device, e.g., as described below.

In some demonstrative aspects, apparatus 1800 may include an RF frontend 1870 of the radar device, e.g., as described below. For example, RF frontend 1870 may include one or more elements of radar front end 804 (FIG. 8) and/or RFICs 920 (FIG. 9), and/or may perform one or more operations and/or functionalities of radar front end 804 (FIG. 8) and/or RFICs 920 (FIG. 9).

In some demonstrative aspects, RF frontend 1870 may include one or more RF Receive (Rx) chains 1860, e.g., implemented by RF Rx silicon chips, configured to process radar Rx signals from one or more antennas 1867 of the radar device, for example, according to a radar LO signal 1872, e.g., as described below.

In some demonstrative aspects, RF frontend 1870 may include, for example, an LO generator 1874 to generate the radar LO signal 1872.

In some demonstrative aspects, an RF Rx chain 1860 may include one or more Rx channels corresponding to the one or more antennas 1867.

In one example, the topology of radar frontend 1870 may reduce cost, e.g., for implementation in a vast MIMO Array imaging radar.

In some demonstrative aspects, interference detector 1802 may include an interface 1809 configured to interconnect and/or interface between interference detector 1802 and one or more other devices, components and/or elements of a radar device, for example, one or more components elements of radar device 910 (FIG. 9), and/or one or one or more components or elements of a radar system, e.g., radar system 901 (FIG. 9).

In some demonstrative aspects, interface 1809 may interconnect and/or interface between interference detector 1802 and a radar processor, e.g., radar processor 834 (FIG. 8), and/or BB processor 930 (FIG. 9), and/or a controller, e.g., controller 950 (FIG. 9).

In some demonstrative aspects, interface 1809 may interconnect and/or interface between interference detector 1802 and RF frontend 1870 of the radar device.

In some demonstrative aspects, interference detector 1802 may be implemented as part of RF frontend 1870.

In other aspects, interference detector 1802 may be implemented as part of any other, dedicated, or non-dedicated, element of a radar device, e.g., radar device 800 (FIG. 8) or radar device 910 (FIG. 9), and/or a radar system, e.g., radar system 901 (FIG. 9).

In some demonstrative aspects, interference detector 1802 may include an analog domain 1803 configured to perform one or more analog-domain operations and/or functionalities of interference detector 1802, e.g., as described below.

In some demonstrative aspects, interference detector 1802 may include a digital domain 1805 configured to perform one or more digital-domain operations and/or functionalities of interference detector 1802, e.g., as described below.

In some demonstrative aspects, interference detector 1802 may include a Local Oscillator (LO) signal generator 1810, e.g., as described below.

In some demonstrative aspects, interference detector 1802 may include a controller 1824 configured to control, cause, trigger and/or instruct, one or more elements and/or components of interference detector 1802 to perform one or more operations and/or functionalities, e.g., as described below.

In some demonstrative aspects, controller 1824 may include a micro controller, e.g., a low cost, low-power, and/or low complexity controller, which may be implemented as part of interference detector 1802.

In other aspects, controller 1824 may be implemented as part of any other, dedicated, or non-dedicated, element of a radar device, e.g., radar device 800 (FIG. 8) or radar device 910 (FIG. 9), and/or a radar system, e.g., radar system 901 (FIG. 9). For example, radar processor 834 (FIG. 8) may include one or more elements of controller 1824, and/or may perform one or more operations and/or functionalities of controller 1824; BB processor 930 (FIG. 9) may include one or more elements of controller 1824, and/or may perform one or more operations and/or functionalities of controller 1824; and/or controller 950 (FIG. 9) may include one or more elements of controller 1824, and/or may perform one or more operations and/or functionalities of controller 1824.

In some demonstrative aspects, controller 1824 may include, or may be implemented, partially or entirely, by circuitry and/or logic, e.g., one or more processors including circuitry and/or logic, memory circuitry and/or logic. Additionally or alternatively, one or more functionalities of controller 1824 may be implemented by logic, which may be executed by a machine and/or one or more processors, e.g., as described below.

In some demonstrative aspects, controller 1824 may be configured to cause the LO signal generator 1810 to generate a detector LO signal 1812 having an LO frequency corresponding to a frequency channel to be assessed for interference, e.g., as described below.

In some demonstrative aspects, interference detector 1802 may include a mixer 1806 configured to generate a mixed signal 1826, for example, by mixing the detector LO signal 1812 with a Radio Frequency (RF) signal 1822 received via an antenna 1807, e.g., as described below.

In some demonstrative aspects, antenna 1807 may be implemented as a dedicated antenna, which may be dedicated to communicate signals to be processed by the interference detector 1802, e.g., as described below.

In other aspects, antenna 1807 may include a shared antenna, which may be implemented using an antenna of an RF Rx chain, e.g., an Rx chain 1862, of radar front end 1870.

In some demonstrative aspects, interference detector 1802 may include a detector 1830 configured to detect interference on the frequency channel, for example, based on the mixed signal 1826, e.g., as described below.

In some demonstrative aspects, detector 1830 may be configured to detect interference on the frequency channel, for example, in the analog domain 1803 and/or in the frequency domain 1805, e.g., as described below.

In some demonstrative aspects, detector 1830 may include an analog detector 1832 configured to detect the interference on the frequency channel, for example, in the analog domain 1803, e.g., as described below.

In some demonstrative aspects, detector 1830 may include a digital detector 1834 configured to detect the interference on the frequency channel, for example, in the digital domain 1805, e.g., as described below.

In some demonstrative aspects, interference detector 1802 may be configured to generate detection information 1845, for example, based on detection of the interference on the frequency channel, e.g., as described below.

In some demonstrative aspects, detector 1830 may be configured to generate the detection information 1845, for example, based on the detection of the interference on the frequency channel, e.g., as described below.

In some demonstrative aspects, interference detector 1802 may include an output 1846 to provide the detection information 1845, for example, based on the detection of the interference on the frequency channel, e.g., as described below.

In some demonstrative aspects, interference detector 1802 may provide the detection information 1845, for example, to a radar processor configured to generate radar information based on the detection information A145, e.g., via output A146.

In some demonstrative aspects, interference detector 1802 may provide the detection information 1845, e.g., via output A146, for example, to radar processor 834 (FIG. 8), which may be configured to generate radar information 813 (FIG. 8) based on the detection information A145.

In some demonstrative aspects, interference detector 1802 may provide the detection information A145, e.g., via output A146, for example, to any other component and/or element of a radar device, e.g., radar device 910 (FIG. 9) and/or radar device 800 (FIG. 8), and/or a radar system, e.g., radar system 901 (FIG. 9).

In some demonstrative aspects, controller 1824 may be configured to cause the LO signal generator 1810 to generate a plurality of detector LO signals corresponding to a respective plurality of frequency channels to be assessed for interference, e.g., as described below.

In some demonstrative aspects, detector 1830 may be configured to generate the detection information 1845, for example, based on detection of interference over the plurality of frequency channels, e.g., as described below.

In some demonstrative aspects, the plurality of frequency channels may cover a radar frequency band for communication of radar signals by RF frontend 1870, e.g., as described below.

In some demonstrative aspects, the plurality of frequency channels may cover an entirety of a radar frequency band for communication of radar signals by RF frontend 1870, e.g., as described below.

In other aspects, the plurality of frequency channels may cover one or more parts of the radar frequency band for communication of radar signals by RF frontend 1870.

In some demonstrative aspects, controller 1824 may be configured to cause the LO signal generator 1810 to generate the detector LO signal 1812 corresponding to the frequency channel, for example, independent of a radar frequency channel for communicating radar signals by RF frontend 1870, e.g., as described below.

In some demonstrative aspects, controller 1824 may be configured to cause the LO signal generator 1810 to generate the detector LO signal 1812, for example, at a time which is independent of a radar communication period for communicating radar signals by RF frontend 1870, e.g., as described below.

In some demonstrative aspects, controller 1824 may be configured to cause the LO signal generator 1810 to generate the detector LO signal 1812, for example, independent of radar LO signal 1872, which may be used for processing the radar Rx signals received at RF frontend 1870, e.g., as described below.

In some demonstrative aspects, controller 1824 may be configured to selectively switch between using LO signal generator 1810 and LO generator 1874, for example, for monitoring an in-band frequency in use, e.g., as described below.

In some demonstrative aspects, controller 1824 may be configured to select between the detector LO signal 1812 and the radar LO signal 1872 for processing the RF signal 1822 received via antenna 1807, e.g., as described below.

In some demonstrative aspects, interference detector 1802 may include an LO selector 1814 configured to provide to the mixer 1806 a selected LO signal 1816, e.g., as described below.

In some demonstrative aspects, the selected LO signal 1816 may include the detector LO signal 1812 from the LO signal generator 1810, or the radar LO signal 1872, which is also to be applied to the RF Receive Rx chain 1862 of RF frontend 1870, e.g., as described below.

In some demonstrative aspects, controller 1824 may be configured to cause the LO selector 1814 to provide the selected LO signal 1816 including the detector LO signal 1812 from the LO signal generator 1810 or the radar LO signal 1872, e.g., as described below.

In one example, LO signal generator 1810 may include a degraded LO generator, e.g., compared to LO generator 1874. For example, LO signal generator 1810 may include a low power, low cost, and/or low specification LO generator, which may be configured to generate Lo signals suitable to scan different sections of the RF frequency band, e.g., assuming an antenna BW of antenna 1807 supports an entire allocated RF BW. For example, LO signal generator 1810 may implemented utilizing a degraded LO generator, which may be suitable for purposes of interference detection, and which may be not be required to support a high dynamic range, e.g., a low PN.

In some demonstrative aspects, interference detector 1802 may include a Power Management Integrated Circuit (PMIC) 1848 configured to manage a power state of the interference detector, e.g., as described below.

In some demonstrative aspects, PMIC 1848 configured to manage a power state of the interference detector, for example, independent of a power state of the RF frontend 1870, e.g., as described below.

In some demonstrative aspects, interference detector 1802 may be configured as an Always On (AON) detector, which may be operable, for example, independent of the power state of the RF frontend 1870, e.g., as described below.

For example, PMIC 1848 may be configured to operate interference detector 1802 as the AON detector.

In some demonstrative aspects, interference detector 1802 may be configured as the AON detector, for example, to support implementation of a relatively reliable imaging radar, which may require a dedicated AON block with a responsibility, e.g., a sole responsibility, to continuously map interference and/or report interferences to one or more higher levels. For example, interference detector 1802 may be implemented on a dedicated power island, and/or may be fed from a dedicated PMIC, e.g., PMIC 1848, which may be configured to handle low current, e.g., efficiently. In one example, interference detector 1802 may be configured to sense interference continuously, for example, while other blocks of a radar device, e.g., RF frontend 1870, may be shut down. For example, interference detector 1802 may be operated to monitor and/or detect interference, for example, even while some or all of the "expensive power" RF/digital blocks, e.g., of RF frontend 1870, may be shut down.

In some demonstrative aspects, interference detector 1802 may include a configurable Low Noise Amplifier (LNA) 1808 configured to amplify a signal 1817 from the antenna 1807, e.g., as described below.

In some demonstrative aspects, RF signal 1822 may be based, for example, on an output of the configurable LNA 1808, e.g., as described below.

In some demonstrative aspects, controller 1824 may configure the configurable LNA 1808, for example, based on the frequency channel to be assessed for interference, e.g., as described below.

In some demonstrative aspects, controller 1824 may control, cause and/or instruct an other LNA, e.g., which is not part of, and/or is external to, interference detector 1802, for example, based on the frequency channel to be assessed for interference, e.g., as described below.

In some demonstrative aspects, controller 1824 may control, cause and/or instruct the other LNA to provide an RF signal 1882, which may be used for interference detection at interference detector 1802, for example, instead of RF signal 1822 from LNA 1808. In one example, interference detector 1802 may be implemented without LNA 1808, e.g., in case RF signal 1882 is used for interference detection at interference detector 1802.

In some demonstrative aspects, controller 1824 may be configured to generate a control signal to control an LNA 1864 of RF Rx chain 1862 of RF frontend 1870 to provide the RF signal 1882, for example, based on the frequency channel to be assessed for interference, e.g., as described below.

In some demonstrative aspects, interference detector 1802 may include an RF detector 1818 configured to detect the interference on the frequency channel, for example, based on the RF signal 1822, e.g., as described below.

In some demonstrative aspects, RF detector 1818 may include one or more RF HW detectors configured to monitor jamming in the RF domain 1803.

In some demonstrative aspects, RF detector 1818 may be configured to detect RF LNA saturation, for example, at an RF frequency domain, e.g., a 80 GHz frequency domain, which may cause one or more signal integrity issues.

In some demonstrative aspects, RF detector 1818 may be utilized to prevent permanent damage, for example, in case of a very close radar interferer, for example, in a traffic jam scenario including a front car, which may be located a few centimeters from a radar device implementing apparatus 1800.

In one example, damage to the radar device, e.g., at an RF frequency domain between 70-90 GHz, may be caused by relatively strong signals, e.g., having a gain of 10 dBm or above.

For example, the damage to the radar device, e.g., at the RF frequency domain between 70-90 GHz, may be caused by signals, which may cause an LNA output, e.g., the LNA output of LNA 1808, to be above 2Vdd. This situation may lead to permanent damage to one or more transistors of interference detector 1802.

In some demonstrative aspects, RF detector 1818 may be configured to monitor an interference level of the interference, for example, on the carrier domain, e.g., at the RF frequency domain between 70-90 GHz.

In one example, RF detector 1818 may be configured to monitor drawn currents and bias of the LNA 1808, for example, in the analog domain 1803, for example, to identify the drawn currents and bias in the RF domain, e.g., even before signal 1817 is down converted and/or further compressed by baseband blocks.

In another example, monitoring of the drawn currents and bias of one or more LNAs may be performed in any other domain, e.g., in addition to or instead of the RF domain.

In some demonstrative aspects, a lower power interference signal may be monitored in the BB domain, e.g., by detector 1830, for example, after down conversion of the received signals, e.g., as described below.

In some demonstrative aspects, RF detector 1818 may be configured to provide RF detector feedback, for example, to controller 1824 and/or LNA 1808, for example, to reduce gain, for example, when needed, of one or more LNAs, e.g., LNA 1808.

In some demonstrative aspects, the RF detector feedback may be provided, for example, by discrete real-time HW lines connecting between RF detector 1818 and the RF LNA 1808, for example, to notify the LNA 1808 to reduce gain, for example, in case of high power jammers, which may exceed gain attenuation. For example, LNAs may usually have at least ~6-12 dB gain attenuation options.

In some demonstrative aspects, the RF detector feedback may be provided, for example, to controller 1824. For example, controller 1824 may include counters and/or tracking logic, which may be configured to map each frequency band with a level of energy and/or duration over time, for example, to build and/or update a frequency/time resource map, for example, a 2D frequency/time resource map, e.g., as described below.

In some demonstrative aspects, the RF detector feedback may be provided, for example, as an indication, for example, to RF frontend 1870, for example, to reduce a transmission power of a transmitter of an RF chain, for example, when a current frequency region is blocked.

In some demonstrative aspects, analog detector 1832 may be configured to detect the interference on the frequency channel, for example, based on the mixed signal 1826 in the analog domain 1805, e.g., as described below.

In some demonstrative aspects, analog detector 1832 may include a High Pass Filter (HPF), an energy detector, and/or an envelope detector, e.g., as described below.

In other aspects, analog detector 1832 may include any other additional and/or alternative analog detector components.

In some demonstrative aspects, interference detector 1802 may include an Analog to Digital Converter (ADC) 1842 configured to generate a digital signal 1843 based on the mixed signal 1826, e.g., as described below.

In some demonstrative aspects, digital detector 1834 may be configured to detect the interference on the frequency channel, for example, based on the digital signal 1843, e.g., as described below.

In some demonstrative aspects, digital detector 1834 may include a decimation filter, a digital filter, and/or a digital correlation detector, e.g., as described below.

In other aspects, digital detector 1834 may include any other additional and/or alternative digital detector components.

In some demonstrative aspects, detector 1830 may be configured to detect the interference in the environment of the radar device, e.g., radar device 910 (FIG. 9), for example, based on a down-converted signal, e.g., mixed signal 1826.

In some demonstrative aspects, detector 1830 may include one or more filters, for example, configured to narrow down a "search region", e.g., in the radar frequency band, for example, to provide an improved accuracy and/or mapping resolution of a location of the interference.

In some demonstrative aspects, detector 1830 may be operated to focus on clipping effects, for example, as the LNA 1808 may protect the RF chain of interference detector 1802, and/or the baseband signal 1826 may be limited to swings between 0-VDD.

In some demonstrative aspects, detector 1830 may be configured to perform one or more pre-ADC detection operations, e.g., before ADC 1842, to detect the interference, for example, using one or more BB analog components in the analog domain 1803, for example, by analog detector 1832.

In some demonstrative aspects, detector 1830 may be configured to perform one or more post-ADC detection operations, e.g., after ADC 1842, to detect the interference using one or more BB digital components in the digital domain 1805, for example, by digital detector 1834.

In some demonstrative aspects, ADC 1842 may include a dedicated ADC, which may be implemented, for example, separate from and/or in addition to, a main ADC of RF frontend 1870.

In some demonstrative aspects, ADC 1842 may include a high BW ADC, for example, with low resolution. For example, ADC 1842 may be configured to capture a wide BW, e.g., when needed, while providing enough resolution suitable to identify presence of the interference.

In some demonstrative aspects, ADC 1842 may be operated, e.g., with LO generator 1810, for example, in parallel to and/or independent of, the main ADC. The ability to operate ADC 1842 in parallel to and/or independent of the main ADC of the RF frontend 1870 may provide a technical solution to allow detector 1830 to scan a wide frequency band, e.g., an entire frequency band, for interference.

In some demonstrative aspects, interference detector 1802 may be configured to selectively utilize the main ADC, e.g., instead of ADC 1842, for example, with LO generator 1810 or LO generator 1874, e.g., for optimization purposes For example, interference detector 1802 may utilize the main ADC to scan for interference between radar frames, for example, in case ADC 1842 is not implemented.

In some demonstrative aspects, the maim ADC may be utilized by interference detector 1802, e.g., instead of ADC 1842, for example, to provide a technical solution to save area, e.g., as ADC 1842 may not be required. However, using the maim ADC for interference detection purposes may increase a power consumption, e.g., as an entire RF front end, e.g., RF frontend 1870, may be required to be awake for longer periods.

In some demonstrative aspects, the dedicated ADC, e.g., ADC 1842, may be implemented to provide a technical solution to operate interference detector 1802 as a low power device, e.g., on a power island. For example, interference detector 1802 may be fed from an efficient PMIC with low overhead, e.g., PMIC 1848, which may be optimized to meet power consumption, e.g., low power consumption, of interference detector 1802.

In some demonstrative aspects, analog detector 1832 may be configured to perform one or more pre-ADC detection operations to detect the interference using BB analog components in analog domain 1803. For example, detector 1832 may be configured to detect interference based on mixed signal 1826, e.g., as descried below.

In some demonstrative aspects, analog detector 1832 may include a HPF, and an analog bank filter configured to filter mixed signal 1826, and/or monitor an out-band signal.

In some demonstrative aspects, analog detector 1832 may include an energy detector including, for example, a feed energy detector, and/or any other energy detector components.

In some demonstrative aspects, the feed energy detector may include a single buffer and/or a series of comparators, e.g., for peak energy detection, and/or for signal zero crossing metrics.

In some demonstrative aspects, the feed energy detector may include an envelope detector and an energy detector, e.g., after the envelope detector, for example, to detect energy based on a series of comparator levels.

In other aspects, the energy detector may include any other type of energy detector.

In some demonstrative aspects, analog detector 1832 may be configured to provide an analog BB feedback, for example, to one or more elements and/or components of interference detector 1802, and/or a radar device, e.g., radar device 910 (FIG. 9).

In one example, the analog BB feedback from analog detector 1832 may be provided to one or more BB LNAs, e.g., BB LNA 1808 and/or one or more LNAs f RF frontend 1870, for example, by discrete real-time HW lines and/or by any other connection. For example, the analog BB feedback may configure the BB LNAs to reduce gain in order to prevent clipping.

In another example, the analog BB feedback from analog detector 1832 may be provided to controller, e.g., controller 1824, which may include counters and/or tracking logic. For example, the counters and/or tracking logic may be configured to map frequency band, e.g., each frequency band with a level of energy and/or a duration over time, for example, to build and/or update a 2D frequency/time resource map.

In some demonstrative aspects, the analog BB feedback may be provided, for example, as an indication, for example, to RF frontend 1870. For example, the analog BB feedback may be configured to indicate to RF frontend 1870 to reduce a transmission power of a transmitter of the RF frontend, for example, when a current frequency region is blocked.

In some demonstrative aspects, digital detector 1834 may be configured to perform the one or more post-ADC detection operations, for example, to detect the interference using BB digital components, e.g., as descried below.

In some demonstrative aspects, ADC 1842 may be implemented to provide a technical solution of interference detection using simplified, small, and/or dedicated digital filters, e.g., which may be included in digital detector 1834.

In some demonstrative aspects, digital detector 1834 may include one or more decimation filters.

In some demonstrative aspects, the decimation filters may be implemented, for example, using a digital implementation, e.g., a cheap digital implementation, having a small number of taps, which may have sufficient rejection for the purpose of interference detection.

In some demonstrative aspects, the decimation filters may digitally monitor one or more decimation stages, e.g., every decimation stage, of the energy. In one example, a decimation filter, e.g., each decimation filter, may include several stages of digital filters. In one example, a digital filter, e.g., each one of the digital filters, may reflect a different frequency band.

In one example, the decimation filters may be based on a wide band characteristic of the ADC 1842.

In another example, for example, in an implementation using the main ADC of RF frontend 1870 instead of ADC 1842, the decimation filters may sweep the entire frequency band, for example, during a longer time.

In some demonstrative aspects, the decimation filters may be used with digital filter banks, e.g., similar to the analog filter banks. For example, in some cases, a cost of area/power of a digital implementation of the digital filter banks may be more efficient.

In some demonstrative aspects, integration time of digital detector 1834 may be increased, for example, in order to improve performance of digital detector 1834. For example, increasing the integration time may introduce a tradeoff between added SNR an resolution in time, or a scan time, e.g., when skipping between several frequencies.

In one example, it may be assumed that the integration time may be in the realm of tens of microseconds, for example, to avoid an assumption that the interference is stationary overtime, which may not always be valid.

In some demonstrative aspects, digital detector 1834 may include a digital correlation detector, e.g., an advanced digital correlation detector, for example, a match filter. In one example, the digital correlation detector may be implemented in addition to the energy detector, e.g., as descried below.

In some demonstrative aspects, the digital correlation detector may be implemented, for example, by performing a simple Fast Fourier Transform (FFT) and monitoring an output of the FFT. For example, although this implementation may not include a pure match filter, it may include some compute integration on narrow-band (NB)_frequencies of a signal, e.g., for short time periods.

In some demonstrative aspects, the digital correlation detector may include, for example, a cross correlation (XCORR) filter, for example, with a varied set of masks.

In some demonstrative aspects, a mask, e.g., each mask, of the varied set of masks may represent a different modulation type, e.g., Pulse-Width Modulation (PWM), Linear Frequency Modulation (LFM) with different BW, Slopes, and/or the like.

In some demonstrative aspects, a modular XCORR filter may be utilized, for example, to provide an interference map by modulation type, for example, assuming the interference may react more to a matching modulation.

In other aspects, the digital correlation detector may include, for example, Least Mean Squares (LMS) filter, e.g., an Advanced LMS filter.

In some demonstrative aspects, the LMS filter may be locked and trained on an input signal. For example, once interference is present, the LMS filter may extract one or more key parameters of the interference signal. In one example, up to 20 taps may define, e.g., quite accurately, a BW and/or a slope of the interference signal.

In other aspects, the digital correlation detector may include, for example, any other correlation filter.

In some demonstrative aspects, digital detector 1834 may be configured to provide a digital BB feedback, for example, to one or more elements and/or components of interference detector 1802, and/or a radar device, e.g., radar device 910 (FIG. 9).

For example, the digital BB feedback from digital detector 1834 may be provided to one or more BB LNAs, e.g., to reduce gain to prevent clipping.

In one example, the digital BB feedback from digital detector 1834 may be provided to one or more BB LNAs, for example, by discrete real-time HW lines or by any other connection.

In another example, the digital BB feedback from digital detector 1834 may be provided to a controller, e.g., controller 1824, which may include counters and/or tracking logic. For example, the counters and/or tracking logic may be configured to map a frequency band. e.g., each frequency band, with a level of energy and/or a duration over time, for example, to build and/or update the 2D frequency/time resource map.

In some demonstrative aspects, the digital BB feedback may be provided, for example, as an indication, for example, to an RF frontend, e.g., RF frontend 1870. For example, the digital BB feedback may indicate to the RF frontend 1870 to reduce a transmission power of a transmitter of an RF chain, for example, when a current frequency region is blocked.

In some demonstrative aspects, the digital BB feedback may be provided, for example, to one or more interference mitigation hardware blocks, e.g., in a data path. For example, the digital BB feedback may provide information with respect to the interference and/or modulation type, for example, for better cancellation of the interference by the one or more interference mitigation hardware blocks. For example, the digital BB feedback may be provided to the one or more interference mitigation hardware blocks, for example, when the digital correlation detector includes the XCORR filter including several modulations correlators.

Figure 19:
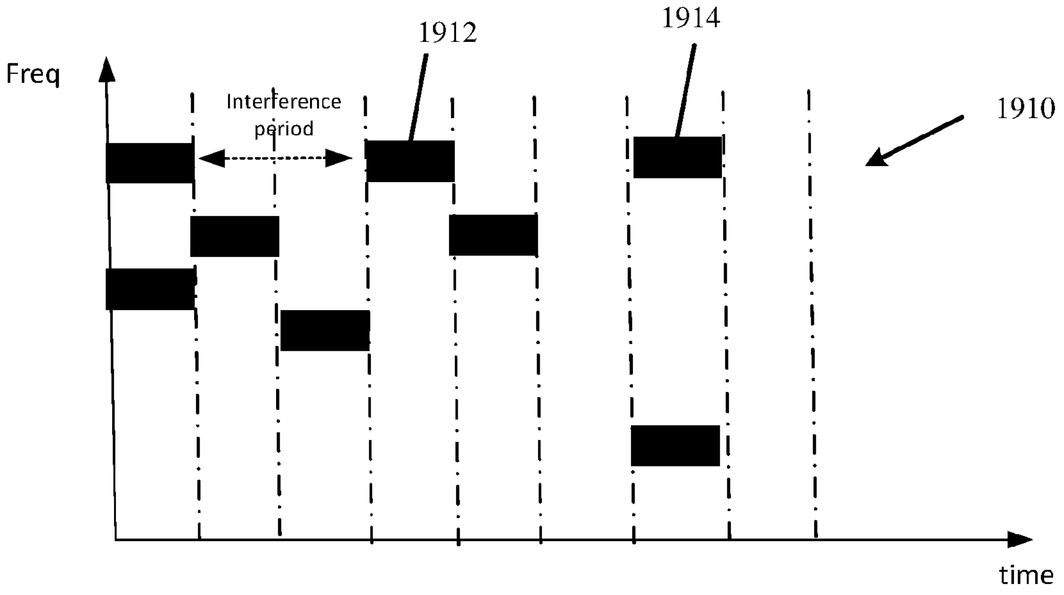
FIG. 19 is a schematic illustration of a frequency/time resource map, in accordance with some demonstrative aspects.

Reference is made to FIG. 19, which schematically illustrates a frequency/time resource map 1900, in accordance with some demonstrative aspects. For example, interference detector 1802 (FIG. 18) may be configured to generate detection information 1845 (FIG. 18) in the form of frequency/time resource map 1900.

In some demonstrative aspects, as described herein, the frequency/time resource map 1900 may map frequency resources and/or time resources of a radar device. However, in other aspects any other map may be generated representing any other additional and/or alternative resources of a radar device.

In some demonstrative aspects, as shown in FIG. 19, the frequency/time resource map 1900 may include a plurality of listening slots 1910.

In some demonstrative aspects, as shown in FIG. 19, a listening slot 1910 may correspond to a specific frequency band at a specific time slot.

For example, a first listening slot 1912 may correspond to a first frequency band and a first time slot, and/or a second listening slot 1914 may correspond to a second frequency band and a second time slot. For example, the first frequency band may be different from the second frequency band, and/or the first time slot may be different from the second time slot.

In some demonstrative aspects, a plurality of interference detectors, e.g., interference detectors 1802 (FIG. 18), may be implemented to scan different frequency bands. For example, one or more periods of inferences including a strength of the interference may be identified, for example, by combining outputs of the interference detectors.

In one example, a frequency width of frequencies covered by interference detector 1802 (FIG. 18) in a single scan may depend, for example, a width of an ADC in the detector path, e.g., ADC 1834 (FIG. 18). For example, a higher ADC width may support a wider frequency width per scan.

In another example, a radar device implementing a plurality of RF chips may be used to provide a plurality of parallel detection chains, which may cover more frequencies over time. For example, the plurality of RF chips may be utilized to cover a plurality of different modulation types, and/or any other suitable detector parameters.

Referring back to FIG. 8, in some demonstrative aspects, an Rx chain 812, e.g., each Rx chain 812 or some of the Rx chains 812, may be configured to process RF signals over a configurable RF channel in a millimeterWave (mmWave) frequency bandwidth, e.g., as described below.

In some demonstrative aspects, Rx chains 812 may be configured to process RF signals over a mmWave frequency bandwidth of 76-81 Gigahertz (GHz), e.g., as described below.

In other aspects, the Rx chains 812 may be configured to process RF signals over any other mmWave frequency band, and/or any other RF signals.

In some demonstrative aspects, in some use, cases, scenarios, deployments, and/or implementations, there may be a need to provide a technical solution to process Rx RF signals over a configurable channel within the mmWave frequency bandwidth, e.g., as described below.

In some demonstrative aspects, the frequency bandwidth of 76-81 GHz may be utilized by an automotive radar system, e.g., radar system 901 (FIG. 9), for example, as this frequency band may provide a relatively large available bandwidth per mmWave frequency channel. For example, the relatively large available bandwidth per mmWave channel may be utilized to support increased range resolution for radar processing.

In some demonstrative aspects, in some use, cases, scenarios, deployments, and/or implementations, there may be a need to provide a technical solution to support operation and/or co-existence of radar units of different radar systems, e.g., radar units installed on different vehicles, which may be co-located in a same area, e.g., a road, a junction, an interchange, a parking lot, or the like.

For example, in contrast to wireless communication technologies, there is currently no standard or protocol in-place, which includes rules and/or definitions to govern the operation and co-existence of multiple radar units installed on different vehicles that are co-located in the same area.

In some demonstrative aspects, a bandwidth of a radar signal in the mmWave frequency band may cover only part of an available mmWave frequency band. In one example, a radar signal in the mmWave frequency may be communicated over a bandwidth of about 1 GHz or less, for example, although a total frequency bandwidth of about 5 GHz may be available in the mmWave frequency bandwidth of 76-81 GHz. In other aspects, any other signal bandwidth and/or mmWave frequency band may be used.

In one example, the frequency bandwidth of radar signals in the mmWave frequency band may be limited to part of an available mmWave frequency band, e.g., a the frequency bandwidth of about 1 GHz or less, for example, in order to support co-existence between different nearby radar systems, and/or in order to avoid interference originating from nearby radar systems.

In another example, the frequency bandwidth of radar signals in the mmWave frequency band may be limited to part of an available mmWave frequency band, e.g., a the frequency bandwidth of about 1 GHz or less, for example, due to sampling rate limitations and/or post processing limitations of a radar system.

In some demonstrative aspects, one or more frontend blocks of a radar frontend, e.g., radar frontend 804, for example, all frontend blocks up to a first mixer of the radar frontend and/or any other frontend blocks, may be configured to cover a wide frequency bandwidth, which may be wider than the frequency bandwidth of radar signals. For example, one or more frontend blocks of the radar frontend the may be configured to cover substantially an entire frequency bandwidth of 76-81 GHz.

For example, configuration of the frontend blocks of a radar system to support the wide frequency bandwidth may make the radar system susceptible for nearby interference over the entire frequency bandwidth of 76-81 GHz. For example, this interference may cause compression to baseband blocks of an RF frontend, e.g., although the baseband blocks may be configured for a limited bandwidth, e.g., corresponding to the frequency bandwidth of the radar signals.

In some demonstrative aspects, there may be a need to provide a technical solution to support a radar device in covering a wide frequency bandwidth, e.g., substantially the entire frequency bandwidth of 76-81 GHz and/or any other frequency bandwidth in the mmWave frequency band, for example, while avoiding interference originating from nearby radar systems, e.g., as described below.

In some demonstrative aspects, an Rx chain 812, e.g., each Rx chain 812, may be configured to provide a technical solution to provide improved, e.g., increased, resilience of a radar system, e.g., radar system 901 (FIG. 9), to out-of-channel interference, e.g., as described below.

In some demonstrative aspects, an Rx chain 812, e.g., each Rx chain 812 or some of the Rx chains 812, may be configured to provide a technical solution to support selective configuration of an RF channel for processing in the mmWave frequency band, e.g., the 76-81 GHz band, e.g., as described below.

In some demonstrative aspects, an Rx chain 812, e.g., each Rx chain 812, may be configured to provide a technical solution to support selective configuration of the RF channel for processing in the mmWave frequency band, for example, independent of a frequency bandwidth ("frontend bandwidth") processed by a frontend of the radar device, e.g., as described below.

In some demonstrative aspects, in some use, cases, scenarios, deployments, and/or implementations, there may be one or more technical issues with an implementation utilizing an RF adjustable adjacent channel filter for an Rx chain. For example, an RF adjustable adjacent channel filter, which is configured to cover the entire application bandwidth, may be considered as a "holy grail" of receivers.

In one example, the RF adjustable adjacent channel filter may have several implementation limitations, for example, due to a very high Q factor, which may be required for implementation of the RF adjustable adjacent channel filter. Accordingly, the RF adjustable adjacent channel filter may be implemented with reasonable losses, e.g., only for very low frequencies, for example, using lumped elements.

In another example, some implementations of the RF adjustable adjacent channel filter, for example, Micro Electro Mechanical implementations of the RF adjustable adjacent channel filter, and/or implementations of the RF adjustable adjacent channel filter using RF photonic filters, may be efficient at higher frequencies. However, these implementations may not be suitable for on-chip implementations, since there implementations may be relatively expensive and bulky.

In some demonstrative aspects, for example, in some use cases, scenarios, and/or implementations, there may be one or more disadvantages, inefficiencies, and/or technical problems in implementation of an adjacent channel filter based on a direct conversion scheme, e.g., as described below.

For example, the direct conversion scheme may be configured to down-convert a received signal directly to baseband, which may allow baseband filtering of an adjacent channel. For example, the received signal may be filtered, e.g., with a low-pass filter, which may fit exactly a required channel bandwidth. Accordingly, the direct conversion may allow to easily set a bandwidth of the adjacent channel.

In one example, the direct conversion scheme may allow to easily configure the required channel bandwidth, for example, when implementing an active filter. For example, the active filter may reject any out-of-band interference, e.g., in an ideal implementation. However, the active filter may be based on an operational amplifier (op-amp), which may be required to have a bandwidth, which is wider than a bandwidth of the active filter. For example, this limitation may make the active filter susceptible for strong interference, e.g., even for interference that is out of a required channel bandwidth, for example, as adjacent channels may be filtered, e.g., conditioned the op-amp is working properly and/or not compressed. In addition, the direct conversion scheme may utilize a mixer, which may be followed by a Trans-Impedance-Amplifier (TIA). For example, the TIA may be implemented by another op-amp, which may make a chain, e.g., including two op-amps, even more vulnerable to strong interference, which may compress the TIA and/or the active filter.

In one example, a passive filter may be configured to overcome the technical problems of the active filter. For example, the passive filter may first reject the interference, and allow further amplification of the filtered signal.

In some demonstrative aspects, for example, in some use cases, scenarios, and/or implementations, there may be one or more disadvantages, inefficiencies, and/or technical problems in implementations utilizing an adjacent channel filter according to a direct conversion scheme using a passive filter, e.g., as described below.

In one example, a passive filter to support a relatively wide frequency bandwidth, e.g., a channel bandwidth of up to about 1 GHz, may have an enormous silicon size, e.g., based on inductors of the passive filter.

In another example, a Q-factor of an implemented inductor of the passive filter may be poor, which may result in an increase of an overall Noise Figure (NF) of an Rx chain.

In another example, an RC implementation of the passive filter may be implemented, for example, to decrease the silicon area for the passive filter. However, the RC implementation of the passive filter may result in even higher losses, and/or NF degradation of the Rx chain.

In another example, a configurable adjacent channel filter at an RF frequency band may be utilized to address one or more of the technical issues of the direct conversion scheme with the passive filter and/or the active filter. However, on-chip implementations of such configurable adjacent channel filters may be limited to very low frequencies, e.g., frequencies where on resistance of switches may be low enough, e.g., with negligible parasitic effects, and/or where high Q variable capacitors may be feasible.

In some demonstrative aspects, an adjacent channel filter may be implemented based on a double conversion scheme, e.g., as described below.

In some demonstrative aspects, an adjacent channel filter based on a double conversion scheme may utilize a first frequency conversion followed by a second frequency conversion. For example, the double conversion scheme may be utilized to overcome one or more of the limitations and/or technical problems of the direct conversion scheme, e.g., as described below.

In some demonstrative aspects, a Local Oscillator (LO) frequency may be controlled, for example, to support channel selection, e.g., at the second conversion.

In some demonstrative aspects, the double conversion scheme may provide a technical solution to support a fixed high Q-factor filter on an intermediate (IF) frequency.

In some demonstrative aspects, the double conversion scheme may provide a technical solution to support a good level of channel selectivity at the IF band, for example, after the first conversion, e.g., assuming the fixed high Q-factor filter.

In some demonstrative aspects, there may be a need to provide a technical solution to address one or more technical issues with respect to the double conversion scheme, e.g., as described below.

In one example, a double conversion scheme for a mmWave band may be configured to support relatively high IF frequencies, e.g., IF frequencies of 1 GHz or higher may be implemented to cover the entire available RF frequency band for a given application. Accordingly, a double conversion scheme for a mmWave band may utilize passive filters, e.g., for an IF filter, for example, as active filters may be cumbersome for high frequencies, e.g., IF frequencies above 1 GHz. Accordingly, the Q factor of such passive filters, which may be implemented on-chip, may be very low, which may result in poor roll offs and/or in-band frequency response.

In another example, a double conversion scheme for a mmWave band may require a relatively large silicon area, for example, if inductors are used IF frequencies. As a result, an implementation of an adjacent channel filter utilizing the double conversion scheme may be relatively expensive.

In some demonstrative aspects, for example, in some use cases, scenarios, and/or implementations, there may be one or more disadvantages, inefficiencies, and/or technical problems, for example, when using an off-chip implementation of the IF filter, e.g., as described below.

In one example, the off-chip implementation of the IF filter may result in a relatively high cost and/or a large board footprint.

In another example, a bandwidth of the IF filter may not be configurable at the IF frequency, for example, if the IF filter is not implemented on-chip.

In another example, off-chip implementation of the IF filter may not be able to efficiently support a sliding IF topology, which may be configured to maintain a dependency between a first LO signal of a first frequency conversion and a second LO signal of a second frequency conversion. For example, the sliding IF topology may be configured to generate the first LO signal as a multiple of the second LO signal, and/or to maintain a fixed ratio between the first LO signal and the second LO signal. For example, the sliding IF topology may be utilized to provide improved adjacent-channel rejection. According to this example, off-chip implementation of the IF filter may result in a more complicated design, for example, as two different signal generators may be required, e.g., to generate the first LO signal and the second LO signal.

In some demonstrative aspects, N-path mixers may be utilized, for example, to improve a selectivity of a double conversion RF chain, for example, while avoiding implementations of high-cost RF filters, e.g., passive filters and/or IF filters.

For example, an N-path mixer may include an implementation of a mixer, which may be integrated with a filter, for example, by applying one or more capacitors, e.g., shunt capacitors, at an output of a multiphase mixer. In one example, the multi-phase mixer may include a four-phase mixer including four phases, e.g., which may be suitable for IQ down conversion. In another example, the multi-phase mixer may include an 8-phase mixer including 8 phases, and/or any other multi-phase mixer.

In some demonstrative aspects, for example, in some use cases, scenarios, and/or implementations, there may be one or more disadvantages, inefficiencies, and/or technical problems, for example, when implementing a an N-path filter as a single-step converter to convert an RF signal into a BB signal.

In one example, the capacitors of the N-path mixer, together with an on resistance of LO switching transistors of the multi-phase mixer, may form a low pass filter integrated in the mixer, which may result in a low NF, for example, even in implementations utilizing a topology ("mixer first topology"), which does not include a Low Noise Amplifier (LNA) in front of an Rx chain. For example, this implementation of the N-path mixer may condition a strict relation between the on resistance of the LO switching transistors of the multi-phase mixer, a shunt capacitance of shunt capacitors of the multi-phase mixer, and a shape of an LO signal of each of the phases to toggle switches of the multi-phase mixer. Accordingly, this this implementation of the N-path mixer may not be suitable for high frequencies, e.g., mmWave frequencies, for example, as a shape of a required LO time-domain signal may not be feasible, e.g., due to high harmonic content, which may be required for the proper shape, and/or due to an excess parasitic effect at the mmWave frequencies.

In some demonstrative aspects, an Rx chain 812, e.g., each Rx chain 812 or some of the Rx chains 812, may include a dual-conversion chain utilizing an N-path mixer, for example, to down-convert RF signals in the mmWave frequency bandwidth, e.g., as described below.

In some demonstrative aspects, the dual conversion chain may be configured to utilize the N-path mixer as a second down converting mixer, e.g., following a first down-conversion mixer, e.g., as described below.

In some demonstrative aspects, the double conversion receiver utilizing the N-path mixer as the second down converting mixer may be implemented at an Rx chain 812, e.g., each Rx chain 812 or some of the Rx chains 812, for example, to provide a technical solution to support interference-robust mmWave radar systems, e.g., radar system 901 (FIG. 9).

In some demonstrative aspects, the double conversion receiver utilizing the N-path mixer as the second down converting mixer may be implemented at an Rx chain 812, e.g., each Rx chain 812 or some of the Rx chains 812, for example, to provide a technical solution to improve resilience of a radar system, e.g., radar system 901 (FIG. 9), to out-of-channel interference, e.g., as described below.

In some demonstrative aspects, the double conversion receiver utilizing the N-path mixer as the second down converting mixer may be implemented at an Rx chain 812, e.g., each Rx chain 812 or some of the Rx chains 812, for example, to provide a technical solution to support channel frequency selectivity in the 76-81 GHz frequency band, e.g., as described below.

In some demonstrative aspects, the double conversion receiver utilizing the N-path mixer as the second down converting mixer may be implemented at an Rx chain 812, e.g., each Rx chain 812 or some of the Rx chains 812, for example, to provide a technical solution to support the channel frequency selectivity in the 76-81 GHz frequency band, for example, independent of a frontend bandwidth of frontend 804, e.g., as described below.

In some demonstrative aspects, the N-path mixer of the dual-conversion chain may be configured to implement one or more banks of capacitors e.g., instead of one or more shunt capacitors, at an output of one or more mixer phases, e.g., as described below.

In some demonstrative aspects, the N-path mixer of the dual-conversion chain may be configured to implement one or more banks of switches to be applied to an LO signal at the input of the N-path mixer, e.g., as described below.

In some demonstrative aspects, the banks of capacitors and/or the banks of switches may be controlled to controllably configure a frequency bandwidth selectively of the N-path mixer, e.g., as described below.

In some demonstrative aspects, the double conversion receiver utilizing the N-path mixer as the second down converting mixer may be implemented at an Rx chain 812, e.g., each Rx chain 812 or some of the Rx chains 812, for example, to provide a technical solution to support a reduced NF, e.g., a low NF, improved selectivity, and/or configurability of the dual conversion chain. These improved attributes of the dual-conversion chain may support an improved linearity and/or improved Signal to Noise ratios, for example, even in a presence of strong interference, e.g., as described below.

In some demonstrative aspects, the double conversion receiver utilizing the N-path mixer as the second down converting mixer may be implemented at an Rx chain 812, e.g., each Rx chain 812 or some of the Rx chains 812, for example, to provide a technical solution of an interference robust receiver with interference rejection, which may be an important, or even critical, parameter for radar systems.

In some demonstrative aspects, the double conversion receiver utilizing the N-path mixer as the second down converting mixer may be implemented at an Rx chain 812, e.g., each Rx chain 812 or some of the Rx chains 812, for example, to provide a technical solution to support frequency selectivity at a receiver, for example, with high linearity, e.g., in the presence of weak or strong out-of-channel interference, and/or while maintaining low NF performance of the receiver, e.g., even in the presence of such interferences.

In some demonstrative aspects, the double conversion receiver utilizing the N-path mixer as the second down converting mixer may be implemented at an Rx chain 812, e.g., each Rx chain 812 or some of the Rx chains 812, for example, to provide a technical solution suitable for operation even at locations and/or environments including a large number of interferers. For example, a number of interferers may be expected to grow, e.g., as the number of autonomous vehicles utilizing radar devices increases.

In one example, radar systems may be intolerant for interferences. For example, it may be easy to jam a radar system, e.g., as the radar system may target to receive signals that are attenuated according to a radar equation. For example, the radar system may target to receive signals, which may be attenuated proportional to $R^4$, wherein R denotes a distance from a target. In contrast, interferences caused by transmitted signals of adjacent systems may be attenuated by $R^2$.

For example, many radar systems may be at a distance of less than 2 m from a victim radar, e.g., in common road traffic scenarios. Accordingly, these nearby systems may easily compress the receiver chain of the victim radar. Therefore, an interference robust receiver may provide a technical solution for interference rejection.

Figure 20:
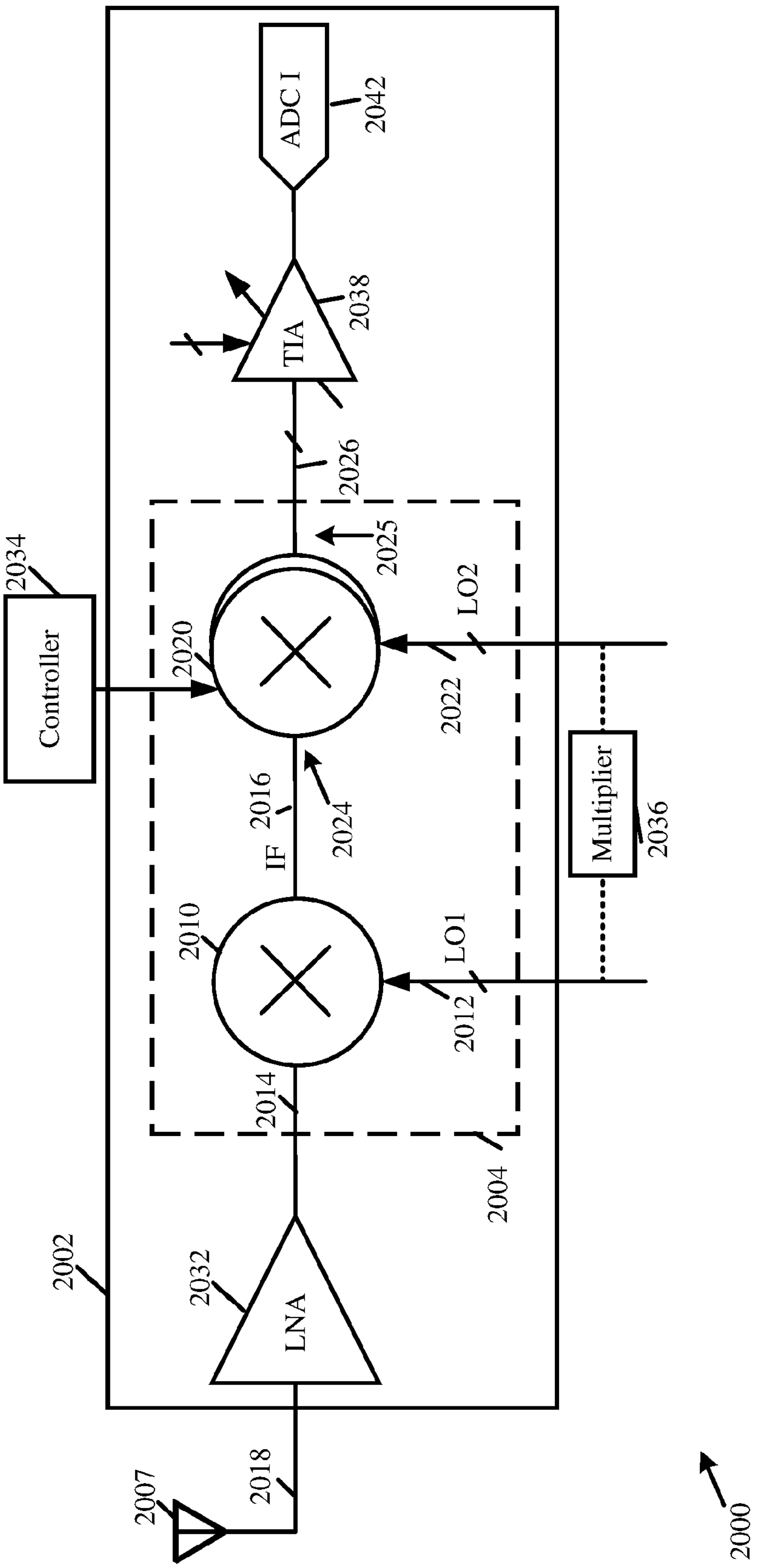
FIG. 20 is a schematic illustration of an apparatus, in accordance with some demonstrative aspects.

Reference is made to FIG. 20, which schematically illustrates an apparatus 2000, in accordance with some demonstrative aspects.

In some demonstrative aspects, apparatus 2000 may be implemented, for example, as part of a radar system, e.g., a radar system 901 (FIG. 9).

In some demonstrative aspects, apparatus 2000 may be implemented, for example, as part of a radar device, e.g., a radar device 910 (FIG. 9).

In some demonstrative aspects, apparatus 2000 may be implemented, for example, as part of a radar frontend, e.g., radar frontend 804 (FIG. 8).

In some demonstrative aspects, apparatus 2000 may include an Rx chain 2002 configured to convert an RF signal into a baseband (BB) signal, e.g., as described below. For example, an Rx chain 812 (FIG. 8) of radar front end 804 (FIG. 8) may include one or more elements of Rx chain 2002, and/or may perform one or more operations and/or functionalities of Rx chain 2002.

In some demonstrative aspects, for example, each of Rx chains 812 (FIG. 8) may include or may be implemented as an Rx chain 2002. In other aspects, only some of Rx chains 812 (FIG. 8) may include or may be implemented as Rx chain 2002, while one or more other Rx chains of Rx chains 812 (FIG. 8) may include or may be implemented as any other type of Rx chain.

In some demonstrative aspects, Rx chain 2002 may include a dual conversion chain 2004, e.g., as described below.

In some demonstrative aspects, dual conversion chain 2004 may include a down-converting mixer 2010 driven by a first Local Oscillator (LO) signal 2012, denoted LO1, e.g., as described below.

In some demonstrative aspects, down-converting mixer 2010 may be configured to down-convert an RF signal 2014 over a mmWave frequency bandwidth into an Intermediate-Frequency (IF) signal 2016, e.g., as described below.

In some demonstrative aspects, the mmWave frequency bandwidth may include a frequency bandwidth of 76-81 GHz, e.g., as described below.

In other aspects, the mmWave frequency bandwidth may include any other mmWave frequency bandwidth.

In some demonstrative aspects, dual conversion chain 2004 may include a configurable N-path mixer 2020, which may be configurable according to a configurable RF channel within the mmWave frequency bandwidth, e.g., as described below.

In some demonstrative aspects, the configurable RF channel may have a channel width of up to 1 Gigahertz (GHz), e.g., as described below.

In some demonstrative aspects, the configurable RF channel may have a channel width of up to 2 GHz, e.g., as described below.

In some demonstrative aspects, the configurable RF channel may have any other channel width.

In some demonstrative aspects, configurable N-path mixer 2020 may be driven by a second LO signal 2022, denoted LO2, for example, to convert the IF signal 2016 into a baseband (BB) signal 2026, e.g., as described below.

In some demonstrative aspects, the BB signal 2026 may correspond to a filtered portion of the RF signal 2014 over the configurable RF channel within the mmWave frequency bandwidth, e.g., as described below.

In some demonstrative aspects, apparatus 2000 may include an antenna 2007 to receive an Rx signal 2018.

In some demonstrative aspects, the RF signal 2014 over the mmWave frequency bandwidth may be based on the Rx signal 2018.

In some demonstrative aspects, Rx chain 2002 may include a Low Noise Amplifier (LNA) 2032 configured to provide the RF signal 2014 over the mmWave frequency bandwidth, for example, by amplifying the RX signal 2018 from antenna 2007.

In some demonstrative aspects, LNA 2032 may be configured to maintain a low NF.

In some demonstrative aspects, for example, at relatively high frequencies, e.g., at the mmWave frequencies, there may be high attenuation per given distance, and/or a limited power level of interference. Accordingly, LNA 2032 may be implemented to have a relatively low gain, for example, as it may be assumed that compression of LNA 2032 may not pose a problem.

In some demonstrative aspects, Rx chain 2002 may include a Transimpedance Amplifier (TIA) 2038 configured to amplify the BB signal 2026.

In some demonstrative aspects, Rx chain 2002 may include an Analog to Digital Converter (ADC) 2042 configured to generate a digital signal 2043, for example, based on the BB signal 2026.

In some demonstrative aspects, apparatus 2000 may include a controller 2034 configured to control, cause, and/or instruct, one or more elements and/or components of Rx chain 2002 and/or apparatus 2000 to perform one or more operations, e.g., as described below.

In some demonstrative aspects, controller 2034 may include, or may be implemented, partially or entirely, by circuitry and/or logic, e.g., one or more processors including circuitry and/or logic, memory circuitry and/or logic. Additionally or alternatively, one or more functionalities of controller 2034 may be implemented by logic, which may be executed by a machine and/or one or more processors, e.g., as described below.

In some demonstrative aspects, controller 2034 may be implemented as part of any, dedicated, or non-dedicated, element of a radar device, e.g., radar device 800 (FIG. 8) or radar device 910 (FIG. 9), and/or a radar system, e.g., radar system 901 (FIG. 9). For example, radar processor 834 (FIG. 8) may include one or more elements of controller 2034, and/or may perform one or more operations and/or functionalities of controller 2034; BB processor 930 (FIG. 9) may include one or more elements of controller 2034, and/or may perform one or more operations and/or functionalities of controller 2034; and/or controller 950 (FIG. 9) may include one or more elements of controller 2034, and/or may perform one or more operations and/or functionalities of controller 2034.

In some demonstrative aspects, controller 2034 may be configured to control the configurable N-path mixer 2020 according to the configurable RF channel, e.g., as described below.

In some demonstrative aspects, controller 2034 may be configured to control the frequency of first LO signal 2012 and/or the second LO signal 2022 according to the configurable RF channel, e.g., as described below.

For example, controller 2034 may be configured to control at least one LO generator (not shown in FIG. 20) to generate the first LO signal 2012 and/or the second LO signal 2022 according to the configurable RF channel, e.g., as described below.

In some demonstrative aspects, a frequency of the second LO signal 2022 may be less than 10 GHz, e.g., as described below.

In some demonstrative aspects, the frequency of the second LO signal 2022 may be less than 8 GHz, e.g., as described below.

In some demonstrative aspects, the frequency of the second LO signal 2022 may be less than 6 GHZ, e.g., as described below.

In other aspects, the second LO signal 2022 may have any other frequency.

In some demonstrative aspects, controller 2034 may be configured to control the configurable N-path mixer 2020, for example, according to a configurable starting frequency of the configurable RF channel, e.g., as described below.

In some demonstrative aspects, the configurable starting frequency may be configurable, for example, according to a frequency of the second LO signal 2022, e.g., as described below.

In some demonstrative aspects, controller 2034 may be configured to control the starting frequency of the configurable RF channel, for example, by setting the frequency of the second LO signal 2022.

In some demonstrative aspects, configurable N-path mixer 2020 may be configurable according to a configurable channel width of the configurable RF channel, e.g., as described below.

In some demonstrative aspects, controller 2034 may be configured to control the configurable N-path mixer 2020, for example, according to the configurable channel width of the configurable RF channel, e.g., as described below.

In some demonstrative aspects, configurable N-path mixer 2020 may include a plurality of parallel phase-controlled paths between an input 2024 of the N-path mixer 2020 and an output 2025 of the N-path mixer 2020, e.g., as described below.

In some demonstrative aspects, the plurality of parallel phase-controlled paths may be controllable according to a respective plurality of different phases, e.g., as described below.

In some demonstrative aspects, a phase-controlled path of the plurality of parallel phase-controlled paths may include a phase-controlled switch to selectively drive the IF signal 2016 via the path based on a phase of the plurality of different phases, e.g., as described below.

In some demonstrative aspects, the phase-controlled path may include a capacitor between an output of the phase-controlled path and a ground node, e.g., as described below.

In some demonstrative aspects, the dual conversion chain 2004 may be configured to utilize the configurable N-path mixer 2020 as a second down converting mixer, e.g., second to the down-converting mixer 2010, for example, to support a technical solution for implementation in interference-robust mmWave systems, e.g., radar system 901 (FIG. 9).

In some demonstrative aspects, the dual conversion chain 2004 may be configured to utilize the down-converting mixer 2010 to down convert the RF signal 2014 into the IF signal 2016, for example, to provide a technical solution to support appropriate shaping of the LO signal 2012 for the N-path mixer 2020.

In some demonstrative aspects, the dual conversion chain 2004 may be configured to utilize the configurable N-path mixer 2020 to provide a technical solution to reflect a frequency selectivity of the N-path mixer 2020 from the baseband to the RF frequency band, e.g., through the IF band.

In some demonstrative aspects, N-path mixer 2020 may be utilized by the dual conversion chain 2004 to provide it's a technical solution with high frequency selectivity and/or low NF, which may support appropriate interference rejection in a mmWave radar system. For example, the high frequency selectively and/or the low NF may be achieved, for example, even without implementing the N-path mixer 2020 at a front side of the Rx chain 2002.

Figure 21:
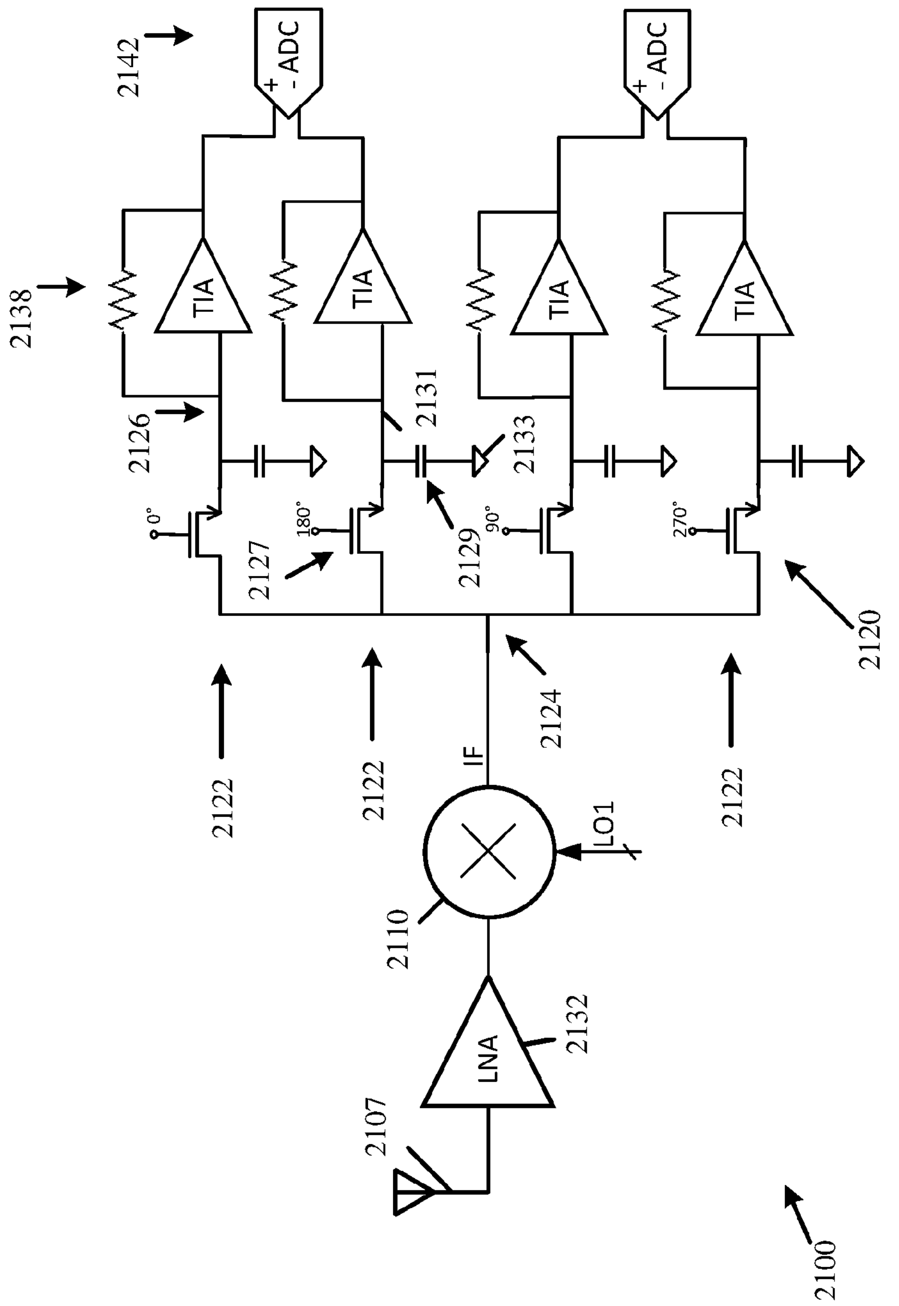
FIG. 21 is a schematic illustration of an Rx chain, in accordance with some demonstrative aspects.

Reference is made to FIG. 21, which schematically illustrates an Rx chain 2102, in accordance with some demonstrative aspects. For example, Rx chain 2002 (FIG. 20) may include one or more elements of Rx chain 2102, and/or may perform one or more operations and/or functionalities of Rx chain 2102.

In some demonstrative aspects, as shown in FIG. 21, Rx chain 2102 may include an LNA 2132 configured to provide an RF signal over an mmWave frequency bandwidth, for example, by amplifying an RF signal from an antenna 2107. For example, LNA 2132 may include one or more elements of LNA 2032 (FIG. 20), and/or may perform one or more operations and/or functionalities of LNA 2032 (FIG. 20).

In some demonstrative aspects, as shown in FIG. 21, Rx chain 2102 may include a down-converting mixer 2110, which may be driven by a first LO signal (LO1) to down-convert the RF signal over the mmWave frequency bandwidth into an IF signal. For example, down-converting mixer 2110 may include one or more elements of down-converting mixer 2010 (FIG. 20), and/or may perform one or more operations and/or functionalities of down-converting mixer 2010 (FIG. 20).

In some demonstrative aspects, as shown in FIG. 21, Rx chain 2102 may include a configurable N-path mixer 2120, which may be configurable according to a configurable RF channel within the mmWave frequency bandwidth. For example, configurable N-path mixer 2120 may be driven by a second LO signal to convert the IF signal into a BB signal corresponding to a filtered portion of the RF signal over the configurable RF channel within the mmWave frequency bandwidth. For example, configurable N-path mixer 2020 (FIG. 20) may include one or more elements of N-path mixer 2120, and/or may perform one or more operations and/or functionalities of N-path mixer 2120.

In some demonstrative aspects, as shown in FIG. 21, Rx chain 2102 may include one or more TIAs 2138 configured to amplify the BB signal, and/or one or more ADCs 2142 configured to generate a digital signal, for example, based on the BB signal. For example, TIAs 2138 may include one or more elements of TIA 2038 (FIG. 20), and/or may perform one or more operations and/or functionalities of TIA 2038 (FIG. 20); and/or ADCs 2142 may include one or more elements of may include one or more elements of ADC 2042 (FIG. 20), and/or may perform one or more operations and/or functionalities of ADC 2042 (FIG. 20).

In some demonstrative aspects, as shown in FIG. 21, configurable N-path mixer 2120 may include a plurality of parallel phase-controlled paths 2122 between an input 2124 of the N-path mixer 2120, e.g., input 2024 (FIG. 20), and an output 2126 of the N-path mixer 2120, e.g., output 2025 (FIG. 20).

In some demonstrative aspects, as shown in FIG. 21, the plurality of parallel phase-controlled paths 2122 may be controllable according to a respective plurality of different phases, e.g., as described below.

In some demonstrative aspects, a phase-controlled path 2122 of the plurality of parallel phase-controlled paths 2122 may include a phase-controlled switch 2127 to selectively drive the IF signal from down-converting mixer 2110, e.g., IF signal 2016 (FIG. 20), via the path, for example, based on a phase of the plurality of different phases.

In some demonstrative aspects, phase-controlled switch 2127 may include an on-resistance switch, e.g., as described below. In other aspects, the phase-controlled switch 2127 may include any other suitable type of switch.

In some demonstrative aspects, the phase-controlled path 2122 may include a capacitor 2129 between an output 2131 of the phase-controlled path and a ground node 2133.

In some demonstrative aspects, the output 2131 of the phase-controlled path 2122 may be controllably connected by a plurality of switches, e.g., capacitor switches, to a plurality of different capacitors 2129, e.g., as described below.

In some demonstrative aspects, a capacitor switch of the plurality of switches may be controllable to selectively connect the phase-controlled path 2122 to a capacitor 2129 of the plurality of different capacitors based on the configurable channel width of the configurable RF channel, e.g., as described below.

In other aspects, the phase-controlled path 2122 may implement one capacitor 2129, and/or the channel width of the configurable RF channel may be configurable based according to another mechanism, e.g., as described below.

In some demonstrative aspects, N-path mixer 2120 may include a plurality of switches 2127, e.g., on-resistance switches and/or any other type of switches, and a plurality of different transistors to be driven by the second LO signal 2022 (FIG. 20), e.g., as described below.

In some demonstrative aspects, a switch, e.g., an on-resistance switch, of the plurality of switches 2127 may be controllable, e.g., for example, based on the configurable channel width, to provide to a path of the N-path mixer, e.g., the phase-controlled path 2122, a signal, which may be based on the IF signal e.g., IF signal 2016 (FIG. 20), and may be driven by the second LO signal 2022 (FIG. 20), via a transistor of the plurality of different transistors, e.g., as described below.

In some demonstrative aspects, the plurality of switches may be implemented according to a first phase-controlled path scheme, e.g., as described below. For example, the switch 2127 may be controllable, for example, by controller 2034 (FIG. 20), to selectively connect the transistor to the path, for example, based on the configurable channel width, e.g., as described below.

In some demonstrative aspects, the plurality of switches may be implemented according to a second phase-controlled path scheme, e.g., as described below. For example, the switch 2127 may be controllable, for example, to selectively drive the second LO signal to the transistor, for example, based on the configurable channel width, e.g., as described below.

Figure 22:
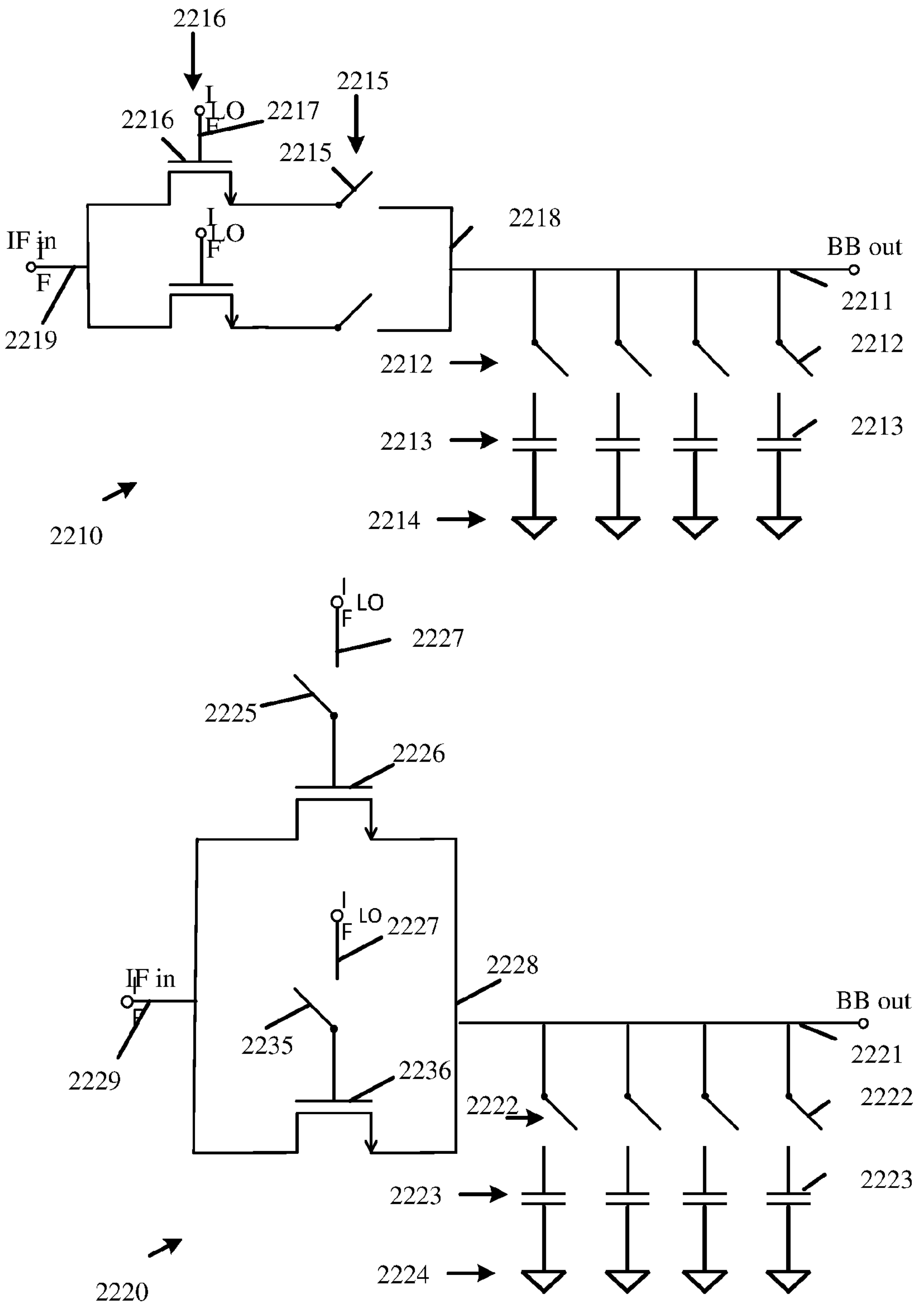
FIG. 22 is a schematic illustration of a first phase-controlled path, and a second phase-controlled path, which may be implemented by an N-path mixer, in accordance with some demonstrative aspects.

Reference is made to FIG. 22, which schematically illustrates a first phase-controlled path 2210, and a second phase-controlled path 2220, which may be implemented by an N-path mixer, in accordance with some demonstrative aspects. For example, a path 2122 (FIG. 21) of phase-controlled path 2120 (FIG. 21) may include one or more elements of the first phase-controlled path 2210 or the second phase-controlled path 2220, and/or may perform one or more operations and/or functionalities of the first phase-controlled path 2210 or the second phase-controlled path 2220.

In some demonstrative aspects, the first phase-controlled path 2210 may be implemented according to the first phase-controlled path scheme, e.g., as described below.

In some demonstrative aspects, as shown in FIG. 22, an output 2211 of the phase-controlled path 2210 may be controllably connected by a plurality of switches 2212 ("capacitor switches") to a plurality of different capacitors 2213.

In some demonstrative aspects as shown in FIG. 22, the plurality of capacitors 2213 may be connected to a respective plurality of ground nodes 2214.

In some demonstrative aspects, as shown in FIG. 22, a switch 2212 of the plurality of switches 2212 may be controllable, e.g., by controller 2034 (FIG. 20), to selectively connect the phase-controlled path 2210 to a capacitor 2213 of the plurality of different capacitors 2213, for example, based on a configurable channel width of a configurable RF channel.

In some demonstrative aspects, as shown in FIG. 22, the phase-controlled path 2210 may include a plurality of switches 2215, e.g., a plurality of on-resistances switches or any other type of switches, and a plurality of different transistors 2216 to be driven by an LO signal 2217, e.g., the second LO signal 2022 (FIG. 20).

In some demonstrative aspects, the plurality of different transistors 2216 may include a plurality of transistors having different resistance levels. For example, the plurality of different transistors 2216 may include a plurality of transistors of different sizes and/or any other attribute, which may result in different resistance levels.

In some demonstrative aspects, as shown in FIG. 22, a switch 2215 of the plurality of switches 2215 may be controllable, e.g., by controller 2034 (FIG. 20), for example, based on the configurable channel width, to provide to the phase-controlled path 2210, a signal 2218, which is based on an IF signal 2219, e.g., IF signal 2016 (FIG. 20). For example, the signal 2218 may be driven by the LO signal 2217, e.g., second LO signal 2022 (FIG. 20), via a transistor 2216 of the plurality of different transistors 2216.

In some demonstrative aspects, as shown in FIG. 22, the switch 2215 may be controllable, e.g., by controller 135 (FIG. 20), for example, to selectively connect the transistor 2216 to the phase-controlled path 2210, for example, based on the configurable channel width.

In some demonstrative aspects, as shown in FIG. 22, control of an on-resistance of the phase-controlled path 2210 may be implemented, for example, using a series of switches on an IF to BB path, e.g., switches 2215, which may switch between two different transistor sizes, e.g., by switching between transistors 2216. For example, the on-resistance of the switch 2215 may add to the on-resistor of the switching transistor 2216.

In some demonstrative aspects, transistors 2216 may have different sizes, for example, to allow configurability of the on resistance of the LO switching transistor.

In some demonstrative aspects, switches 2212 and/or 2215 may be static. For example, the switches 2212, and/or 2215 may be set, for example, per a required bandwidth. In other aspects, switches 2212 and/or 2215 may be dynamic, for example, to support different bandwidths.

In some demonstrative aspects, the second phase-controlled path 2220 may be implemented according to the second phase-controlled path scheme, e.g., as described below.

In some demonstrative aspects, as shown in FIG. 22, an output 2221 of the phase-controlled path 2220 may be controllably connected by a plurality of switches 2222 ("capacitor switches) to a plurality of different capacitors 2223.

In some demonstrative aspects as shown in FIG. 22, the plurality of capacitors 2223 may be connected to a respective plurality of ground nodes 2224.

In some demonstrative aspects, as shown in FIG. 22, a switch 2222 of the plurality of switches 2222 may be controllable, e.g., by controller 2034 (FIG. 20), to selectively connect the phase-controlled path 2220 to a capacitor 2223 of the plurality of different capacitors 2223, for example, based on a configurable channel width of a configurable RF channel.

In some demonstrative aspects, as shown in FIG. 22, the phase-controlled path 2220 may include a plurality of switches, e.g., including a switch 2225 and/or a switch 2235, and a plurality of different transistors, e.g., including a transistor 2226 and/or a transistor 2236, to be driven by an LO signal 2227, e.g., second LO signal 2022 (FIG. 20).

In some demonstrative aspects, the plurality of transistors, e.g., transistors 2226 and 2236, may include a plurality of transistors having different resistance levels. For example, the plurality of different transistors, e.g., transistors 2226 and 2236, may include a plurality of transistors of different sizes and/or any other attribute, which may result in different resistance levels.

In some demonstrative aspects, as shown in FIG. 22, switches 2225 and 2235 may be controllable, e.g., by controller 2034 (FIG. 20), for example, based on the configurable channel width, to provide to the phase-controlled path 2220, a signal 2228, which may be based on an IF signal 2229, e.g., IF signal 2016 (FIG. 20). For example, switches 2225 and 2235 may be controllable, e.g., by controller 2034 (FIG. 20), to provide the signal 2228 driven by the LO signal 2227 via transistor 2226 or via transistor 2235, respectively.

In some demonstrative aspects, as shown in FIG. 22, the switches 2225 and 2235 may be controllable, e.g., by controller 2034 (FIG. 20), for example, to selectively drive the LO signal 2227 to the transistor 2226 or to the transistor 2236, for example, based on the configurable channel width.

In some demonstrative aspects, a control of the on-resistance the phase-controlled path 2220 may be implemented directly, for example, based on the switches on the LO path, e.g., switches 2225 and/or 2235, for example, by choosing an appropriate LO transistor-switch.

In one example, implementing the switches 2225 and/or 2235 on the LO path may provide a technical solution to minimize parasitic effects on the LO, for example, at the cost of some variance in the impedance seen by an LO driver.

In some demonstrative aspects, transistors 2226 and/or 2236 may have different sizes, for example, to allow configurability of the on resistance of the LO switching transistor.

In some demonstrative aspects, switches 2222, 2225, and/or 2235, may be static. For example, the switches 2222, 2225, and/or 2235 may be set, for example, per a required bandwidth. In other aspects, switches 2222, 2225, and/or 2235 may be dynamic, for example, to support different bandwidths.

In some demonstrative aspects, a configurable N-path mixer, e.g., configurable N-path mixer 2020 (FIG. 20) may be configured to support a configurable on-resistance of the phase-controlled path 2210 and/or the phase-controlled paths 2220, e.g., as described above.

In some demonstrative aspects, a configurable N-path mixer, e.g., configurable N-path mixer 2020 (FIG. 20), may implement the capacitors bank and/or the configurable on-resistance, for example, to support a variety of RF signal bandwidths.

For example, the configurable N-path mixer, e.g., configurable N-path mixer 2020 (FIG. 20), may be configured to support a variety of RF signal bandwidths, for example, from a relatively narrow-band signal, e.g., which may be suitable for a radar Long Range mode, to a relatively wide bandwidth signal, e.g., an extremely wide band signal, which may be suitable, for a radar Shirt Range mode.

In one example, the configurable N-path mixer, e.g., configurable N-path mixer 2020 (FIG. 20), may be implemented by a radar system, e.g., radar system 901 (FIG. 9), to provide a technical solution utilizing a plurality of different modes of operation having different frequency bandwidths. For example, the configurable N-path mixer, e.g., configurable N-path mixer 2020 (FIG. 20), may be implemented by the radar system to support a wideband mode, e.g., a short-range radar mode, for example, even in an environment including many strong interferences.

For example, the configurable N-path mixer, e.g., configurable N-path mixer 2020 (FIG. 20), may be configured to support a variety of RF signal bandwidths, even without compromising adjacent channel rejection capabilities of the N-path mixer.

For example, the configurable N-path mixer, e.g., configurable N-path mixer 2020 (FIG. 20), may be configured to support a low NF, improved frequency selectivity performance, and/or improved filter configurability, which support a relatively high linearity and/or improved Signal to Noise ratios, for example, even in the presence of strong interferences.

Referring back to FIG. 20, in some demonstrative aspects, the first LO signal 2012 may be generated as a multiple of the second LO signal 2022, e.g., as described below.

In some demonstrative aspects, an N-path mixer, e.g., configurable N-path mixer 2020, may be configured to automatically shift its frequency response, for example, according to an LO signal controlling the N-path mixer, e.g., LO signal 2022.

In some demonstrative aspects, apparatus 2000 may be configured to implement a "sliding IF" mechanism for the dual conversion chain 2004, e.g., as described below.

In some demonstrative aspects, the sliding IF mechanism may be configured to generate the first LO signal 2012 as a multiple of the second LO signal 2022, e.g., as described below.

In some demonstrative aspects, the sliding IF mechanism may be implemented, for example, to provide a technical solution for implementing a dual conversion topology, e.g., dual conversion chain 2004, for example, without substantially complicating chain implementation, and/or while allowing a compact, and/or low-cost receiver implementation.

In some demonstrative aspects, there may be a tradeoff between low IF frequency, e.g., of the LO signal 2022 to drive the N-path mixer 2020, versus a higher frequency, e.g., the multiple of the LO signal, which may be used for the down-converting mixer 2010.

In some demonstrative aspects, apparatus 2000 may include a multiplier 2036 configured to generate the first LO signal 2012 by multiplying the second LO signal 2022 by a multiplication factor, e.g., as described below.

In some demonstrative aspects, multiplier 2036 may be implemented to provide a technical solution using a common LO generator, e.g., a single LO generator, to generate the first LO signal 2012 and the second LO signal 2022

In other aspects, apparatus 2000 may include a first LO generator to generate the first LO signal 2012, and a second LO generator to generate the second LO signal 2022.

In some demonstrative aspects, dual conversion chain 2004 may be implemented to provide a technical solution to support adjacent channel interference rejection at an early stage of a chain gain, e.g., in a way which may prevent compression of all high gain blocks at the baseband.

In some demonstrative aspects, dual conversion chain 2004 may be implemented to provide a technical solution to configure a channel bandwidth of an R chain, for example, according to a required radar mode of operation, which may further enhance interference robustness.

Figure 23:
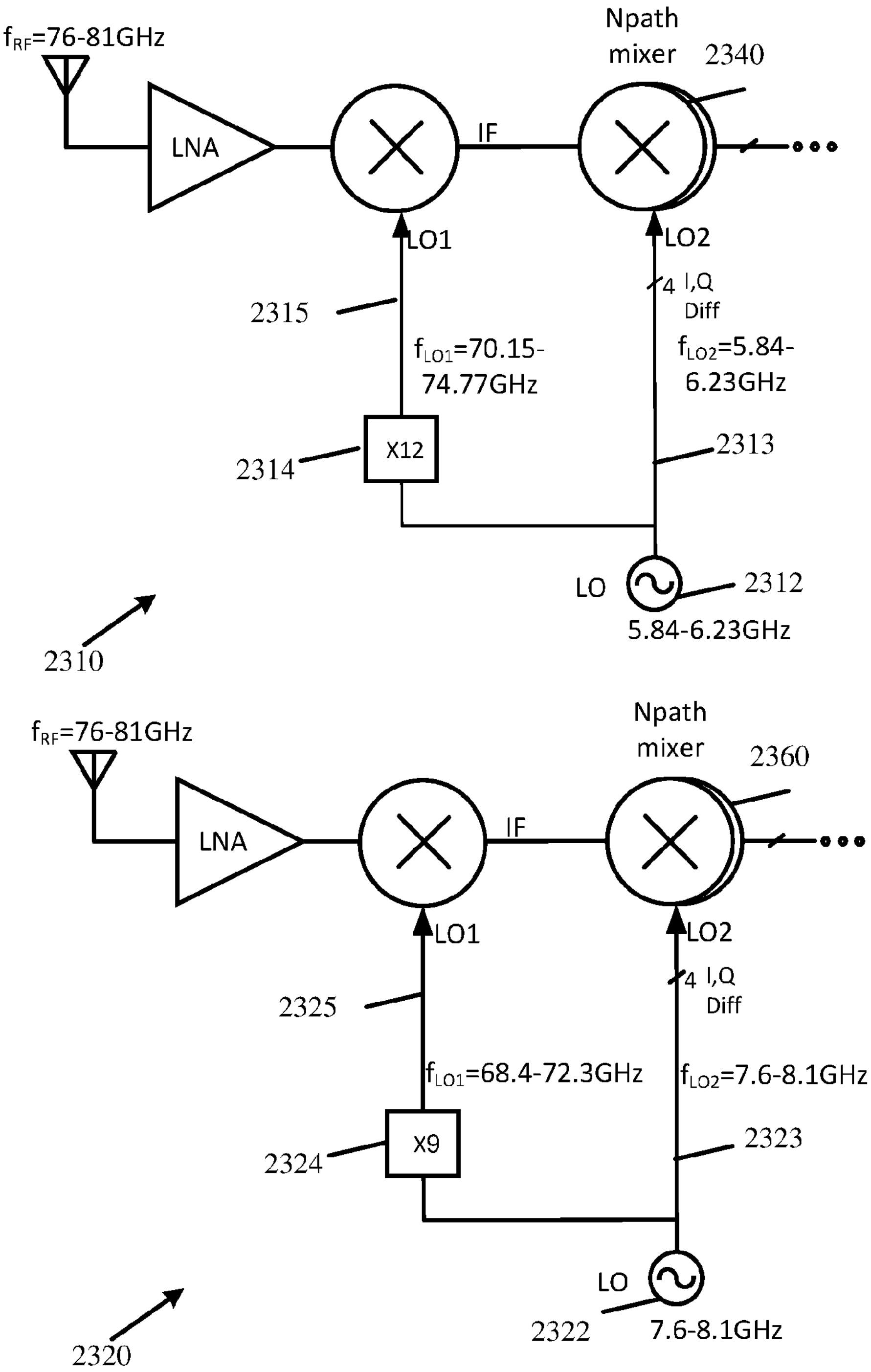
FIG. 23 is a schematic illustration of elements of a first Rx chain, and elements of a second Rx chain, in accordance with some demonstrative aspects.

Reference is made to FIG. 23, which schematically illustrates elements of a first Rx chain 2310, and elements of a second Rx chain 2320, in accordance with some demonstrative aspects. For example, Rx chain 2002 (FIG. 20) may include one or more elements of the first Rx chain 2310 or the second Rx chain 2320, and/or may perform one or more operations and/or functionalities of the first Rx chain 2310 or the second Rx chain 2320.

In some demonstrative aspects, Rx chain 2310 and/or Rx chain 2320 may be configured for implementation, for example, as part of a radar system in the 80 GHz frequency band, e.g., in a mmWave frequency band of 76-81 GHz, and/or any other frequency band.

In some demonstrative aspects, as shown in FIG. 23, Rx chain 2310 may include an LO generator 2312 configured to generate an LO signal 2313 to drive an N-path mixer 2340. For example, the LO signal 2313 may be utilized as LO signal 2022 (FIG. 20) to drive the configurable N-path mixer 2020 (FIG. 20).

In some demonstrative aspects, as shown in FIG. 23, Rx chain 2310 may include a multiplier 2314 configured to generate an LO signal 2315, for example, by multiplying the LO signal 2313 by a multiplication factor. For example, the LO signal 2315 may be utilized as LO signal 2012 (FIG. 20) to drive the down-converting mixer 2010 (FIG. 20).

In some demonstrative aspects, as shown in FIG. 23, LO signal 2313 may be configured to have a frequency in a 6 GHz frequency band, e.g., a frequency between 5.84 GHz and 6.23 GHz. In other aspects, any other LO frequency may be used.

In some demonstrative aspects, as shown in FIG. 23, the multiplication factor for Rx chain 2310 may be equal to twelve. In other aspects, any other suitable multiplication factor may be utilized.

For example, as shown in FIG. 23, the LO signal 2315 may be configured to have a frequency in a 70 GHz frequency band, e.g., a frequency between 70.15 GHz and 74.77 GHz. In other aspects, any other LO frequency may be used.

In some demonstrative aspects, the implementation of LO signal 2313 with the frequency in the 6 GHz frequency band may support an IF frequency in the 6 GHz frequency band.

In some demonstrative aspects, as shown in FIG. 23, Rx chain 2320 may include an LO generator 2322 configured to generate an LO signal 2323 to drive an N-path mixer 2360. For example, the LO signal 2323 may be utilized as LO signal 2022 (FIG. 20) to drive the configurable N-path mixer 2020 (FIG. 20).

In some demonstrative aspects, as shown in FIG. 23, Rx chain 2320 may include a multiplier 2324 configured to generate an LO signal 2325, for example, by multiplying the LO signal 2323 by a multiplication factor. For example, the LO signal 2325 may be utilized as LO signal 2012 (FIG. 20) to drive the down-converting mixer 2010 (FIG. 20).

In some demonstrative aspects, as shown in FIG. 23, LO signal 2313 may be configured to have a frequency in a 8 GHz frequency band, e.g., a frequency between 7.6 GHz and 8.1 GHz. In other aspects, any other LO frequency may be used.

In some demonstrative aspects, as shown in FIG. 23, the multiplication factor for Rx chain 2320 may be equal to six. In other aspects, any other suitable multiplication factor may be utilized.

For example, as shown in FIG. 23, the LO signal 2325 may be configured to have a frequency in a 70 GHz frequency band, e.g., a frequency between 68.4 GHz and 72.3 GHZ. In other aspects, any other LO frequency may be used.

In some demonstrative aspects, the implementation of LO signal 2323 with the frequency in the 8 GHz frequency band may support an IF frequency in the 8 GHZ frequency band.

In some demonstrative aspects, the 6 GHz frequency band utilized for LO signals 413 and/or 415, and/or the 8 GHz frequency band utilized for LO signals 423 and/or 425, may be suitable to support improved adjacent-channel rejection and/or a reasonable NF level.

In some demonstrative aspects, Rx chain 2320 may allow higher efficiency for the LO signal 2325, for example, as less multiplications may be required compared to Rx chain 2320, e.g., nine multiplications in Rx chain 2320 versus twelve multiplications in Rx chain 2310.

In other aspects, Rx chain 2320 may be configured to use an IF frequency in any other frequency band, e.g., IF frequencies higher then 8 GHz, for example, to support a wide variety of sliding IF configurations, e.g., using different IF frequencies, with N-path mixer implementations.

Figure 24:
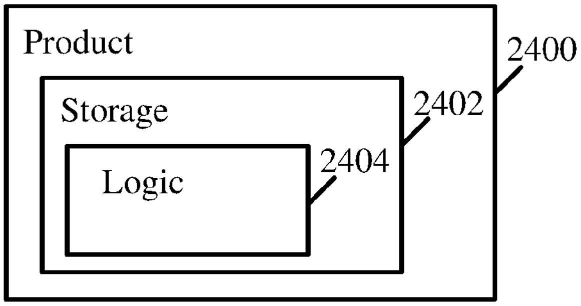
FIG. 24 is a schematic illustration of a product of manufacture, in accordance with some demonstrative aspects.

Reference is made to FIG. 24, which schematically illustrates a product of manufacture 2400, in accordance with some demonstrative aspects. Product 2400 may include one or more tangible computer-readable ("machine-readable") non-transitory storage media 2402, which may include computer-executable instructions, e.g., implemented by logic 2404, operable to, when executed by at least one computer processor, enable the at least one computer processor to implement one or more operations and/or functionalities described with reference to the FIGS. 1-23, and/or one or more operations described herein. The phrases "non-transitory machine-readable medium" and "computer-readable non-transitory storage media" may be directed to include all machine and/or computer readable media, with the sole exception being a transitory propagating signal.

In some demonstrative aspects, product 2400 and/or storage media 2402 may include one or more types of computer-readable storage media capable of storing data, including volatile memory, non-volatile memory, removable or non-removable memory, erasable or non-erasable memory, writeable or re-writeable memory, and the like. For example, storage media 2402 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a hard drive, an optical disk, a card, a magnetic card, an optical card, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative aspects, logic 2404 may include instructions, data, and/or code, which, if executed by a machine, may cause the machine to perform a method, process, and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative aspects, logic 2404 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner, or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further aspects.

Example 1 includes an apparatus comprising a processor configured to identify an environment-related attribute corresponding to an environment of a radar device; and based on the environment related attribute, determine an antenna polarization setting to be applied for communication of radar signals by the radar device; and an output to provide antenna polarization information to configure the antenna polarization setting.

Example 2 includes the subject matter of Example 1, and optionally, wherein the processor is configured to determine, based on the environment related attribute, a selected antenna polarization setting from a plurality of antenna polarization settings, the antenna polarization information based on the selected antenna polarization setting.

Example 3 includes the subject matter of Example 2, and optionally, wherein the plurality of antenna polarization settings comprises a Horizontal (H) polarization setting, and at least one other antenna polarization setting different from the H polarization setting.

Example 4 includes the subject matter of Example 2 or 3, and optionally, wherein the plurality of antenna polarization settings comprises a Vertical (V) polarization setting, and at least one other antenna polarization setting different from the V polarization setting.

Example 5 includes the subject matter of any one of Examples 2-4, and optionally, wherein the plurality of antenna polarization settings comprises a circular polarization setting, and at least one other antenna polarization setting different from the circular polarization setting.

Example 6 includes the subject matter of Example 5, and optionally, wherein the circular polarization setting comprises a Transmit (Tx) antenna circular polarization setting in a first circular polarization direction, and a Receive (Rx) antenna circular polarization setting in a second circular polarization direction opposite to the first circular polarization direction.

Example 7 includes the subject matter of any one of Examples 2-6, and optionally, wherein the plurality of antenna polarization settings comprises a linear diagonal polarization setting, and at least one other antenna polarization setting different from the linear diagonal polarization setting.

Example 8 includes the subject matter of Example 7, and optionally, wherein the linear diagonal polarization setting comprises a Transmit (Tx) antenna linear diagonal polarization setting, and a Receive (Rx) antenna linear diagonal polarization setting, wherein both the Tx antenna linear diagonal polarization setting and the Rx antenna linear diagonal polarization setting are in a same diagonal polarization direction.

Example 9 includes the subject matter of any one of Examples 1-8, and optionally, wherein the processor is configured to identify the environment-related attribute based on interference information corresponding to interference in the environment of the radar device.

Example 10 includes the subject matter of Example 9, and optionally, wherein the processor is configured to determine the antenna polarization setting comprising a circular polarization setting or a linear diagonal polarization setting based on a determination that the interference in the environment of the radar device is above a predefined interference level.

Example 11 includes the subject matter of any one of Examples 1-10, and optionally, wherein the processor is configured to identify the environment-related attribute based on driving scenario information corresponding to a driving scenario of a vehicle comprising the radar device.

Example 12 includes the subject matter of Example 11, and optionally, wherein the processor is configured to determine the antenna polarization setting comprising a Vertical (V) polarization setting based on a determination that the driving scenario comprises a highway or an open road.

Example 13 includes the subject matter of Example 11 or 12, and optionally, wherein the processor is configured to determine the antenna polarization setting comprising a Horizontal (H) polarization setting based on a determination that the driving scenario comprises at least one of a sidewall, or a tunnel.

Example 14 includes the subject matter of any one of Examples 1-13, and optionally, comprising a polarization-setting switch configured to switch an antenna of the radar device between a plurality of antenna polarization settings, the polarization-setting switch configured to switch the antenna of the radar device to the antenna polarization setting according to the antenna polarization information.

Example 15 includes the subject matter of Example 14, and optionally, wherein the polarization-setting switch is configured to provide a first phase to a first port of the antenna, and a second phase to a second port of the antenna, wherein the second phase is different from the first phase, wherein the first phase and the second phase are based on the antenna polarization setting according to the antenna polarization information.

Example 16 includes the subject matter of Example 15, and optionally, wherein the polarization-setting switch comprises a differential amplifier comprising a first differential amplifier port on a first Radio Frequency (RF) path and a second differential amplifier port on a second RF path, the first differential amplifier port and the second differential amplifier port having a phase difference of 180 degrees; a 90-degree hybrid coupler having a first hybrid coupler port coupled to the first differential amplifier port, a second hybrid coupler port on the second RF path, a third hybrid coupler port on the first RF path, and a fourth hybrid coupler port coupled to the second port of the antenna; a first configurable phase shifter to apply a first configurable phase shift between the second differential amplifier port and the second hybrid coupler port, the first configurable phase shift based on the polarization setting according to the antenna polarization information; and a second configurable phase shifter to apply a second configurable phase shift between the third hybrid coupler port and the first port of the antenna, the second configurable phase shift based on the polarization setting according to the antenna polarization information.

Example 17 includes the subject matter of Example 15, and optionally, wherein the polarization-setting switch comprises a differential amplifier comprising a first differential amplifier port on a first Radio Frequency (RF) path and a second differential amplifier port on a second RF path, the first differential amplifier port and the second differential amplifier port having a phase difference of 180 degrees, wherein the first differential amplifier port is coupled to the first port of the antenna; and a configurable phase shifter to apply a configurable phase shift between the second differential amplifier port and the second port of the antenna, the configurable phase shift based on the polarization setting according to the antenna polarization information.

Example 18 includes the subject matter of Example 15, and optionally, wherein the polarization-setting switch comprises a first differential amplifier comprising a first pair of differential amplifier ports having a phase difference of 180 degrees; a second differential amplifier comprising a second pair of differential amplifier ports having a phase difference of 180 degrees; and a digitally configurable Balancing Unit (BALUN) configured to couple the first pair of differential amplifier ports to the first port of the antenna with the first phase, and to couple the second pair of differential amplifier ports to the second port of the antenna with the second phase.

Example 19 includes the subject matter of any one of Examples 14-18, and optionally, comprising the antenna, wherein the antenna comprises a stacked series fed antenna.

Example 20 includes the subject matter of any one of Examples 1-19, and optionally, wherein the antenna polarization setting comprises a Transmit (Tx) antenna polarization setting to be applied for transmission of radar Tx signals by the radar device.

Example 21 includes the subject matter of any one of Examples 1-20, and optionally, wherein the antenna polarization setting comprises a Receive (Rx) antenna polarization setting to be applied for reception of radar Rx signals by the radar device.

Example 22 includes the subject matter of any one of Examples 1-21, and optionally, comprising the radar device, the radar device configured to generate radar information based on radar signals communicated according to the antenna polarization setting.

Example 23 includes the subject matter of Example 22, and optionally, comprising a vehicle, the vehicle comprising a system controller to control one or more systems of the vehicle based on the radar information.

Example 24 includes an apparatus comprising an interference detector configured to detect interference in an environment of a radar device, the interference detector comprising a Local Oscillator (LO) signal generator; a controller configured to cause the LO signal generator to generate a detector LO signal having an LO frequency corresponding to a frequency channel to be assessed for interference; a mixer to generate a mixed signal by mixing the detector LO signal with a Radio Frequency (RF) signal received via an antenna; a detector configured to detect interference on the frequency channel based on the mixed signal; and an output to provide detection information based on detection of the interference on the frequency channel.

In one example, the apparatus of Example 24 may include, for example, one or more additional elements, and/or may perform one or more additional operations and/or functionalities, for example, as described with respect to Examples 1 and/or 45.

Example 25 includes the subject matter of Example 24, and optionally, wherein the controller is configured to cause the LO signal generator to generate a plurality of detector LO signals corresponding to a respective plurality of frequency channels to be assessed for interference, the detector configured to generate the detection information based on detection of interference over the plurality of frequency channels.

Example 26 includes the subject matter of Example 25, and optionally, wherein the plurality of frequency channels cover a radar frequency band for communication of radar signals by the radar device.

Example 27 includes the subject matter of any one of Examples 24-26, and optionally, wherein the interference detector comprises a configurable Low Noise Amplifier (LNA) to amplify a signal from the antenna, the RF signal is based on an output of the configurable LNA, wherein the controller is to configure the configurable LNA based on the frequency channel to be assessed for interference.

Example 28 includes the subject matter of any one of Examples 24-26, and optionally, wherein the controller is configured to generate a control signal to control a Low Noise Amplifier (LNA) of an RF Receive (Rx) chain of the radar device based on the frequency channel to be assessed for interference.

Example 29 includes the subject matter of any one of Examples 24-28, and optionally, wherein the interference detector comprises an LO selector to provide to the mixer a selected LO signal, the controller configured to cause the LO selector to provide the selected LO signal comprising one of the detector LO signal from the LO signal generator, or a radar LO signal to be applied to an RF Receive (Rx) chain of the radar device.

Example 30 includes the subject matter of any one of Examples 24-29, and optionally, wherein the controller is configured to cause the LO signal generator to generate the detector LO signal corresponding to the frequency channel independent of a radar frequency channel for communicating radar signals by the radar device.

Example 31 includes the subject matter of any one of Examples 24-30, and optionally, wherein the controller is configured to cause the LO signal generator to generate the detector LO signal independent of a radar LO signal for processing radar Receive (Rx) signals by the radar device.

Example 32 includes the subject matter of any one of Examples 24-31, and optionally, wherein the controller is configured to cause the LO signal generator to generate the detector LO signal at a time which is independent of a radar communication period for communicating radar signals by the radar device.

Example 33 includes the subject matter of any one of Examples 24-32, and optionally, wherein the interference detector comprises a Power Management Integrated Circuit (PMIC) to manage a power state of the interference detector independent of a power state of an RF frontend of the radar device.

Example 34 includes the subject matter of any one of Examples 24-33, and optionally, wherein the detector comprises an analog detector to detect the interference on the frequency channel based on the mixed signal in an analog domain.

Example 35 includes the subject matter of Example 34, and optionally, wherein the analog detector comprises at least one of a High Pass Filter (HPF), an energy detector, or an envelope detector.

Example 36 includes the subject matter of any one of Examples 24-35, and optionally, wherein the interference detector comprises an Analog to Digital Converter (ADC) to generate a digital signal based on the mixed signal, wherein the detector comprises a digital detector configured to detect the interference on the frequency channel based on the digital signal.

Example 37 includes the subject matter of Example 36, and optionally, wherein the digital detector comprises at least one of a decimation filter, a digital filter, or a digital correlation detector.

Example 38 includes the subject matter of any one of Examples 24-37, and optionally, wherein the interference detector comprises an RF detector configured to detect the interference on the frequency channel based on the RF signal.

Example 39 includes the subject matter of any one of Examples 24-38, and optionally, comprising an RF frontend of the radar device, the RF frontend comprising one or more RF Receive (Rx) chains to process radar Rx signals from one or more antennas of the radar device according to a radar LO signal, wherein the controller is configured to cause the LO signal generator to generate the detector LO signal independent of the radar LO signal.

Example 40 includes the subject matter of any one of Examples 24-39, and optionally, wherein the antenna comprises a dedicated antenna of the interference detector.

Example 41 includes the subject matter of any one of Examples 24-39, and optionally, wherein the antenna comprises an antenna of an RF Receive (Rx) chain of the radar device.

Example 42 includes the subject matter of any one of Examples 24-41, and optionally, wherein the interference detector is configured as an Always On (AON) detector operable independent of a power state of the radar device.

Example 43 includes the subject matter of any one of Examples 24-42, and optionally, comprising a radar processor configured to generate radar information based on the detection information.

Example 44 includes the subject matter of Example 43, and optionally, comprising a vehicle, the vehicle comprising a system controller to control one or more systems of the vehicle based on the radar information.

Example 45 includes an apparatus comprising a Receive (Rx) chain comprising a dual conversion chain, the dual conversion chain comprising a down-converting mixer driven by a first Local Oscillator (LO) signal to down-convert a Radio Frequency (RF) signal over a millimeter-Wave (mmWave) frequency bandwidth into an Intermediate-Frequency (IF) signal; and a configurable N-path mixer configurable according to a configurable RF channel within the mmWave frequency bandwidth, the configurable N-path mixer driven by a second LO signal to convert the IF signal into a baseband (BB) signal, the BB signal corresponding to a filtered portion of the RF signal over the configurable RF channel within the mmWave frequency bandwidth.

In one example, the apparatus of Example 45 may include, for example, one or more additional elements, and/or may perform one or more additional operations and/or functionalities, for example, as described with respect to Examples 1 and/or 24.

Example 46 includes the subject matter of Example 45, and optionally, wherein the configurable N-path mixer is configurable according to a configurable starting frequency of the configurable RF channel.

Example 47 includes the subject matter of Example 46, and optionally, wherein the configurable starting frequency is configurable according to a frequency of the second LO signal.

Example 48 includes the subject matter of any one of Examples 45-47, and optionally, wherein the N-path mixer comprises a plurality of parallel phase-controlled paths between an input of the N-path mixer and an output of the N-path mixer, the plurality of parallel phase-controlled paths controllable according to a respective plurality of different phases, wherein a phase-controlled path of the plurality of parallel phase-controlled paths comprises a phase-controlled switch to selectively drive the IF signal via the phase-controlled path based on a phase of the plurality of different phases.

Example 49 includes the subject matter of Example 48, and optionally, wherein the phase-controlled path comprises a capacitor between an output of the phase-controlled path and a ground node.

Example 50 includes the subject matter of any one of Examples 45-49, and optionally, wherein the configurable N-path mixer is configurable according to a configurable channel width of the configurable RF channel.

Example 51 includes the subject matter of Example 50, and optionally, wherein an output of a path of the configurable N-path mixer is controllably connected by a plurality of switches to a plurality of different capacitors, wherein a switch of the plurality of switches is controllable to selectively connect the path to a capacitor of the plurality of different capacitors based on the configurable channel width of the configurable RF channel.

Example 52 includes the subject matter of Example 50 or 51, and optionally, wherein the configurable N-path mixer comprises a plurality of switches, and a plurality of different transistors to be driven by the second LO signal, wherein a switch of the plurality of switches is controllable, based on the configurable channel width, to provide to a path of the N-path mixer a signal, which is based on the IF signal and is driven by the second LO signal via a transistor of the plurality of different transistors.

Example 53 includes the subject matter of Example 52, and optionally, wherein the switch is controllable to selectively drive the second LO signal to the transistor based on the configurable channel width.

Example 54 includes the subject matter of Example 52, and optionally, wherein the switch is controllable to selectively connect the transistor to the path based on the configurable channel width.

Example 55 includes the subject matter of any one of Examples 45-54, and optionally, comprising a controller to control the configurable N-path mixer according to the configurable RF channel.

Example 56 includes the subject matter of any one of Examples 45-55, and optionally, comprising a multiplier to generate the first LO signal by multiplying the second LO signal by a multiplication factor.

Example 57 includes the subject matter of any one of Examples 45-56, and optionally, wherein the Rx chain comprises a Low Noise Amplifier (LNA) to provide the RF signal over the mmWave frequency bandwidth by amplifying an RF signal from an antenna.

Example 58 includes the subject matter of any one of Examples 45-57, and optionally, wherein a frequency of the second LO signal is less than 10 Gigahertz (GHz).

Example 59 includes the subject matter of any one of Examples 45-58, and optionally, wherein the mmWave frequency bandwidth comprises a frequency bandwidth of 76-81 Gigahertz (GHz).

Example 60 includes the subject matter of any one of Examples 45-59, and optionally, wherein the configurable RF channel has a channel width of up to 1 Gigahertz (GHz).

Example 61 includes the subject matter of any one of Examples 45-60, and optionally, comprising an antenna to receive an Rx signal, wherein the RF signal over the mmWave frequency bandwidth is based on the Rx signal.

Example 62 includes the subject matter of any one of Examples 45-61, and optionally, comprising a radar processor configured to generate radar information based on the BB signal.

Example 63 includes the subject matter of Example 62, and optionally, comprising a vehicle, the vehicle comprising a system controller to control one or more systems of the vehicle based on the radar information.

Example 64 includes a radar device comprising one or more of the apparatuses of Examples 1-63.

Example 65 includes a vehicle comprising one or more of the apparatuses of Examples 1-63.

Example 66 includes an apparatus comprising means for executing any of the described operations of Examples 1-63.

Example 67 includes a machine-readable medium that stores instructions for execution by a processor to perform any of the described operations of Examples 1-63.

Example 68 includes an apparatus comprising a memory; and processing circuitry configured to perform any of the described operations of Examples 1-63.

Example 69 includes a method including any of the described operations of Examples 1-63.

Functions, operations, components and/or features described herein with reference to one or more aspects, may be combined with, or may be utilized in combination with, one or more other functions, operations, components and/or features described herein with reference to one or more other aspects, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising:

a processor configured to:

identify an environment-related attribute corresponding to an environment of a radar device based on driving scenario information corresponding to a driving scenario of a vehicle comprising the radar device; and based on the environment related attribute, determine an antenna polarization setting to be applied for communication of radar signals by the radar device, wherein the processor is configured to determine the antenna polarization setting based on whether the driving scenario comprises one or more walls; and an output to provide antenna polarization information to configure the antenna polarization setting.

2. The apparatus of claim 1, wherein the processor is configured to determine, based on the environment related attribute, a selected antenna polarization setting from a plurality of antenna polarization settings, wherein the antenna polarization information is based on the selected antenna polarization setting.

3. The apparatus of claim 2, wherein the plurality of antenna polarization settings comprises a Horizontal (H) polarization setting, and at least one other antenna polarization setting different from the H polarization setting.

4. The apparatus of claim 2, wherein the plurality of antenna polarization settings comprises a Vertical (V) polarization setting, and at least one other antenna polarization setting different from the V polarization setting.

5. The apparatus of claim 2, wherein the plurality of antenna polarization settings comprises a circular polarization setting, and at least one other antenna polarization setting different from the circular polarization setting.

6. The apparatus of claim 5, wherein the circular polarization setting comprises a Transmit (Tx) antenna circular polarization setting in a first circular polarization direction, and a Receive (Rx) antenna circular polarization setting in a second circular polarization direction opposite to the first circular polarization direction.

7. The apparatus of claim 2, wherein the plurality of antenna polarization settings comprises a linear diagonal polarization setting, and at least one other antenna polarization setting different from the linear diagonal polarization setting.

8. The apparatus of claim 7, wherein the linear diagonal polarization setting comprises a Transmit (Tx) antenna linear diagonal polarization setting, and a Receive (Rx) antenna linear diagonal polarization setting, wherein both the Tx antenna linear diagonal polarization setting and the Rx antenna linear diagonal polarization setting are in a same diagonal polarization direction.

9. The apparatus of claim 1, wherein the processor is configured to identify the environment-related attribute based on interference information corresponding to interference in the environment of the radar device.

10. The apparatus of claim 9, wherein the processor is configured to determine the antenna polarization setting comprising a circular polarization setting or a linear diagonal polarization setting based on a determination that the interference in the environment of the radar device is above a predefined interference level.

11. The apparatus of claim 1, wherein the processor is configured to determine the antenna polarization setting based on whether the driving scenario comprises one or more substantially vertical walls.

12. The apparatus of claim 1, wherein the processor is configured to determine the antenna polarization setting comprising a Vertical (V) polarization setting based on a determination that the driving scenario comprises a highway or an open road.

13. The apparatus of claim 1, wherein the processor is configured to determine the antenna polarization setting comprising a Horizontal (H) polarization setting based on a determination that the driving scenario comprises at least one of a sidewall, or a tunnel.

14. The apparatus of claim 1 comprising a polarization-setting switch configured to switch an antenna of the radar device between a plurality of antenna polarization settings, the polarization-setting switch configured to switch the antenna of the radar device to the antenna polarization setting according to the antenna polarization information.

15. The apparatus of claim 14, wherein the polarization-setting switch is configured to provide a first phase to a first port of the antenna, and a second phase to a second port of the antenna, wherein the second phase is different from the first phase, wherein the first phase and the second phase are based on the antenna polarization setting according to the antenna polarization information.

16. The apparatus of claim 15, wherein the polarization-setting switch comprises:

a differential amplifier comprising a first differential amplifier port on a first Radio Frequency (RF) path and a second differential amplifier port on a second RF path, the first differential amplifier port and the second differential amplifier port having a phase difference of 180 degrees;

a 90-degree hybrid coupler having a first hybrid coupler port coupled to the first differential amplifier port, a second hybrid coupler port on the second RF path, a third hybrid coupler port on the first RF path, and a fourth hybrid coupler port coupled to the second port of the antenna;

a first configurable phase shifter to apply a first configurable phase shift between the second differential amplifier port and the second hybrid coupler port, the first configurable phase shift based on the polarization setting according to the antenna polarization information; and a second configurable phase shifter to apply a second configurable phase shift between the third hybrid coupler port and the first port of the antenna, the second configurable phase shift based on the polarization setting according to the antenna polarization information.

17. The apparatus of claim 15, wherein the polarization-setting switch comprises:

a differential amplifier comprising a first differential amplifier port on a first Radio Frequency (RF) path and a second differential amplifier port on a second RF path, the first differential amplifier port and the second differential amplifier port having a phase difference of 180 degrees, wherein the first differential amplifier port is coupled to the first port of the antenna; and a configurable phase shifter to apply a configurable phase shift between the second differential amplifier port and the second port of the antenna, the configurable phase shift based on the polarization setting according to the antenna polarization information.

18. The apparatus of claim 15, wherein the polarization-setting switch comprises:

a first differential amplifier comprising a first pair of differential amplifier ports having a phase difference of 180 degrees;

a second differential amplifier comprising a second pair of differential amplifier ports having a phase difference of 180 degrees; and a digitally configurable Balancing Unit (BALUN) configured to couple the first pair of differential amplifier ports to the first port of the antenna with the first phase, and to couple the second pair of differential amplifier ports to the second port of the antenna with the second phase.

19. The apparatus of claim 14 comprising the antenna of the radar device, wherein the antenna comprises a stacked series fed antenna.

20. The apparatus of claim 1, wherein the antenna polarization setting comprises a Transmit (Tx) antenna polarization setting to be applied for transmission of radar Tx signals by the radar device.

21. The apparatus of claim 1, wherein the antenna polarization setting comprises a Receive (Rx) antenna polarization setting to be applied for reception of radar Rx signals by the radar device.

22. The apparatus of claim 1 comprising the radar device, the radar device configured to generate radar information based on radar signals communicated according to the antenna polarization setting.

23. A product comprising one or more tangible computer-readable non-transitory storage media comprising computer-executable instructions operable to, when executed by at least one processor, enable the at least one processor to:

identify an environment-related attribute corresponding to an environment of a radar device based on driving scenario information corresponding to a driving scenario of a vehicle comprising the radar device; and based on the environment related attribute, determine an antenna polarization setting to be applied for communication of radar signals by the radar device, wherein the instructions, when executed, cause the processor to determine the antenna polarization setting based on whether the driving scenario comprises one or more walls; and output antenna polarization information to configure the antenna polarization setting.

24. The product of claim 23, wherein the instructions, when executed, cause the processor to determine, based on the environment related attribute, a selected antenna polarization setting from a plurality of antenna polarization settings, wherein the antenna polarization information is based on the selected antenna polarization setting.

25. The product of claim 23, wherein the instructions, when executed, cause the processor to identify the environment-related attribute based on interference information corresponding to interference in the environment of the radar device.

26. The product of claim 23, wherein the instructions, when executed, cause the processor to determine the antenna polarization setting based on whether the driving scenario comprises one or more substantially vertical walls.

27. A vehicle comprising:

a system controller configured to control one or more vehicular systems of the vehicle based on radar information; and a radar system configured to provide the radar information to the system controller, the radar system comprising:

one or more Transmit (Tx) antennas to transmit radar Tx signals;

one or more Receive (Rx) antennas to receive radar Rx signals based on the radar Tx signals, wherein the radar information is based on the radar Rx signals; and a processor configured to:

identify an environment-related attribute corresponding to an environment of the radar system based on driving scenario information corresponding to a driving scenario of the vehicle;

based on the environment related attribute, determine an antenna polarization setting to be applied for communication of radar signals by at least one antenna of the one or more Tx antennas or the one or more Rx antennas, wherein the processor is configured to determine the antenna polarization setting based on whether the driving scenario comprises one or more walls; and output antenna polarization information to configure the antenna polarization setting.

28. The vehicle of claim 27, wherein the processor is configured to determine, based on the environment related attribute, a selected antenna polarization setting from a plurality of antenna polarization settings, wherein the antenna polarization information is based on the selected antenna polarization setting.

29. The vehicle of claim 27, wherein the processor is configured to identify the environment-related attribute based on interference information corresponding to interference in the environment of the radar device.

* * * * *